(12) United States Patent
Ohnishi

(10) Patent No.: US 9,454,834 B2
(45) Date of Patent: Sep. 27, 2016

(54) STORAGE MEDIUM STORING IMAGE PROCESSING PROGRAM FOR IMPLEMENTING CONTROLLED IMAGE DISPLAY ACCORDING TO INPUT COORDINATE, AND INFORMATION PROCESSING DEVICE

(75) Inventor: Naonori Ohnishi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1745 days.

(21) Appl. No.: 12/255,953

(22) Filed: Oct. 22, 2008

(65) Prior Publication Data

US 2010/0079373 A1    Apr. 1, 2010

(30) Foreign Application Priority Data

Sep. 26, 2008 (JP) .................. 2008-247026
Sep. 26, 2008 (JP) .................. 2008-247027

(51) Int. Cl.
| G09G 5/08 | (2006.01) |
| G06T 11/60 | (2006.01) |
| G06F 3/0354 | (2013.01) |
| G06F 3/0484 | (2013.01) |
| G06F 3/0486 | (2013.01) |
| G06F 3/0488 | (2013.01) |

(52) U.S. Cl.
CPC ........... *G06T 11/60* (2013.01); *G06F 3/03545* (2013.01); *G06F 3/0486* (2013.01); *G06F 3/04845* (2013.01); *G06F 3/04883* (2013.01); G06F 2203/04807 (2013.01)

(58) Field of Classification Search
CPC ................. G06F 2203/04807; G06F 3/03545; G06F 3/04845; G06F 3/0486; G06F 3/04883; G06T 11/60

USPC .......................................................... 345/173
See application file for complete search history.

(56) References Cited

U.S. PATENT DOCUMENTS

| 5,019,809 A | 5/1991 | Chen |
| 6,225,978 B1 | 5/2001 | McNeil |
| 6,340,967 B1 | 1/2002 | Maxted |
| 6,469,709 B1 | 10/2002 | Sakai |
| 2003/0184525 A1 | 10/2003 | Tsai |

(Continued)

FOREIGN PATENT DOCUMENTS

| EP | 0 782 103 A2 | 7/1997 |
| JP | 2-69798 A | 3/1990 |

(Continued)

OTHER PUBLICATIONS

European Search Report issued Apr. 28, 2009 in corresponding European Application No. 09001264.2.

(Continued)

*Primary Examiner* — Quan-Zhen Wang
*Assistant Examiner* — Tony Davis
(74) *Attorney, Agent, or Firm* — Nixon & Vanderhye, P.C.

(57) ABSTRACT

When a user touches a first input point P1 with a touch pen or the like, touch position data indicating a coordinate of this first input point P1 can be obtained. A first object (stamp) is arranged in accordance with the first input point P1. When the user moves the touch pen or the like to a second input point P2 while maintaining a touch state (slide operation), an orientation of the object is changed in real time such that an angle reference line thereof coincides with a calculated reference line L2.

22 Claims, 31 Drawing Sheets

(56) References Cited

U.S. PATENT DOCUMENTS

| | | |
|---|---|---|
| 2003/0184815 A1 | 10/2003 | Shiki et al. |
| 2006/0007123 A1* | 1/2006 | Wilson et al. ............... 345/156 |
| 2006/0112335 A1* | 5/2006 | Hofmeister et al. .......... 715/701 |
| 2007/0075967 A1 | 4/2007 | Yoshihara |
| 2007/0075985 A1 | 4/2007 | Niida |
| 2007/0136462 A1* | 6/2007 | Nicholas, III ............... 709/224 |
| 2007/0270218 A1* | 11/2007 | Yoshida et al. ................ 463/37 |
| 2008/0044065 A1 | 2/2008 | Crockett et al. |
| 2008/0050035 A1* | 2/2008 | Tsurumi ....................... 382/276 |
| 2008/0122863 A1 | 5/2008 | Yoshihara et al. |
| 2009/0303199 A1* | 12/2009 | Cho et al. .................... 345/173 |

FOREIGN PATENT DOCUMENTS

| | | |
|---|---|---|
| JP | 2-204791 | 8/1990 |
| JP | 10-188014 | 7/1998 |
| JP | 2001-277651 A | 10/2001 |
| JP | 2003-037813 A | 2/2003 |
| JP | 2003-141558 | 5/2003 |
| JP | 2003-231321 | 8/2003 |
| JP | 2003-323241 | 11/2003 |
| JP | 2004-213221 | 7/2004 |
| JP | 2005-277891 | 10/2005 |
| JP | 2008-015633 | 1/2008 |
| JP | 2008-027453 | 2/2008 |
| JP | 2008-083796 | 4/2008 |
| JP | 2008-216990 | 9/2008 |

OTHER PUBLICATIONS

European Search Report issued Apr. 28, 2009 in corresponding European Application No. 09001263.4.

Japanese Office Action issued for corresponding Japanese Patent Application No. 2008-247026; dated Apr. 17, 2012.

Japanese Office Action issued for counterpart Japanese Patent Application No. 2008-247027, dated Jul. 24, 2012 (with English translation).

Reo, Takahashi, "Adobe InDesign CS3 Master Book for Macintosh & Windows", First Edition, Japan, Mainichi Communications Inc., Nobuyuki Nakagawa, Jul. 19, 2007, First Impression, pp. 225-226, ISBN-978-4-8399-2449-2.

Katsuya, Imura, "Illustrator CS3 Super Reference for Windows", First Edition, Adobe Illustrator CS3 Super Reference, Japan, Sotechsha Co., Ltd., Junichi Yanagisawa, Jul. 15, 2007, First Impression, pp. 232-233, ISBN-978-4-88166-603-6.

United States Office Action issued for U.S. Appl. No. 12/255,969 dated Aug. 9, 2012.

Ozaki, Tsukatte Oboeru!, Windows & Office Jitsuyou Kouza, ASCII Dotto PC, vol. 11, No. 6, pp. 72-75 (with partial English translation).

Nonoyama, PowerPoint 2007 Gyakubiki Quick Reference First Edition, Reverse Quick Reference PowerPoint 2007, Mainichi Communications Inc., Nobuyuki Nakagawa, Jan. 25, 2008, First Edition, pp. 153-156 (with partial English translation).

Office Action dated Sep. 26, 2013 for U.S. Appl. No. 12/255,969.

\* cited by examiner

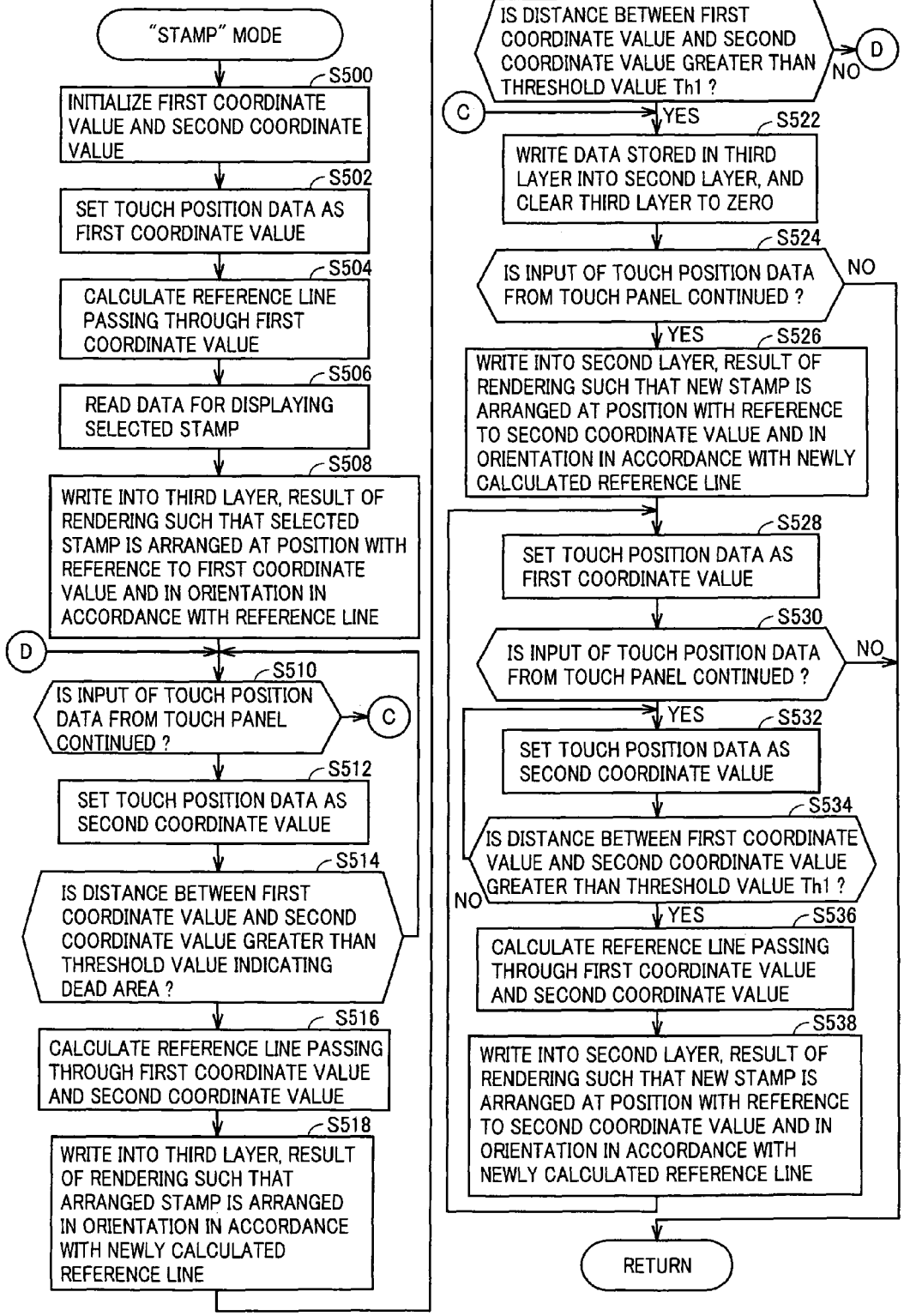

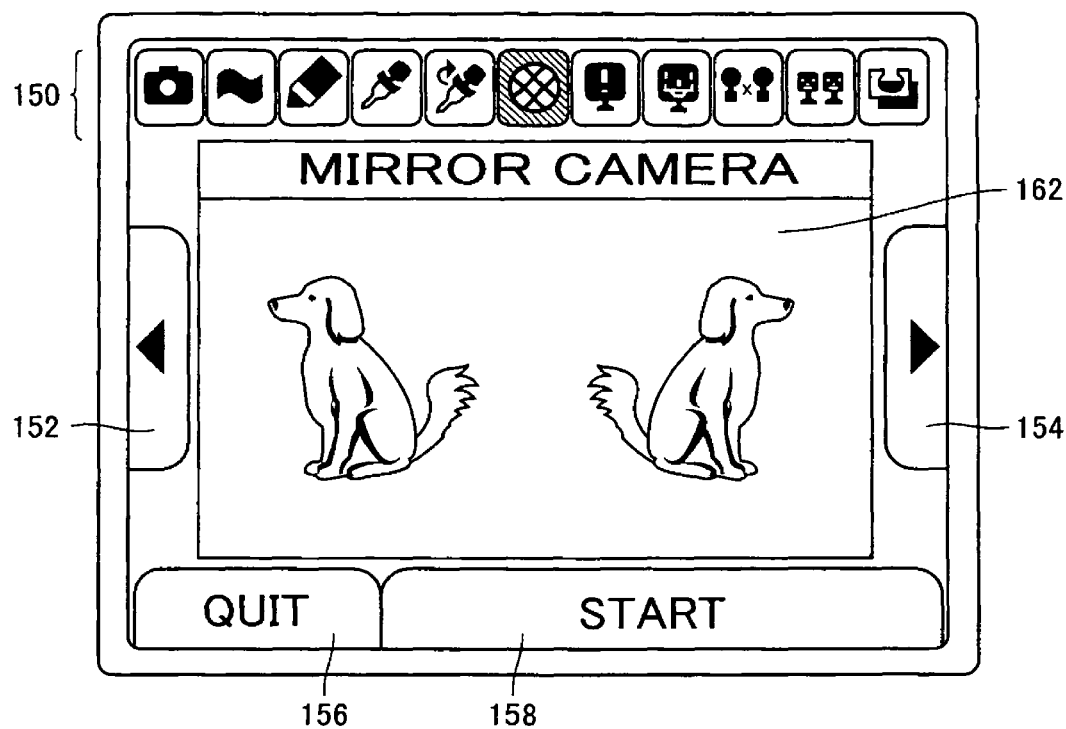

STORAGE MEDIUM STORING IMAGE PROCESSING PROGRAM FOR IMPLEMENTING CONTROLLED IMAGE DISPLAY ACCORDING TO INPUT COORDINATE, AND INFORMATION PROCESSING DEVICE

This nonprovisional application is based on Japanese Patent Applications Nos. 2008-247026 and 2008-247027 filed with the Japan Patent Office on Sep. 26, 2008, the entire contents of which are hereby incorporated by reference.

FIELD OF THE INVENTION

The present invention relates to a storage medium storing an image processing program for implementing controlled image display according to a coordinate input through a user's operation and an image processing device.

DESCRIPTION OF THE BACKGROUND ART

An image processing technique for changing (moving, rotating, reducing, expanding, and the like) an object displayed on a screen in response to a user's operation through a touch panel or the like has conventionally been known.

For example, Japanese Patent Laying-Open No. 2005-277891 discloses a photographic seal vending machine in which a rotation attribute of a stamp image already displayed on a screen is changed by using a touch pen provided with a rotation function. In addition, Japanese Patent Laying-Open Nos. 10-188014 and 2003-323241 disclose a technique for displaying an image object already displayed on a screen such that the image object is rotated, by dragging a prescribed portion thereof. Moreover, Japanese Patent Laying-Open No. 2003-141558 discloses a technique for arranging a stamp image at a touch position.

On the other hand, the techniques disclosed in Japanese Patent Laying-Open Nos. 2005-277891, 10-188014 and 2003-323241 are directed to change of the rotation attribute of the object image already displayed on the screen. In addition, the technique disclosed in Japanese Patent Laying-Open No. 2003-141558 does not allow control of an orientation of the stamp image:

SUMMARY OF THE INVENTION

The present invention was made to solve such problems. An object of the present invention is to provide a storage medium storing an image processing program that provides a user interface allowing an object to be displayed at any position and in any orientation with a more simplified operation and an image processing device.

According to a first aspect of the present invention, a storage medium storing an image processing program executed by a computer (100) interacting with an input portion (13; a reference numeral used in embodiments; to be understood similarly hereinafter) and a display portion (12) is provided. The image processing program causes the computer (100) to execute: a coordinate detection step (S104) of detecting a coordinate value input through an operation of the input portion (13); a first object display step (S132, S136, S502, S506, S508) of obtaining a prescribed coordinate value among detected coordinate values as a first object arranged coordinate value and displaying a first object at a corresponding position on the display portion based on the first object arranged coordinate value; a continuously-input coordinate obtaining step (S510, S512, S514) of obtaining a continuously-input coordinate value which is a coordinate value subsequent to the first object arranged coordinate value among the detected coordinate values; and an orientation changing step (S516, S518) of changing an orientation of the first object displayed on the display portion in accordance with the continuously-input coordinate value.

In the first object display step, the first object is preferably displayed when the first object arranged coordinate value is detected.

According to the first aspect, when the user operates the input portion (13), the first object arranged coordinate value is obtained as a result of this operation and the object is displayed at the position on the display portion (12) corresponding to this first object arranged coordinate value. In addition, when the user successively operates the input portion (13), a continuously-input arranged coordinate value is obtained as a result of the successive operation and the orientation of the object is changed based on this continuously-input coordinate value.

According to a more preferred second aspect of the present invention, in the first aspect described above, the first object display step includes setting a coordinate value immediately after start of detection of the coordinate value as the first object arranged coordinate value (S132, S136, S502).

According to the second aspect, when the user operates the input portion, the object is immediately displayed (arranged). Therefore, stress concerning the input operation on the user can be suppressed.

According to a more preferred third aspect of the present invention, in the first aspect described above, the continuously-input coordinate obtaining step includes determining whether or not detection of the coordinate value is continued subsequently to detection of the first object arranged coordinate value (S510), and determining whether or not a coordinate value input while the coordinate value is successively detected satisfies an orientation change condition which is a condition for changing the orientation of the first object (S514). The orientation changing step includes setting a coordinate value determined as satisfying the orientation change condition as the continuously-input coordinate value (S512), and changing the orientation of the first object in accordance with the continuously-input coordinate value.

According to one embodiment, the orientation change condition is a condition for suppressing change of the orientation of the object through a user's unintended operation, and by using such an orientation change condition, change of the object unintended by the user can be suppressed. Thus, the user can comfortably perform the input operation without feeling stress concerning the input operation.

According to a more preferred fourth aspect of the present invention, in the third aspect described above, the orientation change condition includes such a condition that a distance between the first object arranged coordinate value and the continuously-input coordinate value exceeds a predetermined threshold value. It is noted that the distance includes any of a linear dimension (Euclidian distance) between coordinate points and a travel distance (trail length).

According to the fourth aspect, even though the input coordinate slightly varies, for example, when the user stops the operation of the input portion, an erroneous operation on a displayed object can be suppressed. Therefore, stress concerning the input operation on the user can be suppressed.

According to a more preferred fifth aspect of the present invention, in the first aspect described above, the orientation changing step includes determining the orientation of the first object based on positional relation between the first object arranged coordinate value and the continuously-input coordinate value.

According to a more preferred sixth aspect of the present invention, in the fifth aspect described above, the orientation changing step includes determining the orientation of the first object based on a line passing through the first object arranged coordinate value and the continuously-input coordinate value (S516, S518).

According to the fifth and sixth aspects, after the object is displayed, the orientation of the object is changed in a manner following the user's operation, and the user can more intuitively indicate a desired orientation of the object.

According to a more preferred seventh aspect of the present invention, in the first aspect described above, the continuously-input coordinate obtaining step includes cyclically obtaining the continuously-input coordinate value while detection of the coordinate value is continued, and the orientation changing step includes cyclically changing the orientation of the first object displayed on the display portion in accordance with each continuously-input coordinate value obtained cyclically while detection of the coordinate value is continued.

According to the seventh aspect, while the user continues the operation, the orientation of the object displayed on the display portion is changed substantially in real time. Therefore, the user can actually feel excellent operation response.

According to a more preferred eighth aspect of the present invention, in the first aspect described above, the image processing program causes the computer to further execute an orientation fix condition determination step (S520) of determining whether an operation satisfying an orientation fix condition for fixing the orientation of the first object has been performed or not. The orientation changing step includes cyclically changing the orientation of the first object based on each continuously-input coordinate value each time the continuously-input coordinate value is updated, until the orientation fix condition is satisfied, and holding the orientation of the first object after the orientation fix condition is satisfied (S516, S518, S552).

According to a more preferred ninth aspect of the present invention, in the seventh aspect described above, the orientation fix condition includes such a condition that a distance between the first object arranged coordinate value and the continuously-input coordinate value is not smaller than a prescribed value.

According to the eighth and ninth aspects, when the user performs the operation satisfying the orientation fix condition after the object is displayed in the orientation desired by the user, the object is held in that orientation. Thus, for example, when the user wishes to display various objects, the user can continuously determine arrangement and orientation of each object.

According to a more preferred tenth aspect of the present invention, in the first aspect described above, the image processing program causes the computer to further execute an orientation change condition determination step (S514) of determining whether or not the continuously-input coordinate value satisfies an orientation change condition which is a condition for changing the orientation of the first object, and an orientation fix condition determination step (S520) of determining whether an operation satisfying an orientation fix condition for fixing the orientation of the first object has been performed or not. The orientation changing step includes maintaining the orientation of the first object in an initial state until the orientation change condition is satisfied, cyclically changing the orientation of the first object based on the continuously-input coordinate value after the orientation change condition is satisfied and until the orientation fix condition is satisfied, and holding the orientation of the first object after the orientation fix condition is satisfied.

According to the tenth aspect, when the user performs such an operation as arranging an object (typically, a stamp) one by one, the object can successively be arranged in the orientation in the initial state. In addition, when the user performs such an operation as continuously arranging objects, the objects can be arranged with their orientations being arbitrarily changed.

According to a more preferred eleventh aspect of the present invention, in the tenth aspect described above, the orientation fix condition includes such a condition that a distance between the first object arranged coordinate value and the continuously-input coordinate value is not smaller than a prescribed value.

According to the tenth and eleventh aspects, even when the user successively performs the operation, the orientation of the object is not changed until the orientation fix condition is satisfied. Therefore, an amount of operation processing can be reduced.

According to a more preferred twelfth aspect of the present invention, in the seventh aspect described above, the orientation fix condition includes such a condition that detection of the coordinate value is discontinued after the first object arranged coordinate value is obtained.

According to the twelfth aspect, as the orientation fix condition is satisfied at the timing when the user stops the operation of the input portion, the user can readily determine the orientation of the object simply by performing such an operation as moving a touch pen or the like off an input surface of a touch panel after the orientation of the object is changed to a desired orientation.

According to a more preferred thirteenth aspect of the present invention, in the tenth aspect described above, the image processing program causes the computer to further execute a second object display step (S530 to S538) of displaying a second object on the display portion. The second object display step includes determining whether or not a coordinate value input while the coordinate value is successively detected subsequently to detection of the first object arranged coordinate value satisfies a second object display condition for determining whether to display the second object (S534), and setting a coordinate value determined as satisfying the second object display condition as a second object arranged coordinate and displaying the second object at a corresponding position on the display portion based on that coordinate (S538).

According to the thirteenth aspect, when the user continuously performs the operation, a plurality of objects are successively displayed. Thus, the user can achieve continuous display of a plurality of objects with a simple operation.

According to a more preferred fourteenth aspect of the present invention, in the thirteenth aspect described above, the second object display condition is the same as the orientation fix condition, and the orientation of the first object is fixed based on the coordinate value determined as satisfying that condition and the second object is displayed at the position corresponding to that coordinate value.

According to the fourteenth aspect, when the orientation of the precedingly displayed object is held (fixed), a next object is displayed based on that held coordinate value. Thus, the user can more quickly achieve continuous display of a plurality of objects.

According to a more preferred fifteenth aspect of the present invention, in the thirteenth aspect described above, the second object display step includes determining an orientation of the second object based on positional relation between the first object arranged coordinate value and the second object arranged coordinate value (S536, S538).

According to the fifteenth aspect, for example, as the objects are successively arranged in the orientation along a trail input through the user's operation, a plurality of objects can be arranged in the orientation in accordance with the user's operation.

According to a more preferred sixteenth aspect of the present invention, in the first aspect described above, the image processing program causes the computer to further execute an input image display step (S200 to S204) of displaying an input image on the display portion. The object is displayed in a manner superimposed on the displayed input image.

According to the sixteenth aspect, the user can obtain feeling of doing "graffiti" over the input image. Thus, the user can freely perform an edition operation or the like, for example, on an image picked up by a camera or the like. Therefore, the user can create and enjoy a desired image by himself/herself.

According to a seventeenth aspect of the present invention, a storage medium storing an image processing program executed by a computer (100) interacting with an input portion (13) and a display portion (12) is provided. The image processing program causes the computer (100) to execute the steps of: detecting variation of a coordinate value continuously input through an operation of the input portion (S510, S520, S524, S528 to S532); and successively displaying at least one object in accordance with a trail on the display portion corresponding to variation of the coordinate value (S508, S516, S518, S526, S536, S538). An orientation of each of at least one object is successively determined in accordance with the trail on the display portion.

According to an eighteenth aspect of the present invention, an image processing device (100) interacting with an input portion (13) and a display portion (12) is provided. The image processing device (100) includes: a detection portion (31, 42) detecting a coordinate value input through a user's operation; a first object display portion (31; S502, S506, S508) obtaining a prescribed coordinate value among detected coordinate values as a first object arranged coordinate value and displaying a first object at a corresponding position on the display portion based on the first object arranged coordinate value; a continuously-input coordinate obtaining portion (31; S510, S512, S514) obtaining a continuously-input coordinate value which is a coordinate value subsequent to the first object arranged coordinate value among the detected coordinate values; and an orientation changing portion (31; S516, S518) changing an orientation of the first object displayed on the display portion in accordance with the continuously-input coordinate value.

According to a nineteenth aspect of the present invention, an image processing device (100) interacting with an input portion (13) and a display portion (12) is provided. The image processing device (100) includes: a detection portion (13, 31; S510, S520, S524, S528 to S532) detecting variation of a coordinate value continuously input through an operation of the input portion; and an object display portion (31; S508, S516, S518, S526, S536, S538) successively displaying at least one object in accordance with a trail on the display portion corresponding to variation of the coordinate value. An orientation of each of at least one object is successively determined in accordance with the trail on the display portion.

According to the present invention, a user interface allowing an object to be displayed in any size and in any orientation with a more simplified operation can be achieved.

In the description above, reference numerals for indicating correspondence with embodiments which will be described later, supplemental explanation and the like are provided for better understanding of the present invention, however, they are not intended to limit the present invention in any manner.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 25 is a flowchart showing sub routine processing in a "stamp" mode performed in step S140 shown in FIG. 21.

FIG. 27 is a diagram showing an exemplary selection screen in the game device according to a second embodiment of the present invention.

DESCRIPTION OF THE PREFERRED EMBODIMENTS

Figure 1:
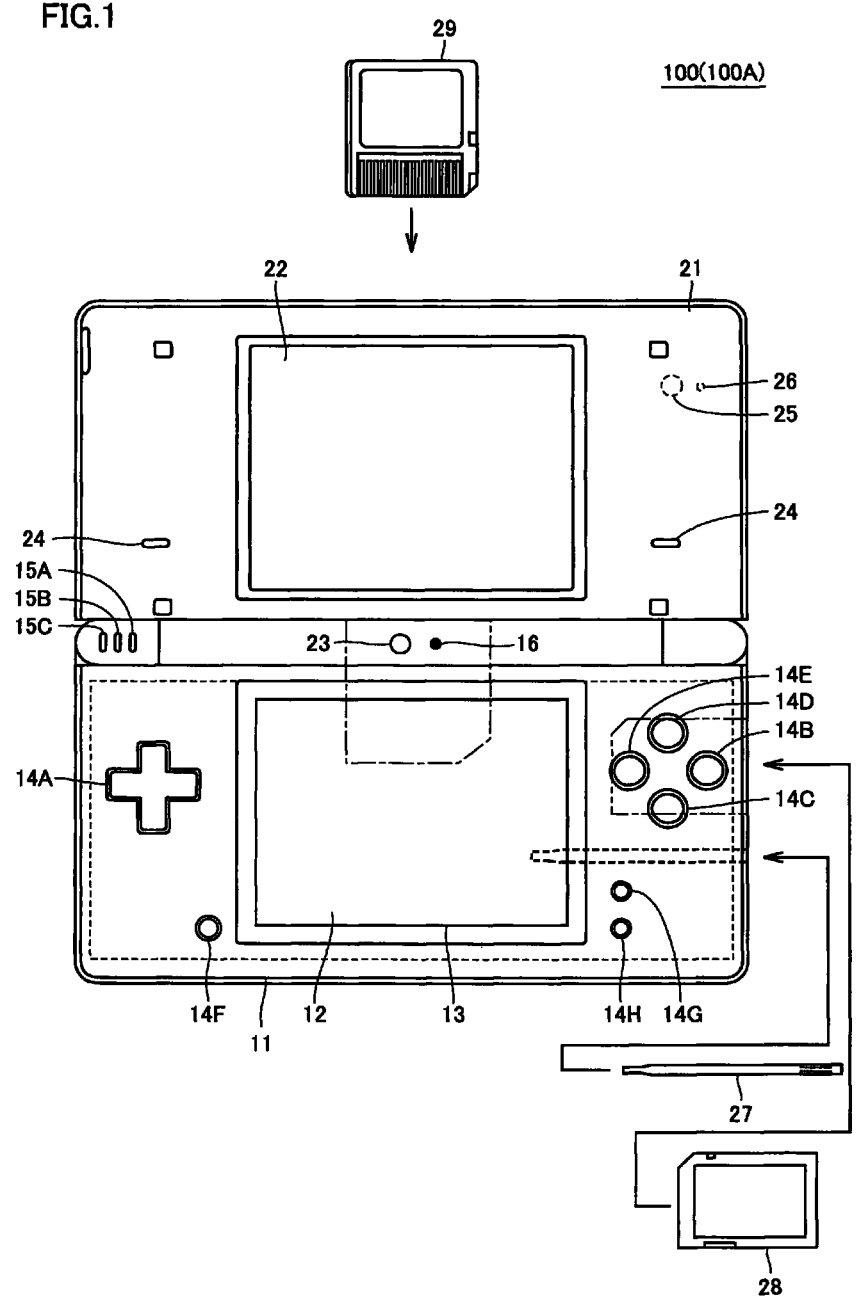
FIG. 1 shows appearance of a game device according to a first embodiment of the present invention.

An embodiment of the present invention will be described in detail with reference to the drawings. The same or corresponding elements in the drawings have the same reference characters allotted, and detailed description thereof will not be repeated.

First Embodiment

A game device 100 will be described hereinafter as a representative example of a computer or an image processing device according to the present invention. In addition, a program executed by game device 100 will be described by way of example of an image processing program according to the present invention. It is noted that the image processing device according to the present invention is not limited to a game device, and it may be implemented as a personal computer capable of executing various applications. Namely, the image processing program according to the present invention can be executed by a computer of any kind, so long as the computer interacts with an input portion and a display portion. It is noted here that "to interact with" means that the input portion and the display portion are connected to the computer through wired or wireless connection to allow communication of data, and encompasses both of an example where the input portion and the display portion are integrally formed with a computer device and an example where they are provided separately from the computer device.

In addition, the image processing program according to the present invention may be incorporated as a function of various applications executed on a personal computer. In the following, a portable device will be described, however, a stationary device may be employed.

Further, regarding the input portion, in a case of a portable device as will be described later, a touch panel is preferred as will be described later, however, a mouse or the like may alternatively be employed. Alternatively, a pointer capable of indicating a coordinate remotely from a display monitor (typically, a controller or the like of Wii®) may be employed. In the case of a mouse or a pointer, a "touch on" coordinate in embodiments described later may be a coordinate detected when a prescribed operation (such as a button operation) is performed, and determination as "a touch state being continued" may be defined as determination that a prescribed operation is continued (for example, the button operation is continued).

<Appearance of Game Device>

FIG. 1 shows appearance of game device 100 according to a first embodiment of the present invention.

Referring to FIG. 1, game device 100 according to the present embodiment is a foldable-type portable game device. FIG. 1 shows game device 100 in an unfolded state (opened state). Game device 100 is configured to have such a size that a user can hold game device 100 with both hands or one hand even in the unfolded state.

Game device 100 has a lower housing 11 and an upper housing 21. Lower housing 11 and upper housing 21 are coupled to allow opening and closing (be foldable). In the example shown in FIG. 1, lower housing 11 and upper housing 21 are each formed like a horizontally long, rectangular plate, and they are coupled to each other to be pivotable around a long side portion thereof.

Normally, the user uses game device 100 in the opened state. In addition, the user stores game device 100 in a closed state when he/she does not use game device 100. In the example shown in FIG. 1, game device 100 can not only be in the closed state or the opened state but also be held at any angle between the closed state and the opened state that is formed by lower housing 11 and upper housing 21, by means of friction force generated in a coupling portion. Namely, upper housing 21 can be stopped at any angle with respect to lower housing 11.

A lower LCD (Liquid Crystal Display) 12 is provided as the display portion (display means) in lower housing 11. Lower LCD 12 is in a horizontally long shape and it is arranged such that a direction in which its long side extends coincides with a direction in which a long side of lower housing 11 extends. In the present embodiment, though an LCD is employed as the display portion (display means) mounted on game device 100, any other display device such as a display device utilizing EL (Electro Luminescence) may be employed. In addition, game device 100 can employ a display device of any resolution.

Operation buttons 14A to 14H are provided as the input portion (input means) in lower housing 11. As shown in FIG. 1, among operation buttons 14A to 14H, a direction input button 14A, an operation button 14B, an operation button 14C, an operation button 14D, an operation button 14E, a power button 14F, a start button 14G, and a select button 14H are provided on an inner main surface of lower housing 11, which is located on the inner side when upper housing 21 and lower housing 11 are folded.

Direction input button 14A is used, for example, for a selection operation. Operation buttons 14B to 14E are used, for example, for an enter operation or a cancel operation. Power button 14F is used for turning on/off the power of game device 100. In the example shown in FIG. 1, direction input button 14A and power button 14F are provided on the inner main surface on one of left and right sides (left side in FIG. 1) of lower LCD 12 provided around the center of the inner main surface of lower housing 11.

In addition, operation buttons 14B to 14E, start button 14G, and select button 14H are provided on the inner main surface of lower housing 11 on the other of left and right sides (right side in FIG. 1) of lower LCD 12. Direction input button 14A, operation buttons 14B to 14E, start button 14G, and select button 14H are used for performing various operations on game device 100.

Operation buttons 14I to 14K not shown in FIG. 1 may further be provided in game device 100. For example, an L button 14I is provided at a left end portion of an upper side surface of lower housing 11, and an R button 14J is provided at a right end portion on the upper side surface of lower housing 11. L button 14I and R button 14J are used, for example, for performing an image pick-up instruction operation (shutter operation) on game device 100. In addition, a volume button 14K is provided on a left side surface of lower housing 11. Volume button 14K is used for adjusting a volume of a speaker included in game device 100.

In addition, game device 100 further includes a touch panel 13 as the input portion (input means) different from operation buttons 14A to 14H. Touch panel 13 is attached to cover a screen of lower LCD 12.

In the present embodiment, touch panel 13 is arranged in association with a display surface of lower LCD 12, and for example, a resistive touch panel is employed. It is noted that touch panel 13 is not limited to the resistive type and any pressing-type touch panel may be adopted.

In the present embodiment, for example, a touch panel having resolution (detection accuracy) as high as that of lower LCD 12 is employed as touch panel 13. It is noted that the resolution of touch panel 13 does not necessarily have to be equal to the resolution of lower LCD 12.

In addition, an insertion opening (dashed line shown in FIG. 1) for a touch pen 27 is provided in a right side surface of lower housing 11. Touch pen 27 used for performing an operation on touch panel 13 can be accommodated in the insertion opening. Normally, input to touch panel 13 is made by using touch pen 27, however, touch panel 13 can be operated with a finger of the user, without limited to touch pen 27.

Moreover, an insertion opening (shown with a chain-double-dotted line in FIG. 1) for accommodating a memory card 28 is provided in the right side surface of lower housing 11. A connector (not shown) for electrically connecting game device 100 and memory card 28 with each other is provided in the inside of this insertion opening. Memory card 28 is implemented, for example, by an SD (Secure Digital) memory card and removably attached to the connector. Memory card 28 is used, for example, for storing (saving) an image picked up and/or processed by game device 100 or for reading an image generated by another device into game device 100.

Further, an insertion opening (shown with a chain-dotted line in FIG. 1) for accommodating a memory card 29 is provided in the upper side surface of lower housing 11. A connector (not shown) for electrically connecting game device 100 and memory card 29 with each other is provided also in the inside of this insertion opening. Memory card 29 is a storage medium storing an image communication program, a game program or the like, and it is removably attached to the insertion opening provided in lower housing 11.

Three LEDs 15A to 15C are disposed in a portion on the left of the coupling portion of lower housing 11 and upper housing 21. Game device 100 according to the present embodiment can establish wireless communication with other equipment, and a first LED 15A illuminates when wireless communication is established. A second LED 15B illuminates while game device 100 is being charged. A third LED 15C illuminates when the power of game device 100 is turned on. Therefore, three LEDs 15A to 15C can notify the user of a state of communication establishment, a state of charge, and a state of power on/off of game device 100, respectively.

On the other hand, an upper LCD 22 is provided in upper housing 21. Upper LCD 22 has a horizontally long shape and it is arranged such that a direction in which its long side extends coincides with a direction in which a long side of upper housing 21 extends. As in lower LCD 12, a display device of any other type and of any other resolution may be employed instead of upper LCD 22. A touch panel may be provided to cover upper LCD 22.

In addition, two cameras (an inner camera 23 and an outer camera 25) each serving as an image pick-up device are provided in upper housing 21. As shown in FIG. 1, inner camera 23 is disposed in an inner main surface of upper housing 21 around the coupling portion. On the other hand, outer camera 25 is disposed in a surface opposite to the inner main surface where inner camera 23 is disposed, that is, to an outer main surface of upper housing 21 (a surface on the outside when game device 100 is in the closed state and a back surface of upper housing 21 shown in FIG. 1). In FIG. 1, outer camera 25 is shown with a dashed line.

Thus, inner camera 23 can pick up an image in a direction in which the inner main surface of upper housing 21 faces, and outer camera 25 can pick up an image in a direction opposite to the direction of image pick-up by inner camera 23, that is, in a direction in which the outer main surface of upper housing 21 faces.

In this manner, in the present embodiment, two cameras, that is, inner camera 23 and outer camera 25, are provided such that the directions of image pick-up are opposite to each other. For example, the user can pick up with inner camera 23, an image of a view in a direction from game device 100 toward the user, and can pick up with outer camera 25, an image of a view from game device 100 toward a side opposite to the user.

In some cases, lower LCD 12 and/or upper LCD 22 may be used for displaying an image picked up by inner camera 23 or outer camera 25 in real time.

In addition, a microphone (a microphone 43 shown in FIG. 2) is accommodated as an audio input device in the inner main surface around the coupling portion above. In the inner main surface around the coupling portion above, a microphone hole 16 is formed such that microphone 43 can sense sound outside game device 100. A position where microphone 43 is accommodated and a position of microphone hole 16 do not necessarily have to be in the coupling portion above, and for example, microphone 43 may be accommodated in lower housing 11 and microphone hole 16 may be provided in lower housing 11 in correspondence with the position of accommodation of microphone 43.

Moreover, a fourth LED 26 (shown with a dashed line in FIG. 1) is disposed in the outer main surface of upper housing 21. Fourth LED 26 illuminates while inner camera 23 or outer camera 25 is picking up an image. Alternatively, fourth LED 26 may blink while a motion picture is being picked up (picked-up images are stored as motion picture) by inner camera 23 or outer camera 25.

In order to prevent illumination of the LED from entering the screen, fourth LED 26 may be turned off from the moment of pressing of a shutter until completion of storage of the image picked up at the moment of pressing of the shutter. Fourth LED 26 can notify a subject or a person nearby that the image pick-up by game device 100 is being performed.

In addition, a sound emission hole 24 is formed in the inner main surface of upper housing 21, on each of left and right sides of upper LCD 22 provided around the center of the inner main surface. A speaker is accommodated in upper housing 21 in the rear of sound emission hole 24. Sound emission hole 24 is a hole for emitting sound from the speaker to the outside of game device 100.

As described above, upper housing 21 is provided with inner camera 23 and outer camera 25 that are features for picking up an image as well as upper LCD 22 serving as the display portion for displaying various images. On the other hand, lower housing 11 is provided with the input portion (touch panel 13 and buttons 14A to 14K) for providing operation inputs to game device 100 as well as lower LCD 12 serving as the display portion for displaying various images.

The input device can be used for such applications that the user holds lower housing 11 to provide inputs to the input device while the picked-up image (the image picked up by the camera) is displayed on lower LCD 12 or upper LCD 22 in use of game device 100.

<Internal Configuration of Game Device>

Figure 2:
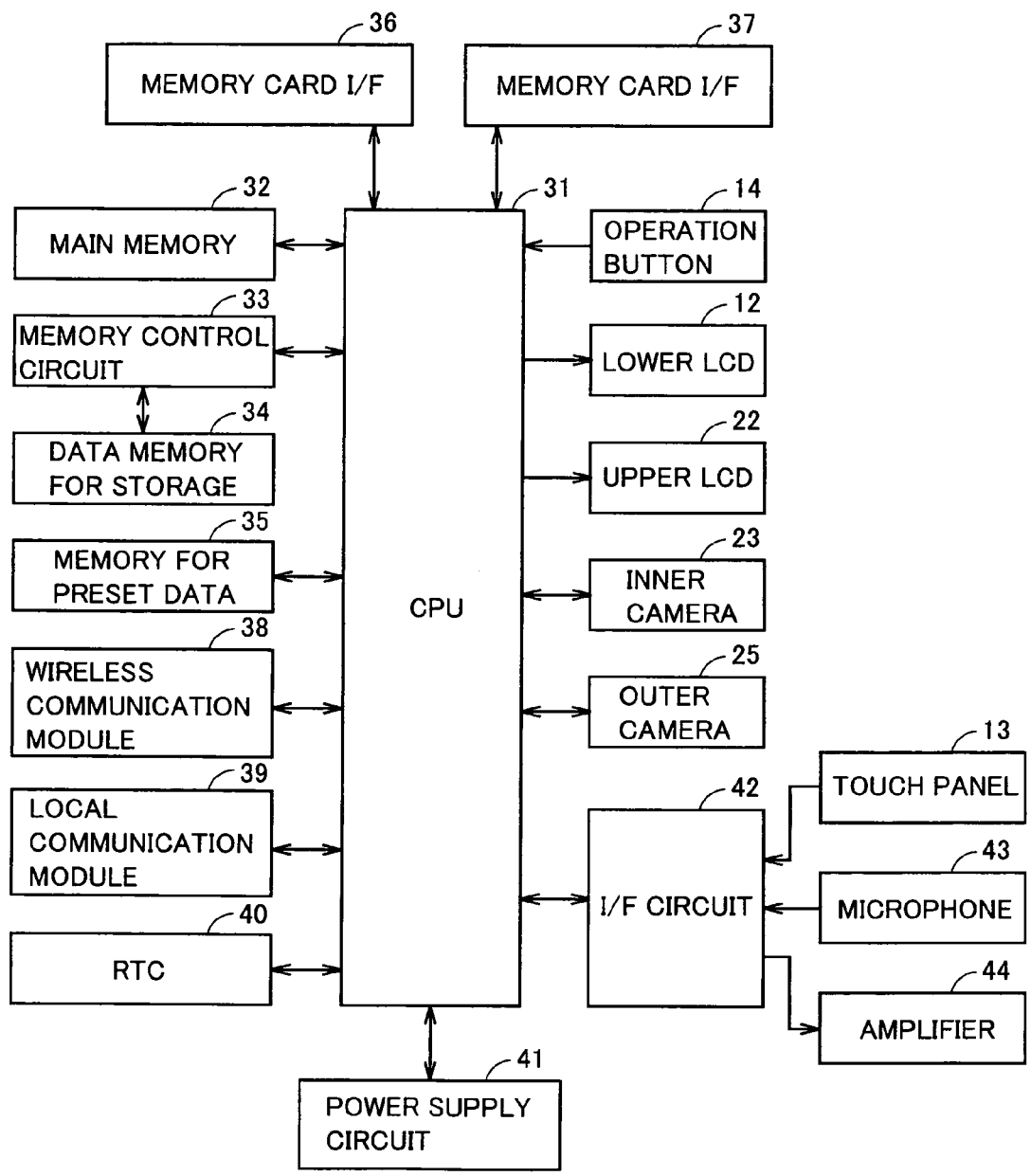
FIG. 2 is a block diagram showing an exemplary internal configuration of the game device according to the first embodiment of the present invention.

FIG. 2 is a block diagram showing an exemplary internal configuration of game device 100 according to the first embodiment of the present invention.

Referring to FIG. 2, game device 100 includes such electronic parts as a CPU 31, a main memory 32, a memory control circuit 33, a data memory 34 for storage, a memory 35 for preset data, memory card interfaces (memory card I/F) 36 and 37, a wireless communication module 38, a local communication module 39, a real time clock (RTC) 40, a power supply circuit 41, and an interface circuit (I/F circuit) 42. These electronic parts are mounted on an electronic circuit substrate and accommodated in lower housing 11 (or may be accommodated in upper housing 21).

CPU 31 is an operation processing unit for executing a prescribed program. In the present embodiment, a prescribed program is recorded in a memory (such as data memory 34 for storage) within game device 100 or memory card 28 and/or 29, and CPU 31 performs image processing which will be described later by executing the prescribed program. The program executed by CPU 31 may be recorded in advance in a memory within game device 100, obtained from memory card 28 and/or 29, or obtained from other equipment through communication with other equipment.

Main memory 32, memory control circuit 33 and memory 35 for preset data are connected to CPU 31. In addition, data memory 34 for storage is connected to memory control circuit 33.

Main memory 32 is a storage portion used as a work area or a buffer area of CPU 31. Namely, main memory 32 stores various types of data used for information processing above or stores a program obtained from the outside (memory cards 28 and 29, other equipment, and the like). In the present embodiment, for example, a PSRAM (Pseudo-SRAM) is employed as main memory 32.

Data memory 34 for storage is a storage portion for storing a program executed by CPU 31, data of images picked up by inner camera 23 and outer camera 25, and the like. Data memory 34 for storage is implemented by a non-volatile storage medium, and for example, it is implemented by a NAND-type flash memory in the present embodiment. Memory control circuit 33 is a circuit controlling reading and writing of data from/to data memory 34 for storage in accordance with an instruction from CPU 31.

Memory 35 for preset data is a storage portion for storing data such as various parameters set in advance in game device 100 (preset data). A flash memory connected to CPU 31 through an SPI (Serial Peripheral Interface) bus may be employed as memory 35 for preset data.

Memory card I/Fs 36 and 37 are each connected to CPU 31. Memory card I/F 36 performs reading and writing of data from/to memory card 28 attached to the connector in response to an instruction from CPU 31. In addition, memory card I/F 37 performs reading and writing of data from/to memory card 29 attached to the connector in response to an instruction from CPU 31.

In the present embodiment, data of images picked up by inner camera 23 and outer camera 25 or image data received from other devices is written in memory card 28, or image data stored in memory card 28 is read from memory card 28 and stored in data memory 34 for storage or transmitted to other devices. In addition, various programs stored in memory card 29 are read and executed by CPU 31.

The image processing program according to the present invention is supplied not only to a computer system through an external storage medium such as memory card 29 but also to a computer system through a wired or wireless communication line. Alternatively, the image processing program may be stored in advance in a non-volatile storage device within the computer system. The storage medium storing the image processing program is not limited to the non-volatile storage device above, and an optical, disc-like storage medium such as a CD-ROM, a DVD, or a similar medium may be employed.

Wireless communication module 38 has a function for connection to wireless LAN, for example, in compliance with IEEE 802.11.b/g specifications. In addition, local communication module 39 has a function to establish wireless communication with a game device of a similar type under a prescribed communication scheme. Wireless communication module 38 and local communication module 39 are connected to CPU 31. CPU 31 can transmit and receive data to/from other equipment through the Internet by using wireless communication module 38, or transmit and receive data to/from another game device of a similar type by using local communication module 39.

In addition, RTC 40 and power supply circuit 41 are connected to CPU 31. RTC 40 counts time and outputs the counted time to CPU 31. For example, CPU 31 is also able to calculate current time (date) or the like based on the time counted by RTC 40. Power supply circuit 41 controls electric power supplied from a power supply of game device 100 (typically, a battery housed in lower housing 11) and supplies electric power to each part of game device 100.

Moreover, game device 100 includes microphone 43 and amplifier 44. Microphone 43 and amplifier 44 are connected to I/F circuit 42. Microphone 43 senses voice and sound of the user issued toward game device 100 and outputs an audio signal indicating the voice and sound to I/F circuit 42. Amplifier 44 amplifies the audio signal from I/F circuit 42 and causes the audio signal to be output from the speaker (not shown). I/F circuit 42 is connected to CPU 31.

Further, touch panel 13 is connected to I/F circuit 42. I/F circuit 42 includes an audio control circuit controlling microphone 43 and amplifier 44 (speaker) and a touch panel control circuit controlling touch panel 13.

The audio control circuit performs A/D conversion and D/A conversion of the audio signal, and converts the audio signal to audio data in a prescribed format.

The touch panel control circuit generates touch position data in a prescribed format based on a signal from touch panel 13 and outputs the data to CPU 31. For example, the touch position data is data indicating a coordinate of a position where input to an input surface of touch panel 13 was made. Here, the touch panel control circuit performs reading of a signal from touch panel 13 and generation of the touch position data once in a prescribed period of time.

CPU 31 can detect a coordinate input through the user's operation of touch panel 13 by obtaining the touch position data through I/F circuit 42.

Operation button 14 is constituted of operation buttons 14A to 14K above and connected to CPU 31. Operation data indicating a state of input to each of operation buttons 14A to 14K (whether the button was pressed or not) is output from operation button 14 to CPU 31. CPU 31 performs processing in accordance with the input to operation button 14 by obtaining the operation data from operation button 14.

Inner camera 23 and outer camera 25 are each connected to CPU 31. Inner camera 23 and outer camera 25 pick up an image in response to an instruction from CPU 31 and output data of the picked-up image to CPU 31. For example, CPU 31 issues an image pick-up instruction to any one of inner camera 23 and outer camera 25, and the camera that received the image pick-up instruction picks up an image and sends the image data to CPU 31.

In addition, lower LCD 12 and upper LCD 22 are each connected to CPU 31. Lower LCD 12 and upper LCD 22 display an image in response to an instruction from CPU 31. For example, CPU 31 causes one of lower LCD 12 and upper LCD 22 to display the image obtained from any of inner camera 23 and outer camera 25, and causes the other of lower LCD 12 and upper LCD 22 to display an operation guidance picture generated through prescribed processing.

<Exemplary Usage of Game Device>

Figure 3:
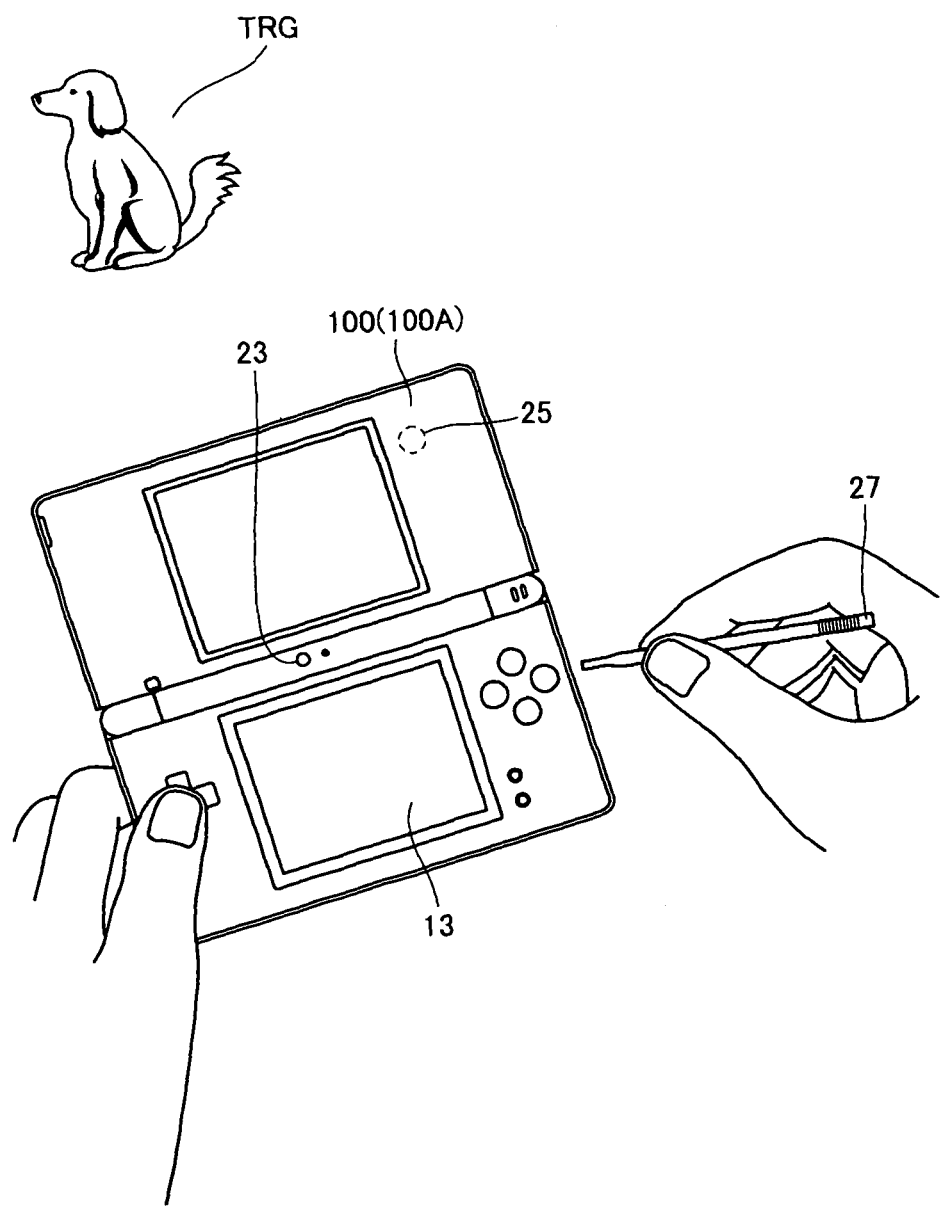
FIG. 3 is a diagram showing exemplary usage of the game device according to the first embodiment of the present invention.

FIG. 3 is a diagram showing exemplary usage of game device 100 according to the first embodiment of the present invention. Referring to FIG. 3, in game device 100, an image, for example, of a subject TRG picked up by the mounted camera (inner camera 23 or outer camera 25) is displayed in real time on lower LCD 12, and the user can use touch pen 27, his/her own finger or the like (hereinafter, referred to as "touch pen 27 etc.") to operate touch panel 13 arranged on lower LCD 12 and add an arbitrary object. Then, the object(s) in accordance with this user's operation is (are) displayed in a manner superimposed on the picked-up image. Thus, in game device 100 according to the present embodiment, the user can freely do "graffiti" over the image or the like picked up by the camera. The displayed image may be an image stored in advance in memory card 28 (FIG. 2) or the like (still image or moving image).

Though the image of subject TRG is picked up by outer camera 25 in the example shown in FIG. 3, the image of subject TRG may be picked up by inner camera 23, and the user can arbitrarily select which camera to use.

Figure 4:
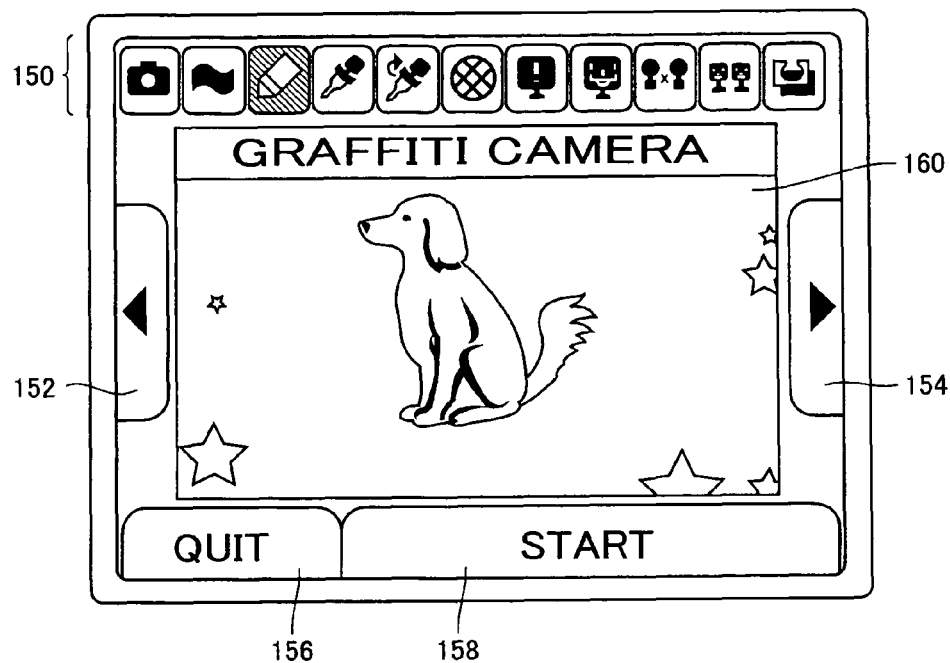
FIG. 4 is a diagram showing an exemplary selection screen in the game device according to the first embodiment of the present invention.

FIG. 4 is a diagram showing an exemplary selection screen in game device 100 according to the first embodiment of the present invention. Referring to FIG. 4, game device 100 according to the present embodiment is provided with a plurality of functions including a function to allow the user to freely do "graffiti" described above, and the user selects a desired function on the selection screen shown in FIG. 4.

In the example shown in FIG. 4, a plurality of icons 150 corresponding to respective functions provided in game device 100 are displayed in an upper portion of the screen, and the user can arbitrarily select an icon corresponding to a desired function from among these icons 150. In addition, selection icons 152 and 154 are displayed on opposing sides of the screen. Each time the user selects selection icon 152 or 154, the selected function is successively changed toward the left or toward the right, along arrangement of icons 150.

When a "start" icon 158 is selected after the user selects the function in such a manner, the selected function is executed. In addition, when a "quit" icon 156 is selected, the screen returns to a not-shown menu screen.

In addition, as shown in FIG. 4, a name of the selected function (in the example shown in FIG. 4, "graffiti camera") and outlines of that processing are shown in a preview region 160, so as to present to the user contents of the function corresponding to icon 150 selected by the user.

<Outlines of "Graffiti Camera">

Outlines of a "graffiti camera" according to the present embodiment will be described hereinafter with reference to FIGS. 5 to 11.

The "graffiti camera" according to the present embodiment is a function to allow the user to freely do "graffiti" over an image or the like picked up by the camera. The "graffiti camera" provides a function to allow arrangement of one object (stamp) prepared in advance at any position and in any orientation and a function to allow arrangement of a plurality of objects along a trail input by the user.

Figure 5:
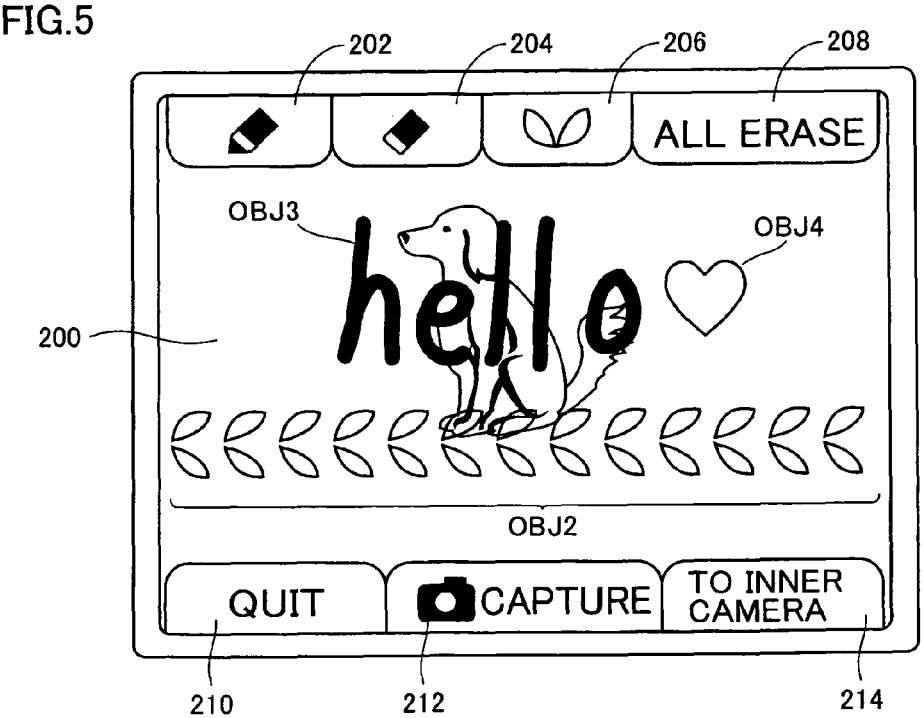
FIG. 5 is a diagram (No. 1) for illustrating outlines of a "graffiti camera" according to the first embodiment of the present invention.

As shown in FIG. 5, in a "graffiti camera" mode, the image picked up by the camera is displayed in real time, and icons 202 to 208 for selecting a "graffiti" operation over this image are displayed in the upper portion of the screen and icons 210 to 214 for selecting various types of operations are displayed in a lower portion of the screen.

In the example shown in FIG. 5, a case is shown, where an object OBJ2 representing a stamp of a leaf and an object OBJ4 representing a stamp of a heart are displayed in a manner superimposed on the image obtained as a result of image pick-up of subject TRG, and in addition an object OBJ3 indicating characters of "hello" input by the user is displayed in a superimposed manner.

Regarding object OBJ3 shown in FIG. 5, the user selects (touches) a "pencil" icon 202 and thereafter moves touch pen 27 etc. while touch pen 27 etc. keeps touching the screen (slide operation), so that object OBJ3 is generated along the trail. By selecting "pencil" icon 202, a not-shown selection sub menu is displayed and any thickness and color of a line can be selected in this selection sub menu.

In addition, when the user selects an "eraser" icon 204 and thereafter moves touch pen 27 etc. while touch pen 27 etc. keeps touching the screen (slide operation), the object included in that trail (region) is erased. Moreover, when an "all erase" icon 208 is selected, all objects displayed in a display region 200 are erased.

Figure 6:
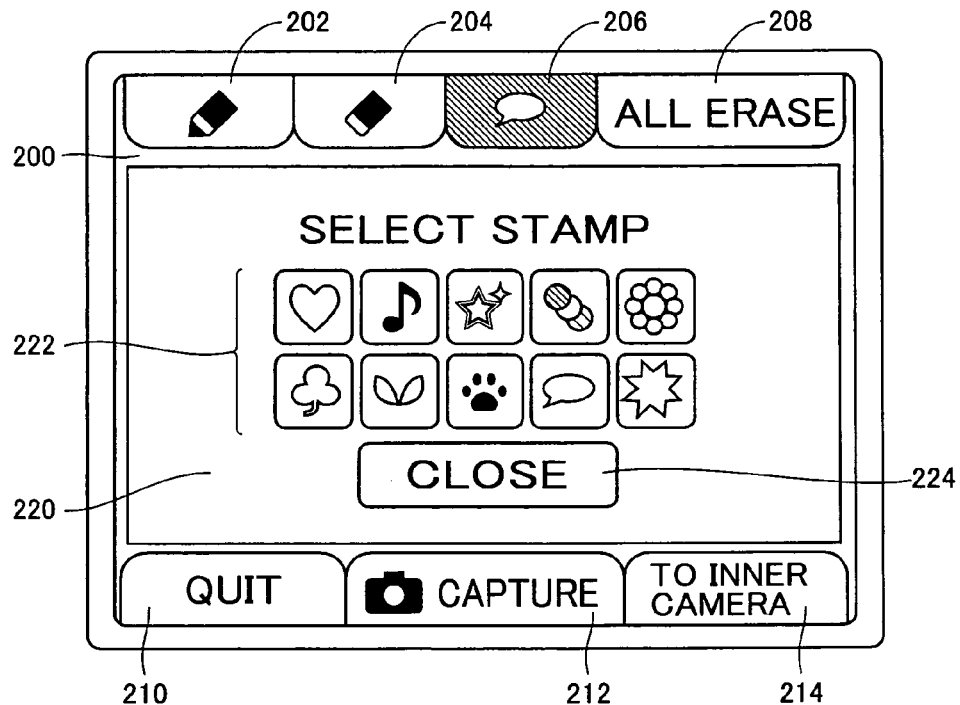
FIG. 6 is a diagram (No. 2) for illustrating outlines of the "graffiti camera" according to the first embodiment of the present invention.

In addition, when a "stamp" icon 206 is selected, the selection sub menu shown in FIG. 6 is displayed and input of a stamp selected in this selection sub menu is permitted. In game device 100, a plurality of types of stamps (ten types in the example shown in FIG. 6) are prepared in advance, and as shown in FIG. 6, in the selection sub menu displayed when "stamp" icon 206 was selected, a plurality of icons 222 corresponding to respective stamps are displayed. When the user selects an icon corresponding to a desired stamp and selects a "close" icon 224, a state that the selected stamp can be input is established and the selection sub menu is no longer displayed.

When the user touches a desired position on the screen with touch pen 27 etc. in the state that the selected stamp can be input, selected one stamp is arranged at that position (corresponding to a first object arranged coordinate value).

In particular, in game device 100 according to the present embodiment, a stamp immediately after arrangement is maintained in a state unfixed with regard to an orientation of arrangement. Specifically, when the user touches the screen with touch pen 27 etc. to arrange the stamp and thereafter moves touch pen 27 etc. while touch pen 27 etc. keeps touching the screen (slide operation), the orientation of the stamp varies in real time in accordance with a moved touch position (corresponding to a continuously input coordinate value). Then, when the user performs such an operation as moving touch pen 27 etc. off the screen or moving touch pen 27 etc. by more than a prescribed distance D1 from a touch-on position, the orientation of the arranged stamp is fixed (fixed state). As will be described later, if the touch position is not distant by a prescribed distance D2 (D2<D1) from the touch-on position, the orientation of the stamp is not changed.

Figure 7:
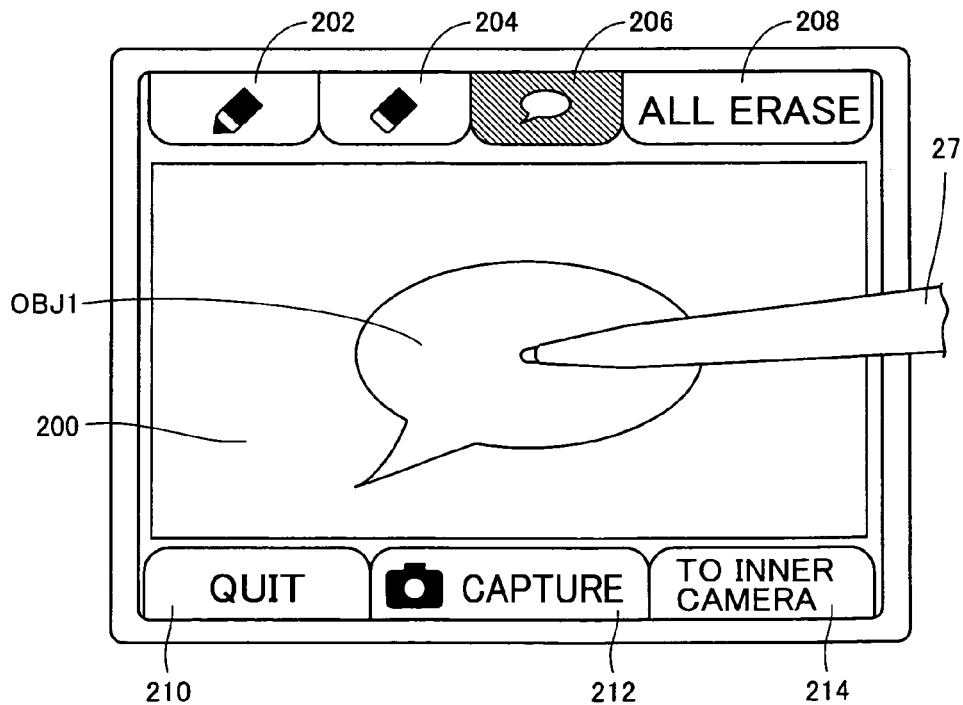
FIG. 7 is a diagram (No. 3) for illustrating outlines of the "graffiti camera" according to the first embodiment of the present invention.
Figure 8:
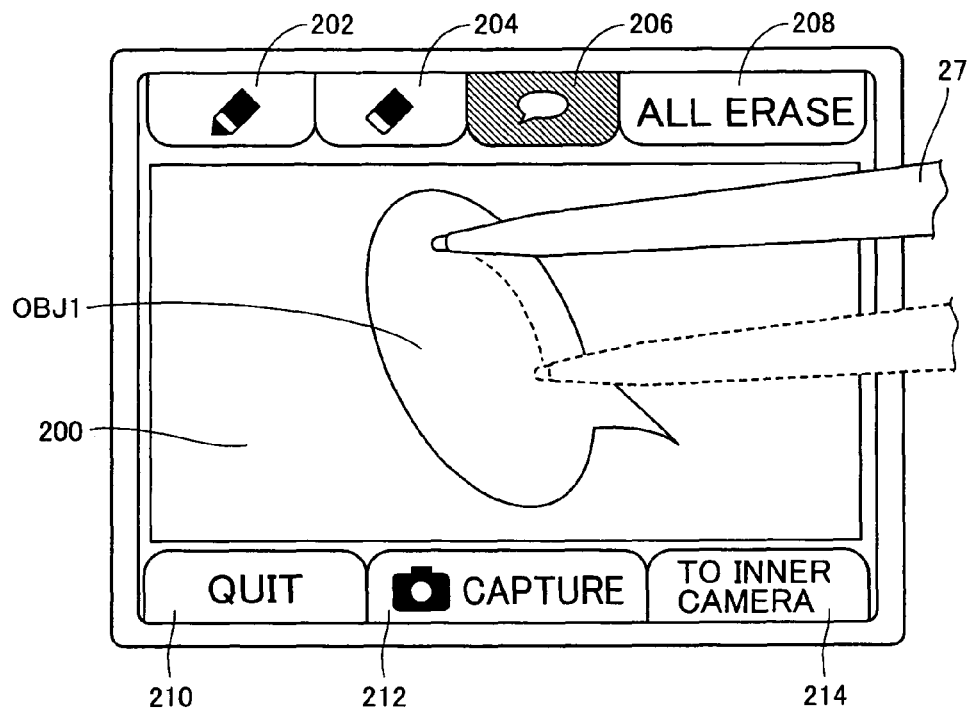
FIG. 8 is a diagram (No. 4) for illustrating outlines of the "graffiti camera" according to the first embodiment of the present invention.

Specifically, for example, when the user selects an icon corresponding to a balloon stamp in the selection sub menu shown in FIG. 6 and touches a desired position on the screen with touch pen 27 etc., as shown in FIG. 7, an object OBJ4 representing the balloon stamp is arranged in accordance with the touch-on position. Here, object OBJ4 is in a predetermined orientation (initial value). In addition, when the user moves touch pen 27 etc. while touch pen 27 etc. keeps touching the screen, as shown in FIG. 8, object OBJ4 successively rotates in accordance with the position resulting from movement of this touch pen 27 etc. It is noted that a center point of rotation is determined in advance for each stamp, and the stamp rotates around this center point in accordance with movement of touch pen 27 etc. Thereafter, when touch pen 27 etc. is moved off the screen or when touch pen 27 etc. moves by more than prescribed distance D1 from the touch-on position, the orientation of arranged object 4 (stamp) is fixed.

Figure 10:
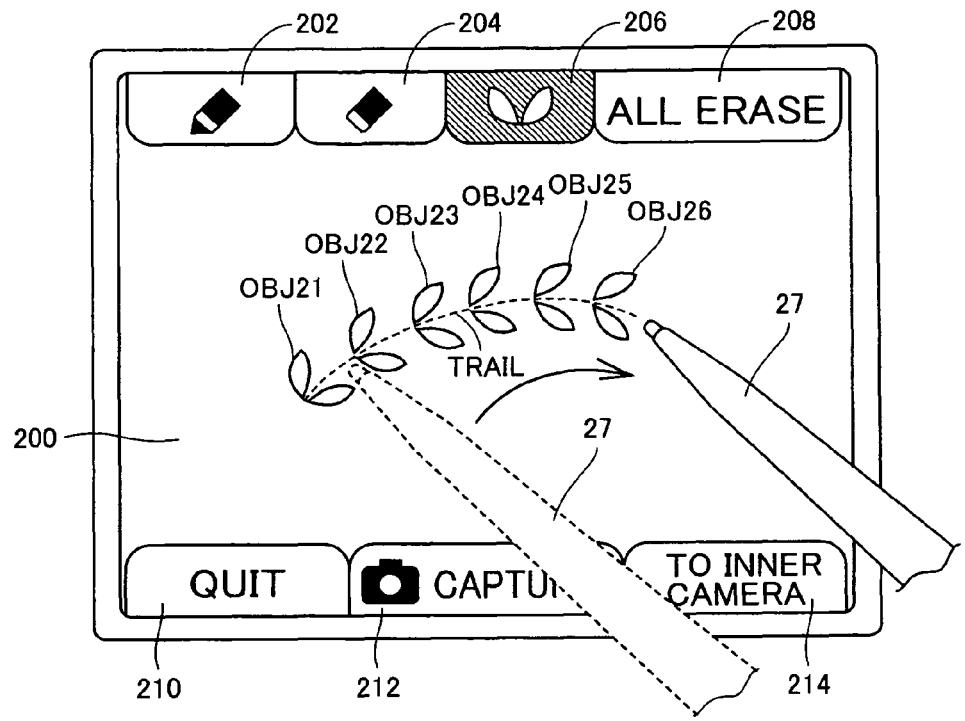
FIG. 10 is a diagram (No. 6) for illustrating outlines of the "graffiti camera" according to the first embodiment of the present invention.
Figure 11:
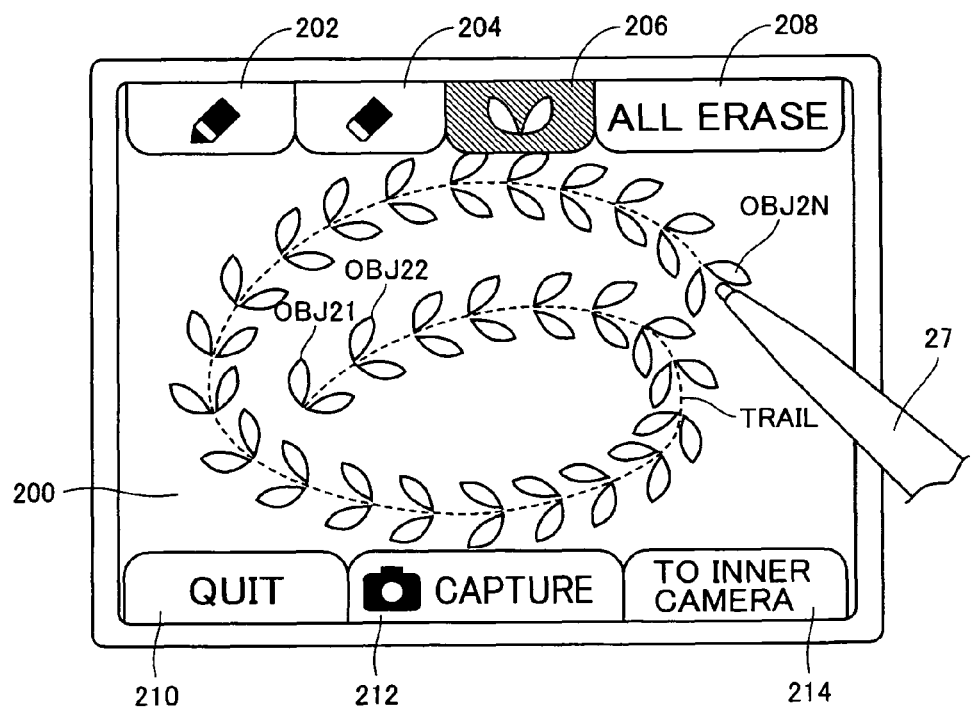
FIG. 11 is a diagram (No. 7) for illustrating outlines of the "graffiti camera" according to the first embodiment of the present invention.

In addition, an example where one stamp is arranged and thereafter touch pen 27 etc. is moved while touch pen 27 etc. keeps touching the screen will be described with reference to FIGS. 9 to 11. For facilitating understanding, a case where a leaf stamp is selected is illustrated in the example shown in FIGS. 9 to 11.

Figure 9:
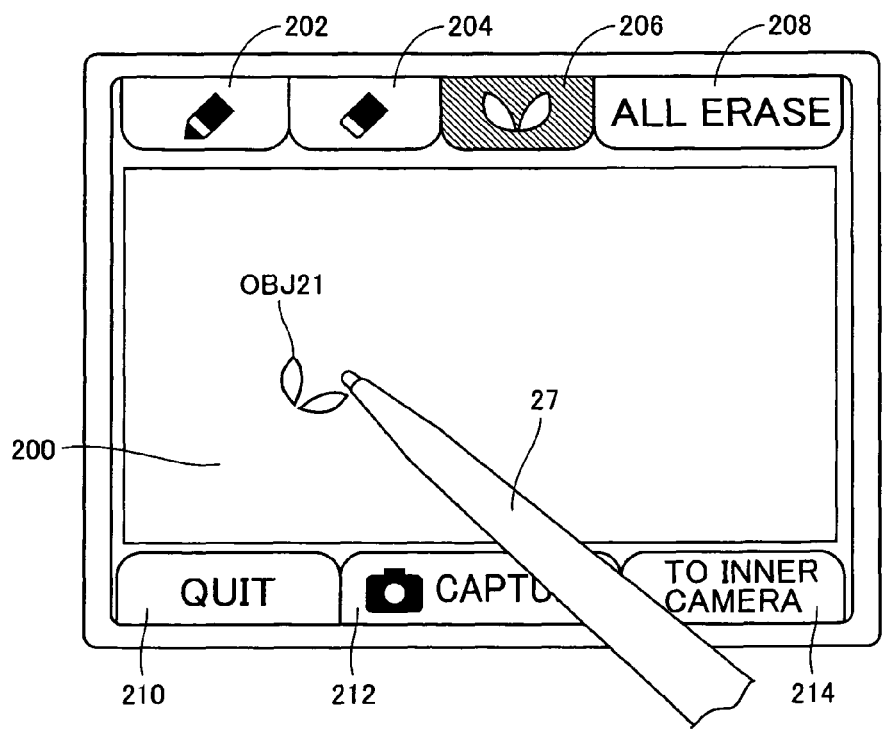
FIG. 9 is a diagram (No. 5) for illustrating outlines of the "graffiti camera" according to the first embodiment of the present invention.

Initially, when the user touches a desired position on the screen with touch pen 27 etc., as shown in FIG. 9, an object OBJ21 representing the leaf stamp is arranged in accordance with the touch-on position (displayed on the screen). As described above, the orientation of the stamp (object OBJ21) immediately after arrangement is unfixed. Thereafter, when the user moves touch pen 27 etc. by more than prescribed distance D1 from the touch-on position while touch pen 27 etc. keeps touching the screen, the orientation of object OBJ21 is fixed. If touch pen 27 etc. still keeps touching the screen simultaneously with or after fixing of the orientation of this object OBJ21, an object OBJ22 which is a new stamp (a second stamp) is arranged.

Regarding the orientation of the secondly arranged stamp, the orientation thereof is determined based on relative relation between the position of the first stamp and the position of the second stamp itself. Therefore, the orientation of the second stamp is fixed at the time point of arrangement. When touch pen 27 etc. is moved by prescribed distance D1 from the position of object OBJ22 while the touch state is maintained after the second stamp is arranged, an object OBJ23 which is a further new stamp (third stamp) is arranged. Regarding this third stamp as well, the orientation thereof is fixed at the time point of arrangement as in the case of the second stamp. Specifically, the orientation is determined in accordance with relative relation between the position of the second stamp and the position of the third stamp itself. Thereafter, when the touch position is continuously moved while the touch state is maintained, fourth and subsequent stamps (OBJ24, OBJ25, . . . ) are also arranged as described above and the orientation thereof is set. As described previously, in a series of operations from touching the screen with touch pen 27 etc. until moving touch pen 27 etc. off the screen, since the orientation of the first arranged stamp is fixed in accordance with relative relation between the position of the stamp itself and the position of the immediately subsequent stamp, the orientation thereof is not fixed at the time point of display but the orientation thereof varies in accordance with the subsequent touch position. On the other hand, regarding the orientation of the second and subsequent stamps, the orientation in which the stamp is arranged is determined in accordance with relative relation between the position of the immediately preceding stamp and the position of the stamp itself. In other words, in a series of operations, regarding the second and subsequent stamps, the orientation thereof is fixed at the time point of display and the unfixed state does not exist.

Thus, when the user moves touch pen 27 etc, while touch pen 27 etc. keeps touching the screen, the stamps are successively arranged along the trail. Such an operation continues so long as the screen is touched with touch pen 27 etc. Therefore, the user can freely arrange the stamps along the trail by operating touch pen 27 etc.

If the user touches the screen with touch pen 27 etc. and moves touch pen 27 off the screen within prescribed distance D1 from the touch-on position, only one stamp is arranged. In addition, if the user moves touch pen 27 off the screen within prescribed distance D2 from the touch-on position, the stamp is displayed with its orientation being set in the initial state. In other words, if the user touches the screen and immediately moves the touch pen off the screen (moves the touch pen off the screen within prescribed distance D2 from the touch-on position), one stamp is displayed in the orientation in the initial state.

Thus, in game device 100 according to the present embodiment, variation of the coordinate value continuously input through the operation on touch panel 13 is detected, and at least one object is successively displayed in accordance with the trail on touch panel 13 corresponding to this variation of the coordinate value. Here, the orientation of each object is successively determined in accordance with the trail on touch panel 13. In addition, only one object can also be arranged, and that one object can be displayed in the orientation in the initial state or it can be displayed with its orientation being changed.

Referring again to FIG. 5, when "quit" icon 210 is selected, this processing for "graffiti camera" is stopped and the screen returns to the selection screen as shown in FIG. 4.

In addition, when a "capture" icon 212 is selected, a still image obtained by combining the image picked up by the camera at selected timing and objects OBJ2 to OBJ4 "graffiti"ed by the user is generated and stored in data memory 34 for storage (FIG. 2) or the like.

In addition, when a switch icon 214 is selected, the camera to be used for image pick-up is switched between inner camera 23 and outer camera 25.

<Detailed Processing for "Graffiti Camera">

Detailed processing for the "graffiti camera" according to the present embodiment will be described hereinafter with reference to FIGS. 12A to 12C, FIGS. 13A to 13C, FIGS. 14A to 14C, and FIGS. 15A to 15C. It is noted that examples shown in FIGS. 12A to 12C and FIGS. 14A to 14C illustrate processing for arranging objects OBJ21 and OBJ22 shown in FIGS. 9 and 10, and examples shown in FIGS. 13A to 13C and FIGS. 15A to 15C illustrate internal processing for arranging objects OBJ21 and OBJ22 shown in FIGS. 9 and 10.

Figure 12A:
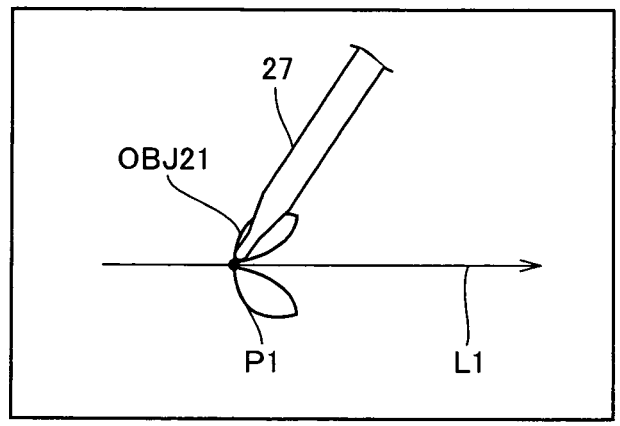
FIGS. 12A to 12C are diagrams (No. 1) for illustrating detailed processing for the "graffiti camera" according to the first embodiment of the present invention.

When the screen is touched with touch pen 27 etc., touch panel 13 (FIGS. 1 and 2) outputs touch position data indicating a coordinate of a position where input to the input surface was made. For example, when a first input point P1 is touched with touch pen 27 etc. (touch on) as shown in FIG. 12A, the touch position data indicating the coordinate of this first input point P1 is obtained.

Then, a reference line is calculated based on this first input point P1. In the example shown in FIG. 12A, a reference line L1 passing through first input point P1 and extending in parallel to a lateral direction on the sheet surface is employed. This reference line is for the sake of convenience for determining the orientation (initial value) of the stamp (object), and any line can be selected so long as it reflects the position of first input point P1. For example, a reference line passing through first input point P1 and extending in parallel to a vertical direction on the sheet surface may be employed.

Figure 13A:
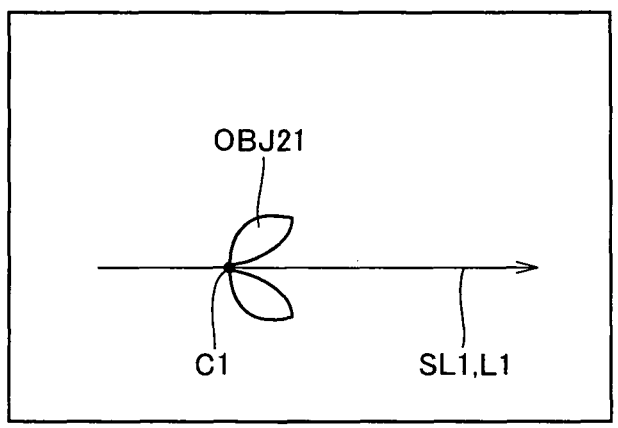
FIGS. 13A to 13C are diagrams for illustrating internal processing corresponding to the detailed processing shown in FIGS. 12A to 12C.
Figure 13B:
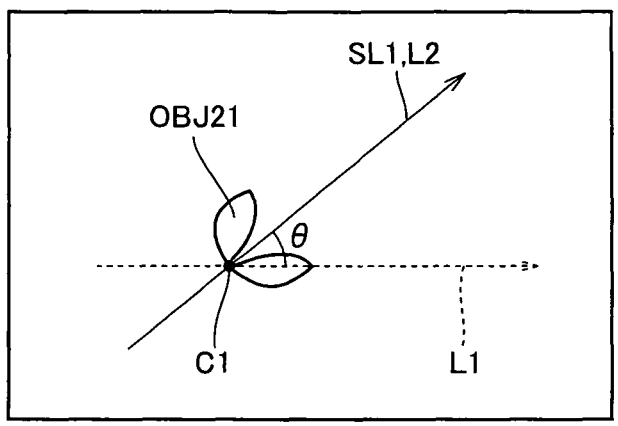

The first stamp is arranged at first input point P1. An angle reference line SL1 and a center point C1 are determined in advance for each stamp in accordance with a type thereof, as shown in FIG. 13A. In the example shown in FIG. 13A, object OBJ21 is arranged such that its center point C1 coincides with first input point P1 (the position of object OBJ21 is fixed at this time point). Here, as the initial value, object OBJ21 is arranged in such an orientation that angle reference line SL1 thereof coincides with reference line L1.

Figure 12B:
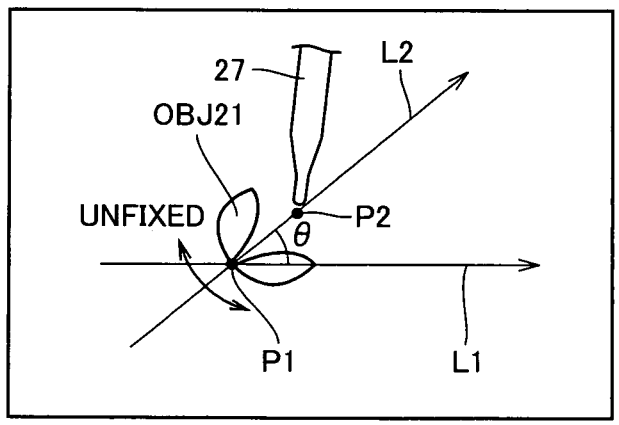

In addition, as shown in FIG. 12B, when touch pen 27 etc. moves to a second input point P2 while the touch state is maintained, a reference line L2 passing through first input point P1 and second input point P2 is calculated. This reference line L2 is updated in real time each time the coordinate value of the touch position data varies together with movement of touch pen 27 etc. Namely, reference line L2 varies in accordance with a most recent touch position until the orientation of object OBJ21 is fixed, and specifically, reference line L2 is updated cyclically to a line passing through center position C1 of arranged object OBJ21 and the most recent touch position. Together with calculation (update) of this reference line L2, as shown in FIG. 13A, the orientation of object OBJ21 is changed in real time such that angle reference line SL1 thereof coincides with the most recent reference line L2. Namely, object OBJ21 rotates around center point C1 from its initial orientation, by a magnitude of an angle θ formed by reference line L1 and angle reference line SL1. In this state shown in FIGS. 12B and 13A, the orientation of object OBJ21 is unfixed.

In this unfixed state, a distance (Euclidean distance) ΔL1 between second input point P2 and first input point P1 is calculated in real time, and a length of this calculated distance ΔL1 is compared with a prescribed threshold value Th1. Then, when distance ΔL1 exceeds prescribed threshold value Th1, the orientation of object OBJ21 is set to the fixed state.

Figure 12C:
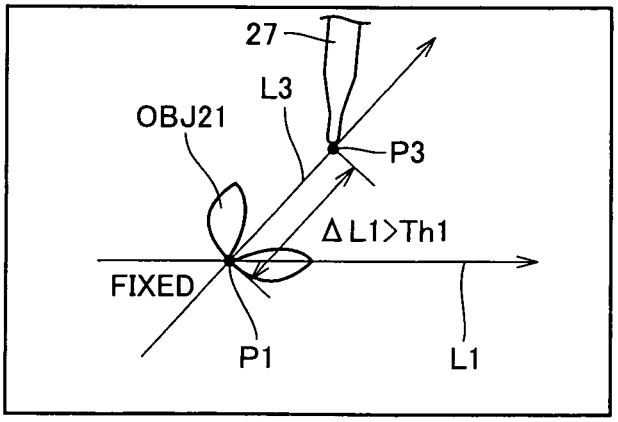
Figure 13C:
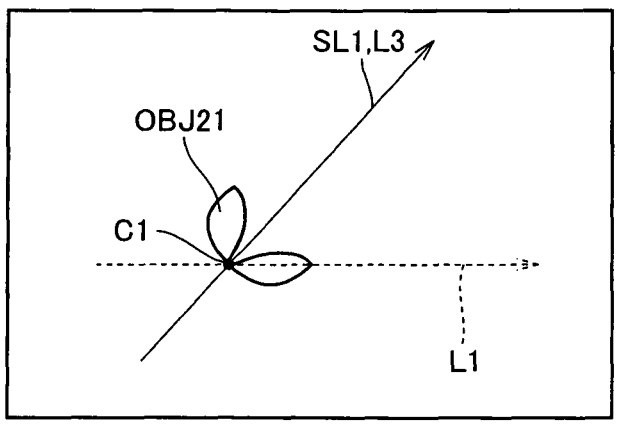

Specifically, as shown in FIG. 12C, when touch pen 27 etc. moves from first input point P1 to a third input point P3 while the touch state is maintained and it is determined that distance ΔL1 between first input point P1 and third input point P3 at this time exceeds prescribed threshold value Th1, the orientation of object OBJ21 is fixed. Namely, object OBJ21 is fixed in such an orientation that angle reference line SL1 thereof coincides with a reference line L3 passing through first input point P1 and third input point P3 as shown in FIG. 13C. In other words, the orientation of object OBJ21 makes transition from the unfixed state to the fixed state.

Here, such a condition that (1) duration of a touch operation with touch pen 27 etc. exceeds a prescribed period of time, (2) a touch operation with touch pen 27 etc. was performed in a region outside an effective range, (3) operation button 14A to 14H was selected, or (4) touch pen 27 etc. was moved off the screen may be used as a condition for transition from the unfixed state to the fixed state of the orientation of the object (corresponding to an orientation fix condition), instead of or in addition to the condition described above that length of distance ΔL1 exceeds prescribed threshold value Th1.

In accordance with the processing as above, the position of arrangement and the orientation of the first stamp are determined. Processing for arranging second and subsequent stamps will now be described.

When movement of touch pen 27 etc. from third input point P3 is continued while the touch state is maintained, new object OBJ22 is arranged simultaneously with or after transition to the fixed state of the orientation of object OBJ21.

It is noted that the condition for fixing the orientation of object OBJ21 may be the same as or different from the condition for arranging new object OBJ22 (corresponding to a second object display condition).

Figure 14A:
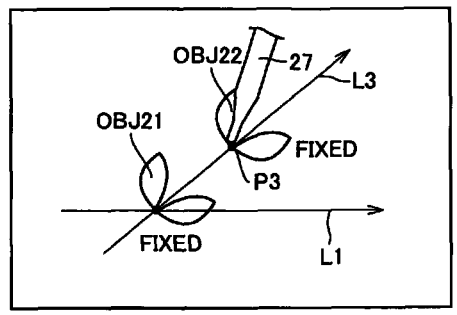
FIGS. 14A to 14C are diagrams (No. 2) for illustrating detailed processing for the "graffiti camera" according to the first embodiment of the present invention.

FIG. 14A shows a case where a next object is arranged simultaneously with transition of the preceding object to the fixed state. Specifically, as shown in FIG. 12C, when touch pen 27 etc. moves to third input point P3 while the touch state is maintained and the orientation of object OBJ21 makes transition to the fixed state, at the same time, the second stamp (object OBJ22) is arranged as shown in FIG. 14A.

Figure 15A:
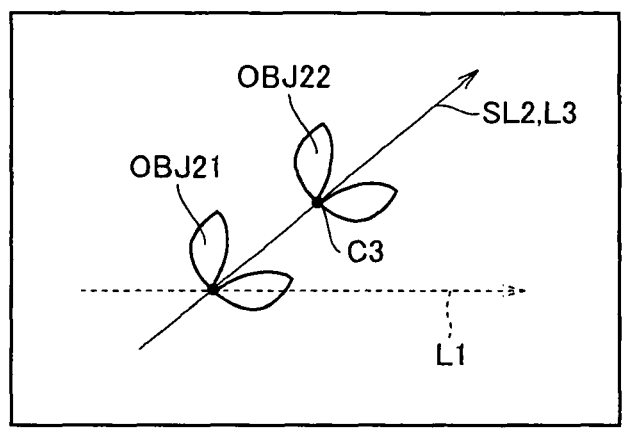
FIGS. 15A to 15C are diagrams for illustrating internal processing corresponding to the detailed processing shown in FIGS. 14A to 14C.

This object OBJ22 is arranged at a position in accordance with third input point P3 (a touch coordinate at the time when the condition for fixing the orientation of object OBJ21 is satisfied). In the example shown in FIGS. 14A and 15A, object OBJ22 is arranged such that a center point C2 thereof coincides with third input point P3 (at this time point, the position of object OBJ22 is fixed). It is noted that reference line L3 is a line passing through first input point P1 and third input point P3 (in this case, a straight line). In addition, as shown in FIG. 15A, object OBJ22 is arranged in such an orientation that an angle reference line SL2 thereof coincides with reference line L3.

Figure 14B:
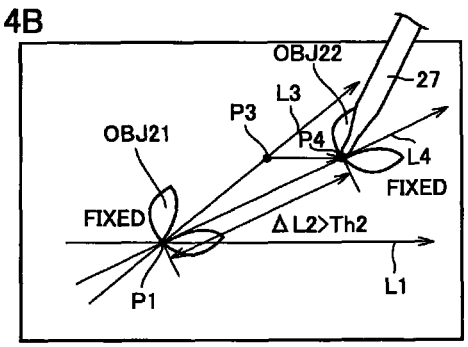

On the other hand, FIG. 14B shows a case where a next object is arranged after the preceding object made transition to the fixed state. In this case, also after transition of object OBJ21 to the fixed state, a distance ΔL2 between an input point resulting from movement of touch pen 27 etc. while the touch state is maintained and first input point P1 is calculated in real time and a length of this calculated distance ΔL2 is compared with a prescribed threshold value Th2. Here, threshold value Th2 is set to be greater than threshold value Th1 used for determining fixing of the orientation of object OBJ21.

Figure 15B:
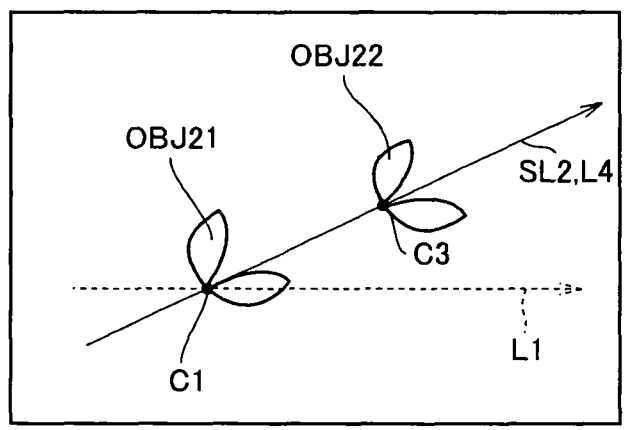

Then, as shown in FIG. 14B, touch pen 27 etc. moves to a fourth input point P4 while the touch state is maintained and when it is determined that distance ΔL2 between first input point P1 and fourth input point P4 at this time exceeds prescribed threshold value Th2, new object OBJ22 is arranged. Here, a reference line L4 passing through first input point P1 and fourth input point P4 is calculated, and object OBJ22 is arranged such that center point C2 thereof coincides with fourth input point P4 as shown in FIGS. 14B and 15B (the position of object OBJ22 is fixed at this time point). In addition, as shown in FIG. 15B, object OBJ22 is arranged in such an orientation that angle reference line SL2 thereof coincides with reference line L4 (the orientation of object OBJ is also fixed at this time point).

Further, whether a third object OBJ23 should be arranged or not is determined based on positional relation between an input point resulting from movement of touch pen 27 etc. maintained in the touch state also after arrangement of object OBJ22 and the input point at the timing of arrangement of second object OBJ22 (third input point P3 in the example shown in FIG. 14A, and third input point P4 in the example shown in FIG. 14B).

Figure 14C:
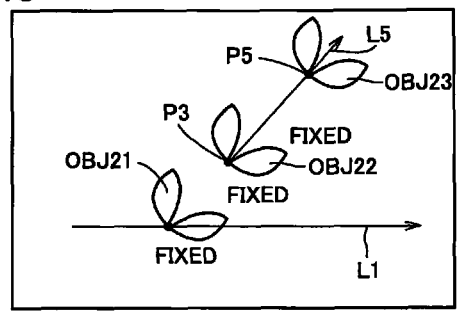
Figure 15C:
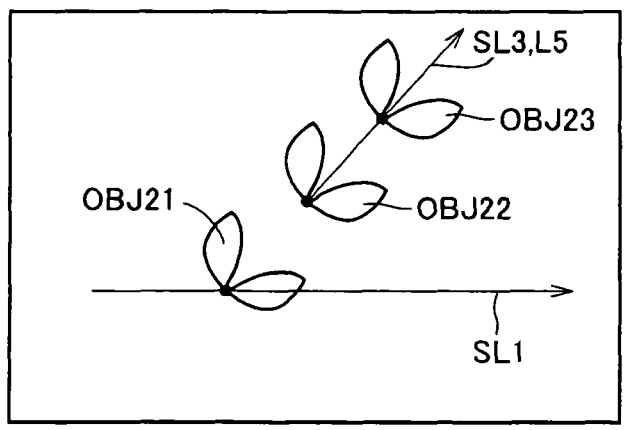

Namely, for example, as shown in FIG. 14A, assuming that second object OBJ22 is arranged at third input point P3, third object OBJ23 is arranged at a fifth input point P5 at the time point when touch pen 27 etc. maintained in the touch state reaches fifth input point P5 located at a position distant from third input point P3 by a distance exceeding threshold value Th1 (see FIG. 14C). Here, as shown in FIG. 15C, object OBJ23 is arranged in such an orientation that an angle reference line SL3 coincides with a reference line L5.

Alternatively, as shown in FIG. 14B, also in a case that second object OBJ22 is arranged at fourth input point P4, third object OBJ23 is arranged at a position distant from fourth input point P4 by a distance exceeding threshold value Th2 at the time point when touch pen 27 etc. reaches this position.

Similarly, second and subsequent objects OBJ are successively arranged as a result of movement of touch pen 27 etc. while the touch state is maintained.

Figure 16:
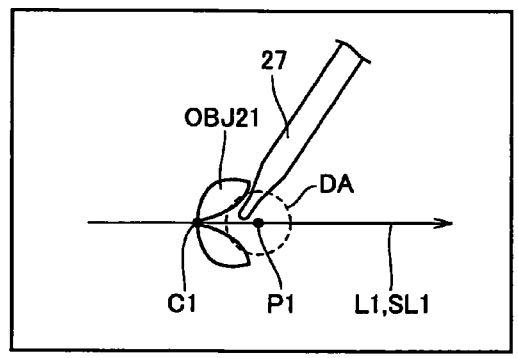
FIG. 16 is a diagram (No. 3) for illustrating detailed processing for the "graffiti camera" according to the first embodiment of the present invention.

In addition, in order to improve user operability, a dead area to some extent is preferably provided in changing the orientation of the object in the unfixed state. More specifically, as shown in FIG. 16, when the user touches first input point P1 with touch pen 27 etc. to arrange object OBJ21 and thereafter touch pen 27 etc. stays in the vicinity of first input point P1, the orientation of object OBJ21 (initial value) is maintained. Namely, when touch pen 27 etc. stays in a dead area DA around first input point P1, processing for changing the orientation of object OBJ21 in real time as described above is not performed. Then, processing for changing the orientation of object OBJ21 is started only after touch pen 27 etc. moves out of dead area DA while the touch state is maintained.

As described above, though the object in the unfixed state makes transition to the fixed state when the user moves touch pen 27 etc. off the screen, the obtained position of touch pen 27 etc. may slightly be varied at this time. By providing the dead area, change in the orientation of the object due to such an unintended user's operation can be suppressed. For example, it is effective when a single object is to be arranged in the orientation in the initial state.

In the description above, such a configuration that objects OBJ21, OBJ22, . . . are displayed at positions corresponding to first input point P1, second input point P2, . . . respectively has been illustrated, however, objects OBJ21, OBJ22, . . . may be displayed at positions distant from first input point P1, second input point P2, . . . by a prescribed distance in a prescribed direction, respectively.

<Rendering Processing>

As described above, in game device 100 according to the present embodiment, the image picked up by the camera is displayed in real time and the orientation of the object in the unfixed state is also changed in real time in accordance with the position of operation input made with touch pen 27 etc. Therefore, rendering processing for achieving such image display will be described with reference to FIG. 17.

Figure 17:
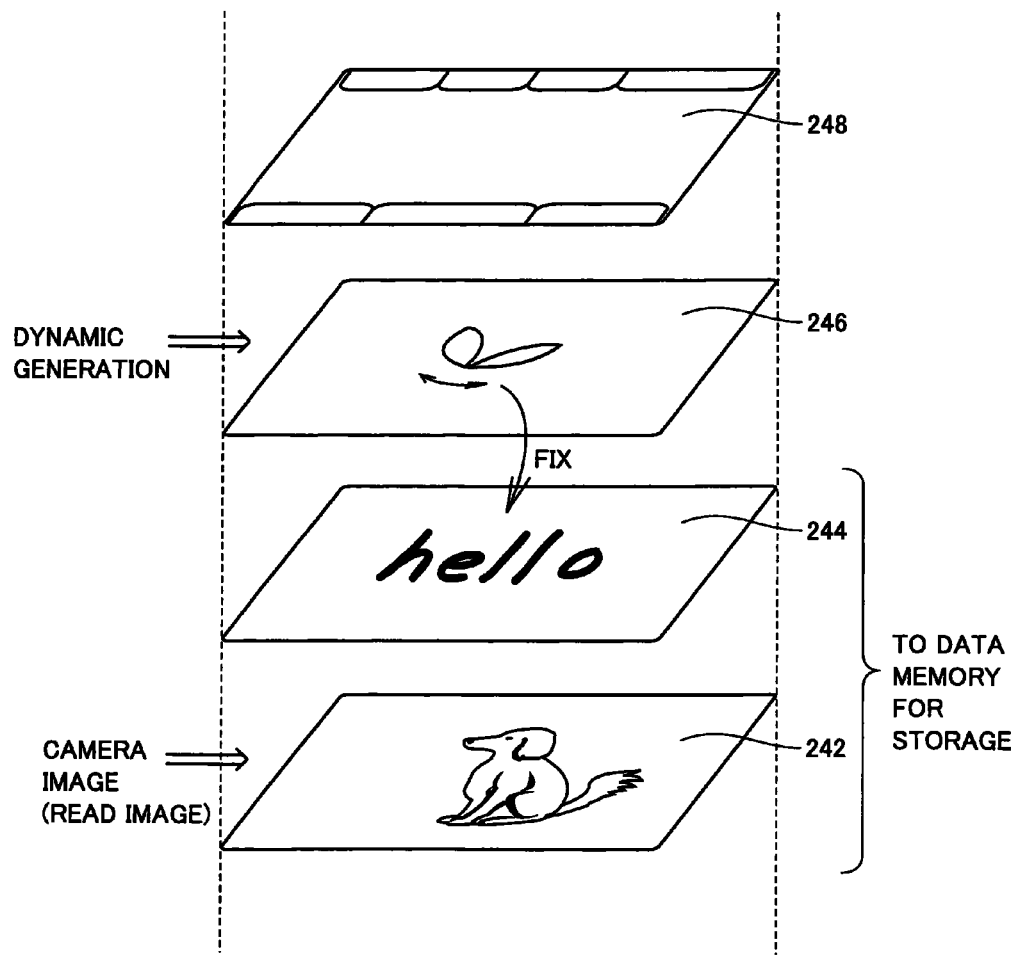
FIG. 17 is a schematic diagram for illustrating rendering processing of the game device according to the first embodiment of the present invention.

FIG. 17 is a schematic diagram for illustrating rendering processing for game device 100 according to the first embodiment of the present invention. Referring to FIG. 17, in game device 100 according to the present embodiment, four layers 242, 244, 246, and 248 are used to generate a video image signal for display on the screen. It is noted that each of layers 242, 244, 246, and 248 is implemented by forming a memory area having a capacity comparable to resolution of at least lower LCD 12 in main memory 32.

A first layer 242 is a memory area for displaying an image picked by the camera (still image or moving image) or an image read from memory card 28 (FIG. 2) or the like (still image or moving image). CPU 31 (FIG. 2) develops the image input from any of inner camera 23, outer camera 25 and memory card 28, and writes the image in an area corresponding to first layer 242 within main memory 32. When the still image is input, the image should only be developed to raster data for writing. On the other hand, when the moving image is input, in order to improve a real time characteristic of display, rendering may be carried out, for example, by using polygon processing.

A second layer 244 is a memory area for displaying an object arranged as a result of "graffiti" by the user. CPU 31 reads character data or raster data of the object arranged in accordance with the user's operation from memory card 29 or the like, and writes the data in an area corresponding to second layer 244 within main memory 32. As will be described later, since the data of the object in the unfixed state is subjected to rendering in a third layer 246, data only on the object that made transition to the fixed state is written in second layer 244.

Third layer 246 is a memory area for displaying an object in the unfixed state. The data for displaying the stamp described above is stored in advance in memory card 29 representatively as polygon data. CPU 31 reads the polygon data of a necessary stamp in accordance with the user's operation, and calculates in real time a coordinate value of each polygon forming the stamp. Then, CPU 31 writes a result of rendering with the calculated polygon into an area corresponding to third layer 246 within main memory 32.

In addition, when the object in the unfixed state makes transition to the fixed state, CPU 31 transfers image data on third layer 246 at that time to a corresponding position of second layer 244. Namely, regarding the object in the unfixed state, the image thereof is dynamically generated by using the polygon processing, however, when the object makes transition to the fixed state and display thereof is no longer changed, data for displaying that object is stored in second layer 244.

A fourth layer 248 is a memory area for displaying an icon for accepting the user's operation. CPU 31 writes data for displaying a necessary icon in an area corresponding to fourth layer 248 within main memory 32, in accordance with a function or an operation mode selected by the user's operation.

An image obtained by combining data stored in these layers 242, 244, 246, and 248 is displayed on the screen. In each of layers 242, 244, 246, and 248, only a pixel of which data to be displayed exists is handled as effective, and a pixel of which data to be displayed does not exist is handled as transparent, so to speak. Therefore, regarding the pixel handled as transparent in a certain layer, data of a corresponding pixel in a lower layer is displayed on the screen.

In addition, when "capture" icon 212 (FIG. 5) is selected, CPU 31 generates a combined image based on data stored in first layer 242 and second layer 244 and causes data memory 34 for storage (FIG. 2) or the like to store this generated combined image.

<Input Range>

Figure 18:
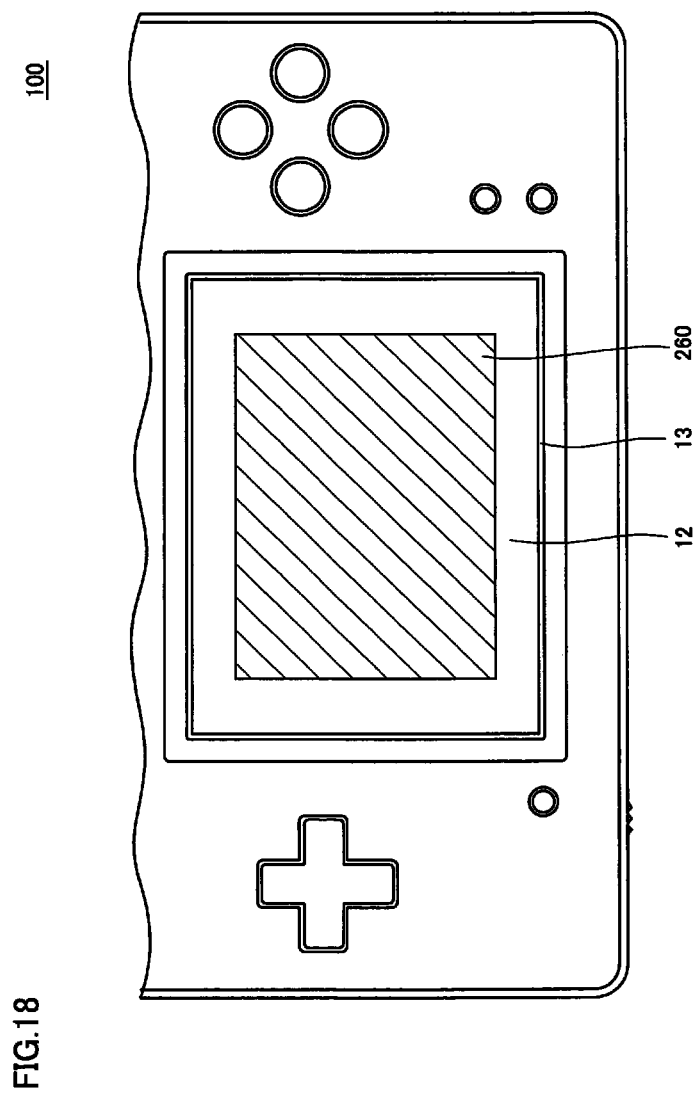
FIG. 18 is a schematic diagram for illustrating an effective range of the game device according to the first embodiment of the present invention.

In addition, a range that can accept a user input may be limited to a part of the input surface of touch panel 13. For example, as shown in FIG. 18, in the "graffiti camera" according to the present embodiment, an effective range 260 for a user's operation input with touch pen 27 etc. may be determined in advance in the processing for arranging the stamp. By determining such effective range 260, "graffiti" of an object over an icon for accepting the user's operation can be suppressed.

Further, as described above, determination as to whether the operation input with touch pen 27 etc. is made within effective range 260 or not may be included as a condition for transition of the object in the unfixed state to the fixed state. Specifically, when the operation input with touch pen 27 etc. moves out of effective range 260 while any object is in the unfixed state, the object makes transition to the fixed state.

<Processing Procedure>

A processing procedure relating to the "graffiti camera" according to the present embodiment described above will be described hereinafter with reference to FIGS. 19 to 25. Each step shown in FIGS. 19 to 25 is implemented representatively by reading of a program or the like stored in memory card 29 to main memory 32 and execution thereof by CPU 31.

(1. Function Selection Processing)

Figure 19:
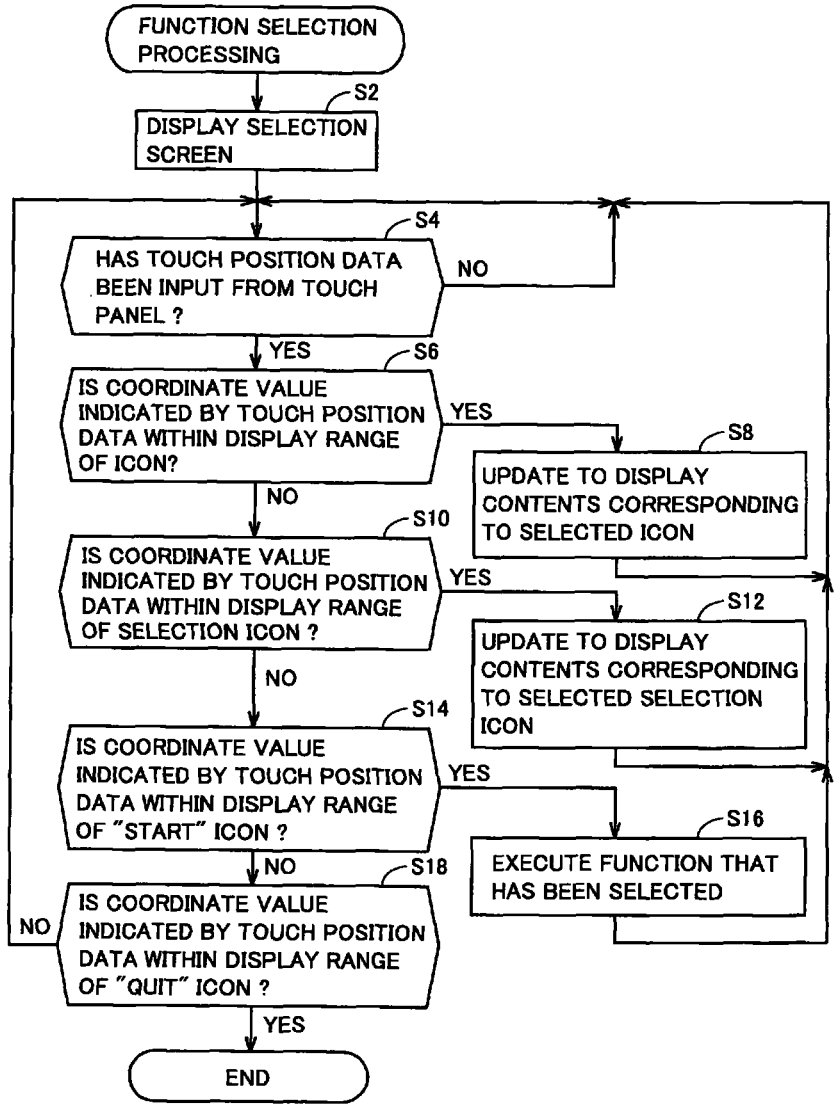
FIG. 19 is a flowchart showing processing relating to function selection in the game device according to the first embodiment of the present invention.

FIG. 19 is a flowchart showing processing relating to function selection in game device 100 according to the first embodiment of the present invention. Processing relating to function selection shown in FIG. 19 is performed by selection of a prescribed icon in a not-shown menu screen by the user, following turn-on of power of game device 100 or pressing of a start button.

Referring to FIG. 19, in step S2, CPU 31 causes a selection screen as shown in FIG. 4 to be displayed on lower LCD 12. In successive step S4, CPU 31 determines whether the touch position data has been input from touch panel 13 through I/F circuit 42 or not. Namely, CPU 31 determines whether a touch operation with touch pen 27 etc. by the user has been performed or not. When the touch position data has not been input (NO in step S4), the processing in step S4 is repeated. On the other hand, when the touch position data has been input (YES in step S4), the process proceeds to step S6.

In step S6, CPU 31 determines whether the coordinate value indicated by the touch position data is within a display range of any icon 150 or not. Namely, CPU 31 determines whether any of icons 150 has been selected or not. Then, when the coordinate value indicated by the touch position data is within the display range of any icon 150 (YES in step S6), the process proceeds to step S8. On the other hand, when the coordinate value indicated by the touch position data is out of the display range of any icon 150 (NO in step S6), the process proceeds to step S10.

In step S8, CPU 31 updates the selection screen that is being displayed to display contents corresponding to selected icon 150. Namely, for example, when the function of the "graffiti camera" is selected as shown in FIG. 4, preview display of the name such as the "graffiti camera" and contents of each processing is provided. Then, the process returns to step S4.

In step S10, CPU 31 determines whether the coordinate value indicated by the touch position data is within a display range of selection icon 152 or 154 or not. Namely, CPU 31 determines whether selection icon 152 or 154 has been selected or not. Then, when the coordinate value indicated by the touch position data is within the display range of selection icon 152 or 154 (YES in step S10), the process proceeds to step S12. On the other hand, when the coordinate value indicated by the touch position data is out of the display range of selection icons 152 and 154 (NO in step S10), the process proceeds to step S14.

In step S12, CPU 31 updates the selection screen that is being displayed to display contents corresponding to selected selection icon 152 or 154. Then, the process returns to step S4.

In step S14, CPU 31 determines whether the coordinate value indicated by the touch position data is within a display range of "start" icon 158 or not. Namely, CPU 31 determines whether "start" icon 158 has been selected or not. Then, when the coordinate value indicated by the touch position data is within the display range of "start" icon 158 (YES in step S14), the process proceeds to step S16. On the other hand, when the coordinate value indicated by the touch position data is out of the display range of "start" icon 158 (NO in step S14), the process proceeds to step S18.

In step S16, CPU 31 performs the function that has been selected. Here, when the "graffiti camera" is selected, CPU 31 performs the processing in accordance with the flowcharts shown in FIGS. 20 and 21.

In step S18, CPU 31 determines whether the coordinate value indicated by the touch position data is within a display range of "quit" icon 156 or not. Namely, CPU 31 determines whether "quit" icon 156 has been selected or not. Then, when the coordinate value indicated by the touch position data is within the display range of "quit" icon 156 (YES in step S18), the process ends. On the other hand, when the coordinate value indicated by the touch position data is out of the display range of "quit" icon 156 (NO in step S18), the process returns to step S4.

(2. "Graffiti Camera" Sub Routine)

Figure 20:
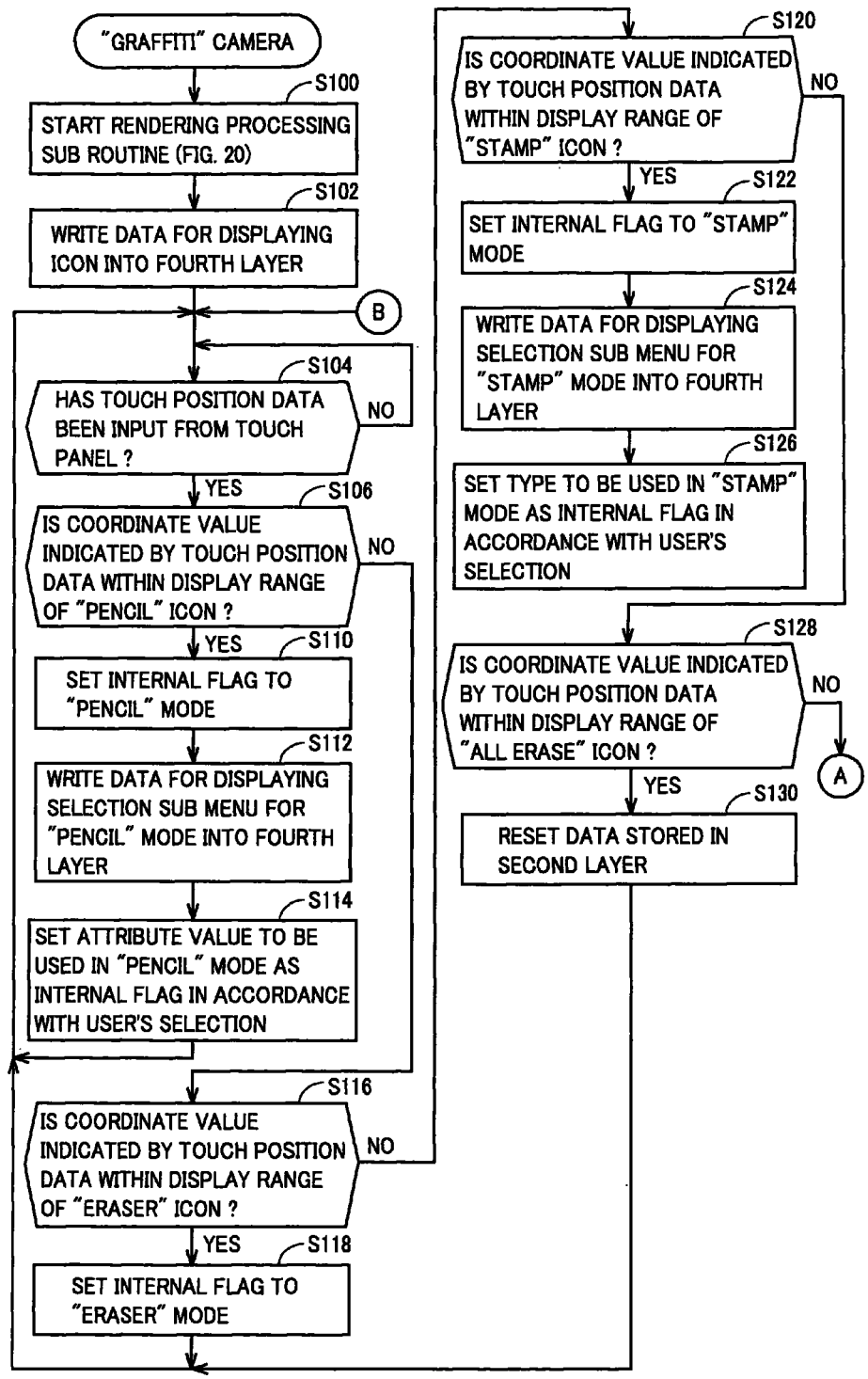
FIG. 20 is a flowchart (No. 1) showing sub routine processing performed when the "graffiti camera" is selected in step S16 shown in FIG. 19.
Figure 21:
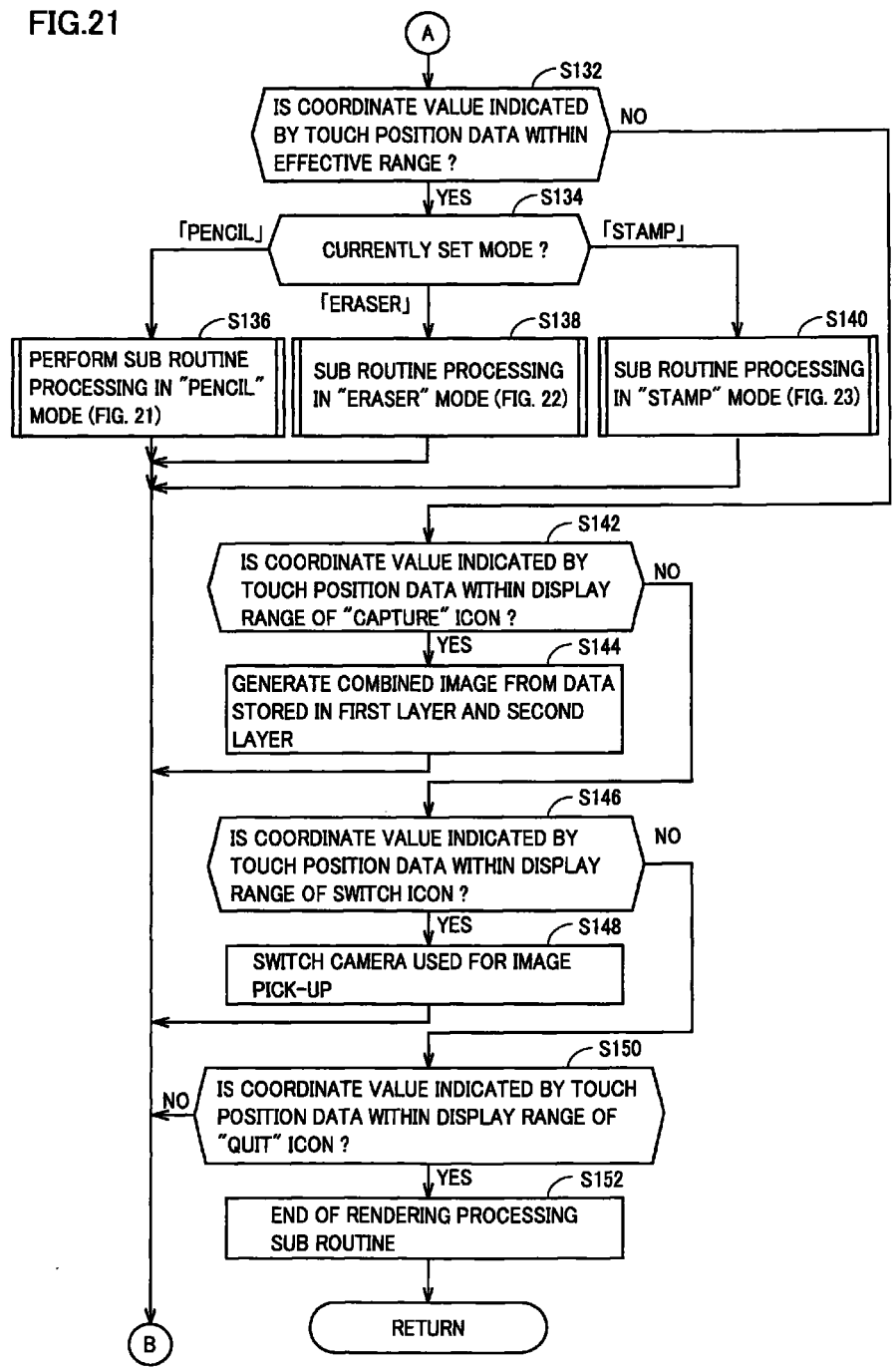
FIG. 21 is a flowchart (No. 2) showing sub routine processing performed when the "graffiti camera" is selected in step S16 shown in FIG. 19.

FIGS. 20 and 21 are flowcharts showing sub routine processing performed when the "graffiti camera" is selected in step S16 shown in FIG. 19.

Figure 22:
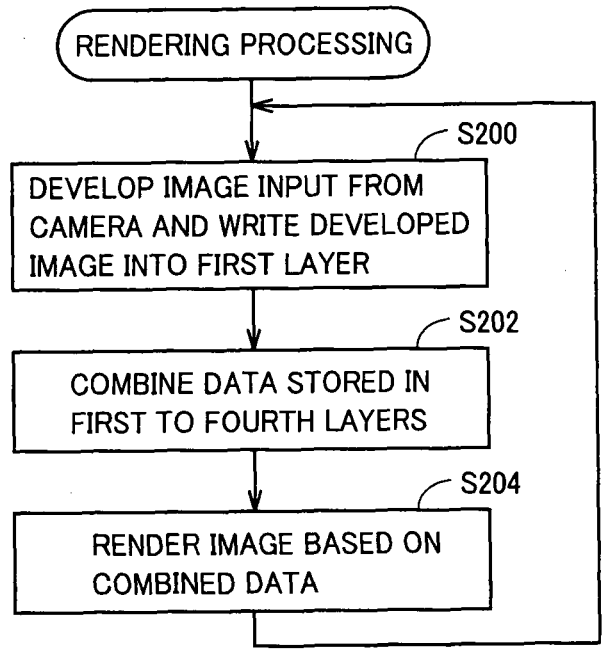
FIG. 22 is a flowchart showing rendering processing sub routine processing of which execution is started in step S100 shown in FIG. 20.

Referring to FIG. 20, initially, in step S100, CPU 31 starts the rendering processing sub routine shown in FIG. 22. This rendering processing sub routine is processing for displaying a screen for "graffiti camera" as shown in FIGS. 6 to 11. The processing procedure shown in FIG. 22 is repeatedly performed in a prescribed cycle, independently of the processing shown in FIGS. 20 and 21.

In successive step S102, CPU 31 writes data for displaying icons 202 to 214 shown in FIG. 5 into the area corresponding to fourth layer 248 within main memory 32. Namely, CPU 31 causes an icon for accepting the user's operation to be displayed on lower LCD 12.

In successive step S104, CPU 31 determines whether the touch position data has been input from touch panel 13 through I/F circuit 42 or not. Namely, CPU 31 determines whether a touch operation with touch pen 27 etc. by the user has been performed or not. In other words, CPU 31 determines whether the coordinate value input through the user's operation of touch panel 13 is detected or not. When the touch position data has not been input (NO in step S104), the processing in step S104 is repeated. On the other hand, when the touch position data has been input (YES in step S104), the process proceeds to step S106.

In step S106, CPU 31 determines whether the coordinate value indicated by the touch position data is within a display range of "pencil" icon 202 or not. Namely, CPU 31 determines whether "pencil" icon 202 has been selected or not. Then, when the coordinate value indicated by the touch position data is within the display range of "pencil" icon 202 (YES in step S106), the process proceeds to step S110. On the other hand, when the coordinate value indicated by the touch position data is out of the display range of "pencil" icon 202 (NO in step S106), the process proceeds to step S116.

In step S110, CPU 31 sets an internal flag to the "pencil" mode. In successive step S112, CPU 3.1 writes data for displaying a selection sub menu for the "pencil" mode into the area corresponding to fourth layer 248 within main memory 32. Namely, CPU 31 causes a sub menu for selecting an attribute (thickness and color of a line, and the like) in the "pencil" mode to be displayed on lower LCD 12. In addition, in step S114, CPU 31 sets an attribute value to be used in the "pencil" mode as the internal flag in response to user's selection. Then, the process returns to step S104.

In step S116, CPU 31 determines whether the coordinate value indicated by the touch position data is within a display range of "eraser" icon 204 or not. Namely, CPU 31 determines whether "eraser" icon 204 has been selected or not. Then, when the coordinate value indicated by the touch position data is within the display range of "eraser" icon 204 (YES in step S116), the process proceeds to step S118. On the other hand, when the coordinate value indicated by the touch position data is out of the display range of "eraser" icon 204 (NO in step S116), the process proceeds to step S120.

In step S118, CPU 31 sets the internal flag to the "eraser" mode. Then, the process returns to step S104.

In step S120, CPU 31 determines whether the coordinate value indicated by the touch position data is within a display range of "stamp" icon 206 or not. Namely, CPU 31 determines whether "stamp" icon 206 has been selected or not. Then, when the coordinate value indicated by the touch position data is within the display range of "stamp" icon 206 (YES in step S120), the process proceeds to step S122. On the other hand, when the coordinate value indicated by the touch position data is out of the display range of "stamp" icon 206 (NO in step S120), the process proceeds to step S128.

In step S122, CPU 31 sets the internal flag to the "stamp" mode. In successive step S124, CPU 31 writes data for displaying a selection sub menu for the "stamp" mode into the area corresponding to fourth layer 248 within main memory 32. Namely, CPU 31 causes a sub menu for selecting an attribute (a type of a stamp, and the like) in the "stamp" mode as shown in FIG. 6 to be displayed on lower LCD 12. In addition, in step S126, CPU 31 sets a type to be used in the "stamp" mode as the internal flag in response to user's selection. Then, the process returns to step S104.

In step S128, CPU 31 determines whether the coordinate value indicated by the touch position data is within a display range of "all erase" icon 208 or not. Namely, CPU 31 determines whether "all erase" icon 208 has been selected or not. Then, when the coordinate value indicated by the touch position data is within the display range of "all erase" icon 208 (YES in step S128), the process proceeds to step S130. On the other hand, when the coordinate value indicated by the touch position data is out of the display range of "all erase" icon 208 (NO in step S128), the process proceeds to step S132 (FIG. 21).

In step S130, CPU 31 resets (clears to zero) the data stored in second layer 244 within main memory 32. Namely, CPU 31 erases all objects arranged as a result of "graffiti" done by the user.

In step S132, CPU 31 determines whether the coordinate value indicated by the touch position data is within effective range 260 (FIG. 18) or not. Namely, CPU 31 determines whether the user has performed the "graffiti" operation or not. Then, when the coordinate value indicated by the touch position data is within effective range 206 (YES in step S132), the process proceeds to step S134. On the other hand, when the coordinate value indicated by the touch position data is out of effective range 260 (NO in step S132), the process proceeds to step S142.

In step S134, CPU 31 determines a currently set mode by referring to the internal flag. Namely, CPU 31 determines which of "pencil" icon 202, "eraser" icon 204 and "stamp" icon 206 is selected by the immediately preceding user's operation. Then, when the currently set mode is the "pencil" mode ("pencil" in step S134), the process proceeds to step S136 and the sub routine processing in the "pencil" mode (FIG. 23) is performed. Alternatively, when the currently set mode is the "eraser" mode ("eraser" in step S134), the process proceeds to step S138 and the sub routine processing in the "eraser" mode (FIG. 24) is performed. Alternatively, when the currently set mode is the "stamp" mode ("stamp" in step S134), the process proceeds to step S140 and the sub routine processing in the "stamp" mode (FIG. 25) is performed.

On the other hand, in step S142, CPU 31 determines whether the coordinate value indicated by the touch position data is within a display range of "capture" icon 212 or not. Namely, CPU 31 determines whether "capture" icon 212 has been selected or not. Then, when the coordinate value indicated by the touch position data is within the display range of "capture" icon 212 (YES in step S142), the process proceeds to step S144. On the other hand, when the coordinate value indicated by the touch position data is out of the display range of "capture" icon 212 (NO in step S142), the process proceeds to step S146.

In step S144, CPU 31 reads data stored in areas corresponding to first layer 242 and second layer 244 within main memory 32 and generates a combined image. In addition, CPU 31 writes the combined image into data memory 34 for storage or the like. Then, the process returns to step S104.

In step S146, CPU 31 determines whether the coordinate value indicated by the touch position data is within a display range of switch icon 214 or not. Namely, CPU 31 determines whether switch icon 214 has been selected or not. Then, when the coordinate value indicated by the touch position data is within the display range of switch icon 214 (YES in step S146), the process proceeds to step S148. On the other hand, when the coordinate value indicated by the touch position data is out of the display range of switch icon 214 (NO in step S146), the process proceeds to step S150.

In step S148, CPU 31 switches the camera to be used for image pick-up between inner camera 23 and outer camera 25. Namely, CPU 31 switches a source of an image input to first layer 242 within main memory 32 between inner camera 23 and outer camera 25. Then, the process returns to step S104.

In step S150, CPU 31 determines whether the coordinate value indicated by the touch position data is within a display range of "quit" icon 210 or not. Namely, CPU 31 determines whether "quit" icon 210 has been selected or not. Then, when the coordinate value indicated by the touch position data is within the display range of "quit" icon 210 (YES in step S150), CPU 31 ends the rendering processing sub routine (step S152) shown in FIG. 22 and thereafter this process ends. On the other hand, when the coordinate value indicated by the touch position data is out of the display range of "quit" icon 210 (NO in step S150), the process returns to step S104.

(3. Rendering Processing Sub Routine)

FIG. 22 is a flowchart showing rendering processing sub routine processing of which execution is started in step S100 shown in FIG. 20.

Referring to FIG. 22, in step S200, CPU 31 develops the image input from the selected camera (inner camera 23 or outer camera 25) and writes the image into the area corresponding to first layer 242 within main memory 32. Namely, CPU 31 updates the image picked up by the camera.

In successive step S202, CPU 31 combines data stored in first layer 242, second layer 244, third layer 246, and fourth layer 248. It is noted that the data stored in second layer 244, third layer 246, and fourth layer 248 is updated cyclically along with execution of the sub routine processing shown in FIGS. 20 and 21 or each sub routine processing shown in FIGS. 23 to 25 which will be described later.

In further successive step S204, CPU 31 renders the image in lower LCD 12 based on the combined data. Then, the process returns to step S200.

Execution of the sub routine processing shown in FIG. 22 above is started in step S100 shown in FIG. 20 and execution thereof ends in step S152 shown in FIG. 21.

(4. "Pencil" Mode Processing Sub Routine)

Figure 23:
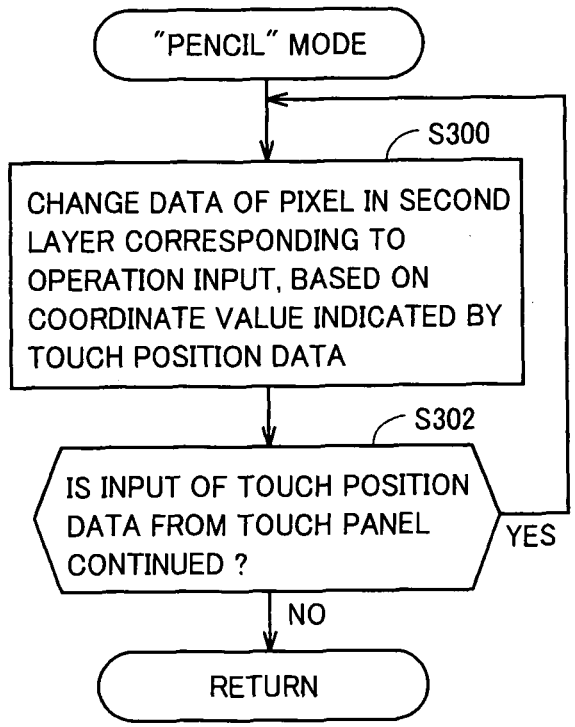
FIG. 23 is a flowchart showing sub routine processing in a "pencil" mode performed in step S136 shown in FIG. 21.

FIG. 23 is a flowchart showing sub routine processing in the "pencil" mode performed in step S136 shown in FIG. 21.

Referring to FIG. 23, in step S300, CPU 31 changes the data of the pixel in second layer 244 within main memory 32 that corresponds to the user's operation input, in accordance with a set value of the internal flag, based on the coordinate value indicated by the touch position data. Namely, CPU 31 adds data indicating the "graffiti" object to second layer 244 in accordance with the attribute value used in the "pencil" mode set in step S114 in FIG. 20.

In successive step S302, CPU 31 determines whether input of the touch position data from touch panel 13 through I/F circuit 42 is continued or not. Namely, CPU 31 determines whether the touch operation by the user with touch pen 27 etc. is continued or not. When the input of the touch position data is continued (YES in step S302), the processing in step S300 is repeated. On the other hand, when the input of the touch position data is no longer continued (NO in step S302), the process returns to step S104 in FIG. 20.

(5. "Eraser" Mode Processing Sub Routine)

Figure 24:
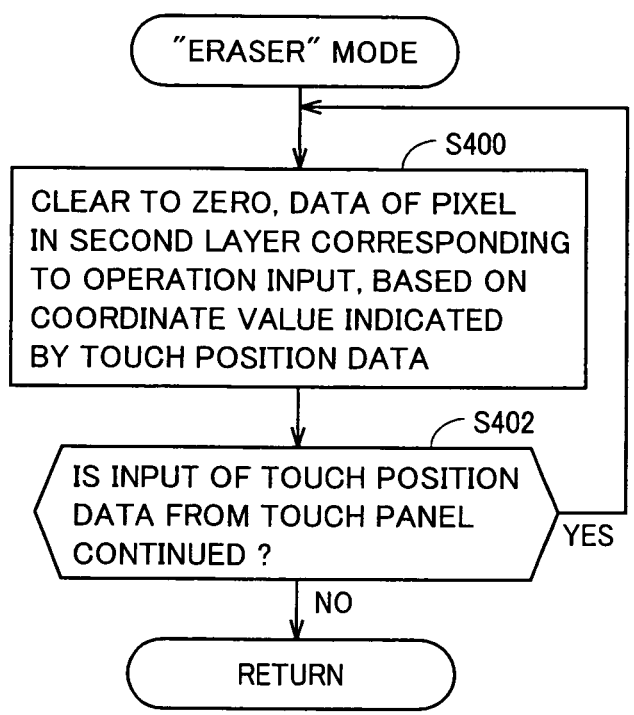
FIG. 24 is a flowchart showing sub routine processing in an "eraser" mode performed in step S138 shown in FIG. 21.

FIG. 24 is a flowchart showing sub routine processing in the "eraser" mode performed in step S138 shown in FIG. 21.

Referring to FIG. 24, in step S400, CPU 31 clears to zero, the data of the pixel in second layer 244 within main memory 32 that corresponds to the user's operation input, based on the coordinate value indicated by the touch position data. Namely, CPU 31 erases a part of the already arranged object, corresponding to a portion of the screen that is touched by the user with touch pen 27 etc.

In successive step S402, CPU 31 determines whether input of the touch position data from touch panel 13 through I/F circuit 42 is continued or not. Namely, CPU 31 determines whether the touch operation by the user with touch pen 27 etc. is continued or not. When the input of the touch position data is continued (YES in step S402), the processing in step S400 is repeated. On the other hand, when the input of the touch position data is no longer continued (NO in step S402), the process returns to step S104 in FIG. 20.

(6. "Stamp" Mode Processing Sub Routine)

FIG. 25 is a flowchart showing sub routine processing in the "stamp" mode performed in step S140 shown in FIG. 21.

Referring to FIG. 25, in step S500, CPU 31 initializes (clears to zero) a first coordinate value and a second coordinate value that are internal variables. In successive step S502, CPU 31 sets the coordinate value indicated by the touch position data as the first coordinate value. Namely, the first coordinate value among detected coordinate values is obtained. Here, a coordinate value immediately after start of detection of the coordinate value (that is, a touch-on coordinate) is regarded as the first coordinate value. Then, the process proceeds to step S504.

In step S504, CPU 31 calculates the reference line passing through the first coordinate value set in step S502. In successive step S506, CPU 31 specifies an object of a stamp of a type selected in step S126 in FIG. 20 by referring to the internal flag and reads data for displaying the selected stamp (representatively, the polygon data) from memory card 29. In further successive step S508, CPU 31 writes into the area corresponding to third layer 246 within main memory 32, a result of rendering such that the selected stamp is arranged at a position with reference to the first coordinate value and in the orientation in accordance with the reference line. Namely, in steps S506 and S508, processing for displaying the stamp (object) at the corresponding position in lower LCD 12 based on the first coordinate value is performed. Then, the process proceeds to step S510.

In step S510, CPU 31 determines whether input of the touch position data from touch panel 13 through I/F circuit 42 is continued or not. Namely, CPU 31 determines whether the touch operation by the user with touch pen 27 etc. is continued or not. In other words, whether detection of the coordinate value is continued or not is determined. When the input of the touch position data is continued (YES in step S510), the process proceeds to step S512.

On the other hand, when the input of the touch position data is no longer continued (NO in step S510), the process proceeds to step S522. Namely, on the condition that detection of the coordinate value is discontinued after the first coordinate value is obtained, the processing for setting the object in the unfixed state to the fixed state shown in step S522 is performed as will be described later.

In step S512, CPU 31 sets the coordinate value indicated by the current touch position data as the second coordinate value. Namely, the second coordinate value subsequent to the first coordinate value among the detected coordinate values is obtained. In successive step S514, CPU 31 determines whether a distance between the first coordinate value and the second coordinate value is greater than the threshold value indicating the dead area or not. Namely, whether the coordinate value input while the coordinate value is successively detected satisfies a first condition (corresponding to an orientation change condition) or not is determined. When the distance between the first coordinate value and the second coordinate value is not greater than the threshold value indicating the dead area (NO in step S514), the processing in step S510 and subsequent steps is repeated.

On the other hand, when the distance between the first coordinate value and the second coordinate value is greater than the threshold value indicating the dead area (YES in step S514), the process proceeds to step S516. Through these processes, the coordinate value determined as satisfying the first condition is regarded as the effective second coordinate value.

In step S516, CPU 31 calculates the reference line passing through the first coordinate value and the second coordinate value. In successive step S518, CPU 31 updates the area corresponding to third layer 246 within main memory 32 with a result of rendering such that the arranged stamp is in the orientation in accordance with the reference line newly calculated in step S516. Namely, the orientation of the object displayed on lower LCD 12 is changed. Here, the orientation of the object is determined based on a line passing through the first coordinate value and the second coordinate value. Then, the process proceeds to step S520.

In step S520, CPU 31 determines whether the distance between the first coordinate value and the second coordinate value is greater than prescribed threshold value Th1 or not. Namely, CPU 31 determines whether the condition for transition of the object in the unfixed state to the fixed state is satisfied or not. When the distance between the first coordinate value and the second coordinate value is greater than threshold value Th1 (YES in step S520), the process proceeds to step S522.

On the other hand, when the distance between the first coordinate value and the second coordinate value is not greater than prescribed threshold value Th1 (NO in step S520), processing in step S510 and subsequent steps is repeated. Namely, the step of obtaining the second coordinate value and the step of changing the orientation of the object are repeated while detection of the coordinate value is continued. Thus, the orientation of the object is changed cyclically each time the second coordinate value is updated, until the condition for transition of the object in the unfixed state to the fixed state is satisfied.

In step S522, CPU 31 writes the data stored in the area corresponding to third layer 246 within main memory 32 into the area corresponding to second layer 244 within main memory 32 and clears to zero the area corresponding to third layer 246. Namely, CPU 31 causes the object in the unfixed state to make transition to the fixed state. Thus, when the condition for transition of the object in the unfixed state to the fixed state is satisfied, the orientation of the object is held.

After the condition for causing transition to the fixed state is satisfied, the orientation of the first object remains fixed regardless of the subsequent second coordinate value.

In successive step S524, CPU 31 determines whether input of the touch position data from touch panel 13 through I/F circuit 42 is continued or not. Namely, CPU 31 determines whether the touch operation by the user with touch pen 27 etc. is continued or not. When the input of the touch position data is continued (YES in step S524), the process proceeds to step S526. On the other hand, when the input of the touch position data is no longer continued (NO in step S524), the process returns to step S104 in FIG. 20.

In step S526, CPU 31 writes into the area corresponding to second layer 244 within main memory 32, a result of rendering such that the new stamp is arranged at a position with reference to the second coordinate value (typically, the position of the second coordinate value) and in the orientation in accordance with the reference line newly calculated in step S516. Namely, a further object is displayed on lower LCD 12 in accordance with variation of the input coordinate value. It is noted that a further object may be displayed also when operation button 14A to 14H is selected.

In successive step S528, CPU 31 sets the coordinate value indicated by the touch position data as the first coordinate value. Namely, the touch position data serving as the reference for the new stamp is regarded as the new first coordinate value. Then, the process proceeds to step S530.

In step S530, CPU 31 determines whether input of the touch position data from touch panel 13 through I/F circuit 42 is continued or not. Namely, CPU 31 determines whether the touch operation by the user with touch pen 27 etc. is continued or not. When the input of the touch position data is continued (YES in step S530), the process proceeds to step S532. On the other hand, when the input of the touch position data is no longer continued (NO in step S530), the process returns to step S104 in FIG. 20.

In step S532, CPU 31 sets the coordinate value indicated by the current touch position data as the second coordinate value. In successive step S534, CPU 31 determines whether the distance between the first coordinate value and the second coordinate value is greater than prescribed threshold value Th1 or not. Namely, CPU 31 determines whether or not the coordinate value input while the coordinate value is successively detected satisfies a third condition for determining whether a further new object should be arranged or not.

When the distance between the first coordinate value and the second coordinate value is greater than threshold value Th1 (YES in step S534), the process proceeds to step S536. On the other hand, when the distance between the first coordinate value and the second coordinate value is not greater than threshold value Th1 (NO in step S534), the processing in step S532 and subsequent step is repeated.

In step S536, the reference line passing through the first coordinate value and the second coordinate value is calculated. In successive step S538, CPU 31 writes into the area corresponding to second layer 244 within main memory 32, a result of rendering such that the further new stamp is arranged at a position with reference to the second coordinate value (typically, the position of the second coordinate value) and in the orientation in accordance with the new reference line calculated in step S536. Namely, the orientation of the newly displayed object is determined based on a line passing through the coordinate value that was used for determining the position of the most recently displayed object and the coordinate value that is used for determining the position of that newly displayed object. Then, the processing in step S528 and subsequent steps is repeated.

According to the present embodiment, the user can arrange the object at a desired position through a series of operations of touch panel 13 and also can change the orientation of the object in a desired orientation. Thus, as the user can freely arrange the object and also change the orientation thereof with what is called "one action", the object can be displayed more intuitively.

First Variation of First Embodiment

In the first embodiment described above, the configuration is such that second and subsequent stamps are arranged without the unfixed state thereof being set, however, the second and subsequent stamps may be in the unfixed state. Specifically, the orientation of the second and subsequent stamps may also be varied in real time, in accordance with relation between a position of the previously arranged stamp and a position input by the user with touch pen 27 etc. Characteristic processing in the present variation will be described hereinafter with reference to FIGS. 26A and 26B.

It is noted that the hardware configuration, the processing procedure and the like except for the processing described below are the same as those in the first embodiment described above and detailed description thereof will not be repeated.

Figure 26A:
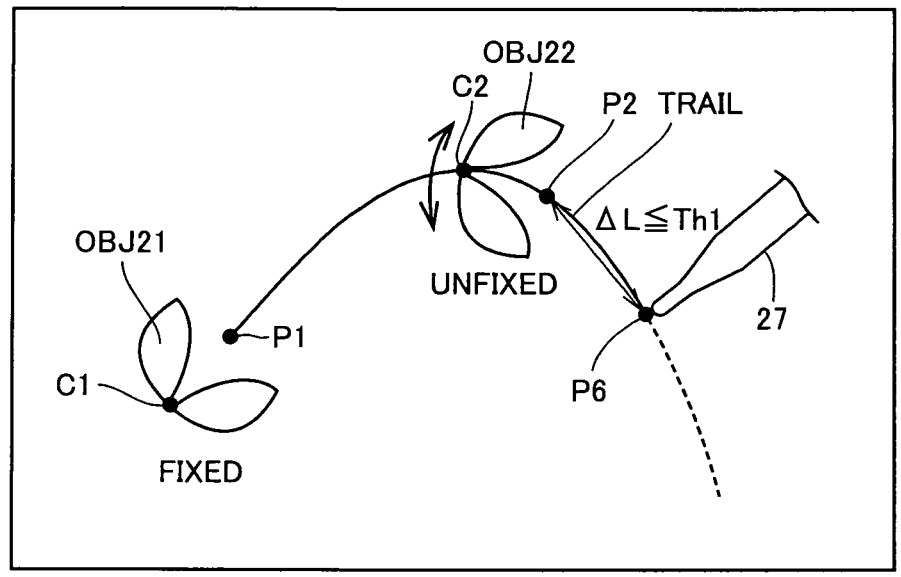
FIGS. 26A and 26B are diagrams for illustrating processing in a first variation of the first embodiment of the present invention.

For example, as shown in FIG. 26A, a case where the user touches first input point P1 on the screen with touch pen 27 etc. and thereafter moves touch pen 27 etc. to a sixth input point P6 via second input point P2 while touch pen 27 etc. keeps touching the screen is considered. In addition, it is assumed that objects OBJ21 and OBJ22 are arranged at positions with reference to first input point P1 and second input point P2 by this user's operation. It is noted that a distance between second input point P2 and sixth input point P6 is assumed as not greater than threshold value Th1 for causing the object to make transition to the fixed state.

In the present variation, in such a state, object OBJ22 is maintained in the unfixed state. Namely, the orientation of object OBJ22 is changed in real time, by using a line passing through first input point P1 serving as the reference for arrangement of object OBJ21, second input point P2 serving as the reference for arrangement of object OBJ22 itself, and the position input by the user with touch pen 27 etc. at each time point (in the example shown in FIG. 26A, sixth input point P6) as the reference line. Here, Bezier approximation or the like may representatively be used as a method of calculating the reference line passing through three points as described above. In determining such a reference line, the reference line may be calculated based on reference positions for a plurality of previously arranged objects, without limited to a single previously arranged object.

Figure 26B:
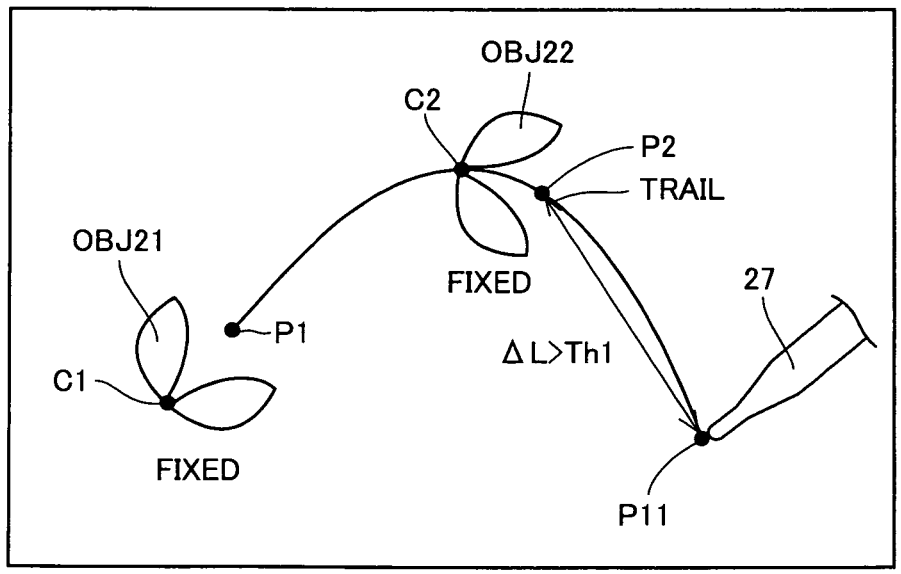

Thereafter, as shown in FIG. 26B, when the user moves touch pen 27 etc. to a seventh input point P7 of which distance from second input point P2 exceeds threshold value Th1, object OBJ22 makes transition from the unfixed state to the fixed state. The orientation of this object OBJ22 that has made transition to the fixed state is determined based on the reference line passing through three points of first input point P1, second input point P2, and seventh input point P3.

Second Variation of First Embodiment

In the first embodiment described above, such a configuration that the orientation of the object in the unfixed state is changed in real time each time second input point P2 is updated has been described. Meanwhile, the orientation of the object may be maintained at the initial value until the condition for the object to make transition from the unfixed state to the fixed state is satisfied, and after this condition is satisfied, the orientation of the object may be changed to the orientation in accordance with second input point P2 at the time point when the condition is satisfied, and then the object may make transition to the fixed state. After the object made transition to this fixed state, the orientation of the object is held to the orientation resulting from the change.

In the present variation, in the flowchart shown in FIG. 25 above, the processing shown in steps S516 and S518 is performed prior to execution of step S522. As the processing is otherwise the same as in the first embodiment described above, detailed description will not be repeated.

Second Embodiment

In the first embodiment described above, the function to allow the user to freely do "graffiti" over the displayed image has been described. In the second embodiment, a function to display an image like a "kaleidoscope" will be described hereinafter.

As appearance and an internal configuration of a game device 100A according to the present embodiment are the same as those in FIGS. 1 and 2 above, detailed description will not be repeated.

<Exemplary Usage of Game Device>

Usage of game device 100A according to the present embodiment is also similar to usage of game device 100 according to the first embodiment described above. Specifically, for example as shown in FIG. 3, an image (or a part thereof) picked up by the camera (inner camera 23 or outer camera 25) mounted on game device 100A is paved as in a kaleidoscope and displayed in real time on lower LCD 12. The user can freely vary a manner of display on this lower LCD 12 by operating touch pen 27 etc. It is noted that the displayed image may be an image stored in advance in memory card 28 (FIG. 2) or the like (still image or moving image).

Though the image of subject TRG is picked up by outer camera 25 in the example shown in FIG. 3, the image of subject TRG may be picked up by inner camera 23, and the user can arbitrarily select which camera to use.

FIG. 27 is a diagram showing an exemplary selection screen in game device 100A according to the second embodiment of the present invention. Referring to FIG. 27, game device 100A according to the present embodiment includes a plurality of functions including a function to allow display of an image like a kaleidoscope described above, and the user selects a desired function in the selection screen shown in FIG. 27.

In the example shown in FIG. 27, a plurality of icons 150 corresponding to respective functions provided in game device 100 are displayed in the upper portion of the screen, and the user can arbitrarily select an icon corresponding to a desired function from among these icons 150. In addition, selection icons 152 and 154 are displayed on opposing sides of the screen. Each time the user selects selection icon 152 or 154, the selected function is successively changed toward the left or toward the right, along arrangement of icons 150.

When "start" icon 158 is selected after the user selects the function with such a method, the selected function is executed. In addition, when "quit" icon 156 is selected, the screen returns to a not-shown menu screen.

In addition, as shown in FIG. 27, a name of the selected function (in the example shown in FIG. 27, "mirror camera") and outlines of that processing are shown in preview region 160, so as to present to the user contents of the function corresponding to icon 150 selected by the user.

<Outlines of "Mirror Camera">

Outlines of the "mirror camera" according to the present embodiment will be described hereinafter with reference to FIGS. 28 to 32.

The "mirror camera" according to the present embodiment is a function to allow the user to freely display an image picked up by the camera or an image stored in advance in memory card 28 or the like (hereinafter, these images are collectively referred to as the "input image") like a kaleidoscope. The "mirror camera" provides a function to freely change the orientation and the size of an image object obtained by extracting a part of the input image in accordance with the user's operation and a function to allow updating in real time of a displayed picture in accordance with the image object that has been changed.

Figure 28:
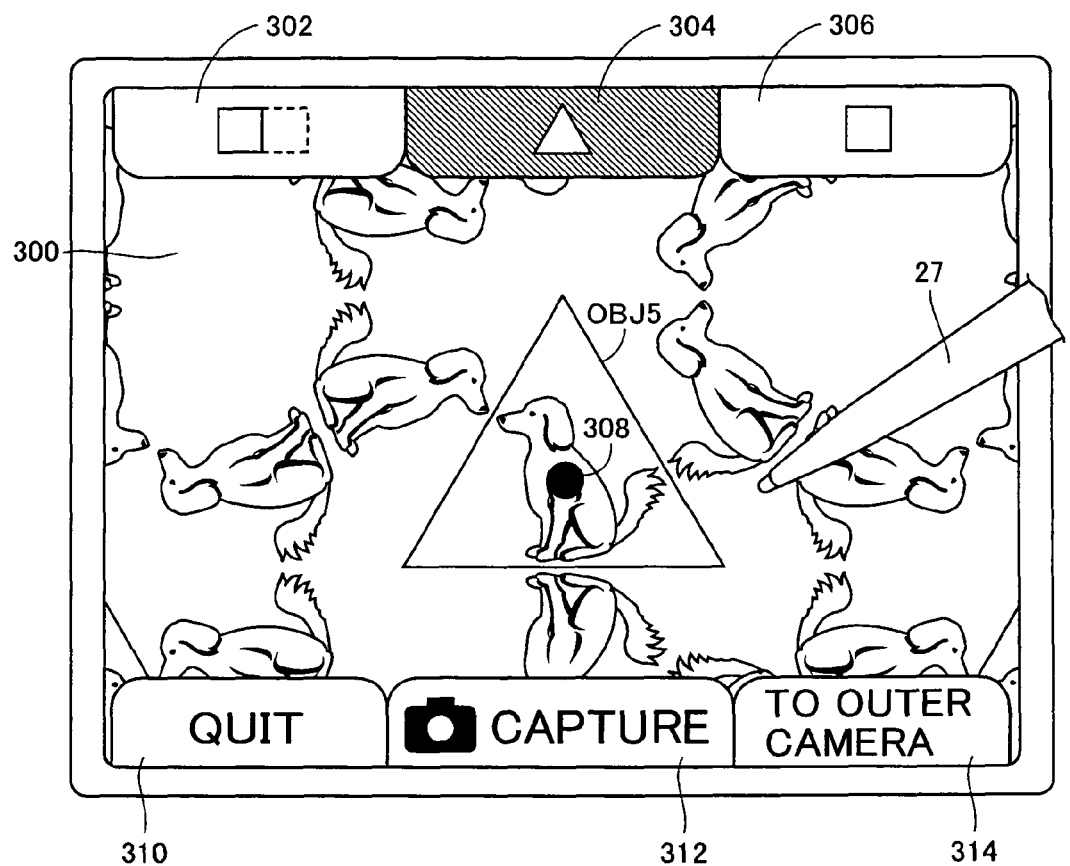
FIG. 28 is a diagram (No. 1) for illustrating outlines of a "mirror camera" according to the second embodiment of the present invention.

As shown in FIG. 28, in a "mirror camera" mode, the input image is displayed in real time like a kaleidoscope, and icons 302 to 306 for selecting an operation for this displayed image are displayed in the upper portion of the screen and icons 310 to 314 for selecting various types of operations are displayed.

When the user selects (touches) a "symmetry" icon 302, as shown in FIG. 27, the input image and an image obtained by horizontally flipping the input image with respect to the screen are simultaneously displayed. In addition, the orientation of the image displayed on the screen is varied in real time in accordance with the user's touch operation with touch pen 27 etc.

When the user touches a "triangle" icon 304, as shown in FIG. 28, a triangular-shaped portion of the input image is extracted as an image object OBJ5, and an image obtained by successively developing this image object OBJ5 to be symmetric with respect to adjacent sides is displayed.

Figure 29:
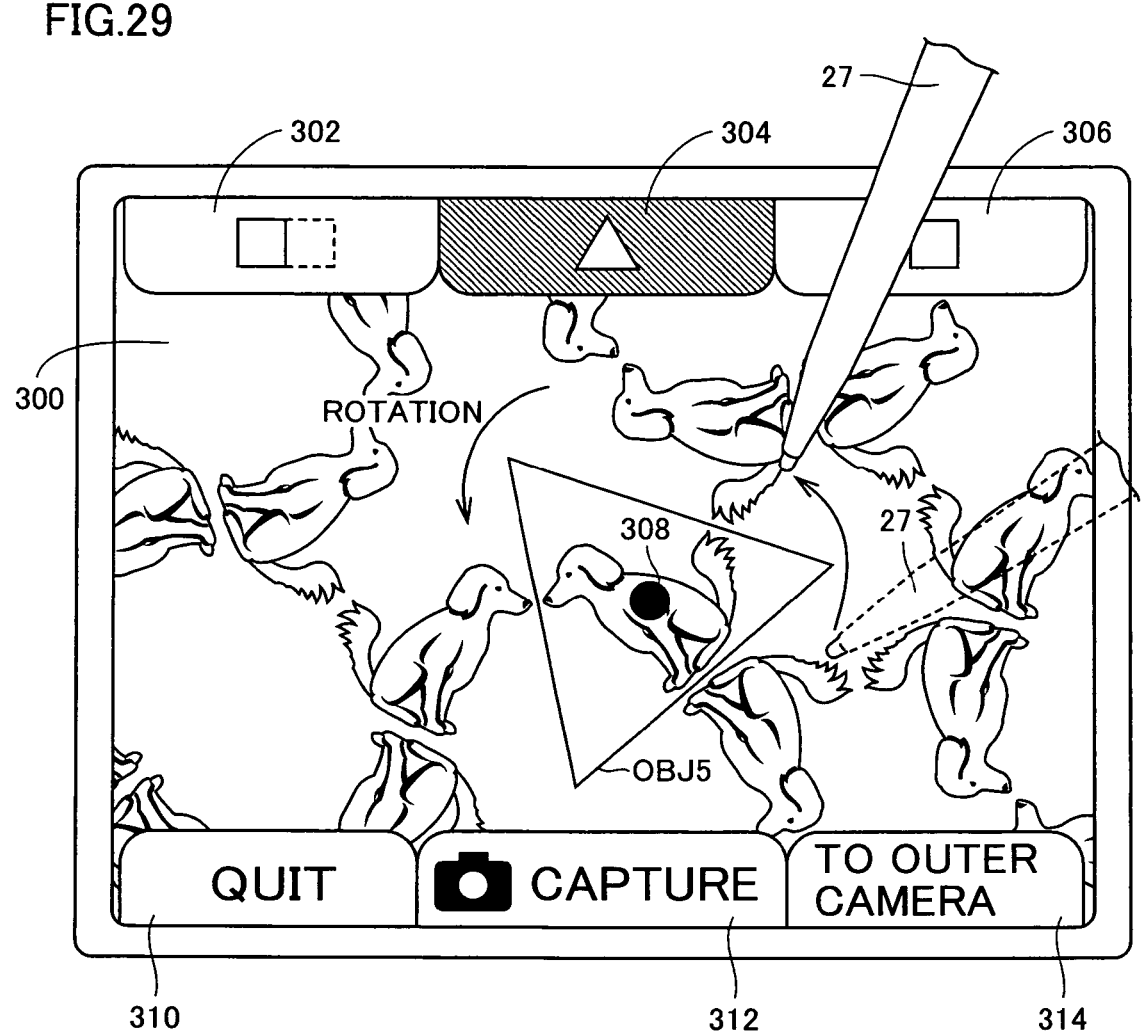
FIG. 29 is a diagram (No. 2) for illustrating outlines of the "mirror camera" according to the second embodiment of the present invention.

In addition, as shown in FIG. 29, when the user moves touch pen 27 etc. in a circular pattern while touch pen 27 etc. keeps touching the screen, image object OBJ5 rotates around a predetermined center point 308 by an angle in accordance with the touch operation. Namely, the orientation of image object OBJ5 varies in real time in accordance with the user input. As shown in FIG. 29, the position of the image developed around image object OBJ5 also varies with rotation of this image object OBJ5.

Figure 30:
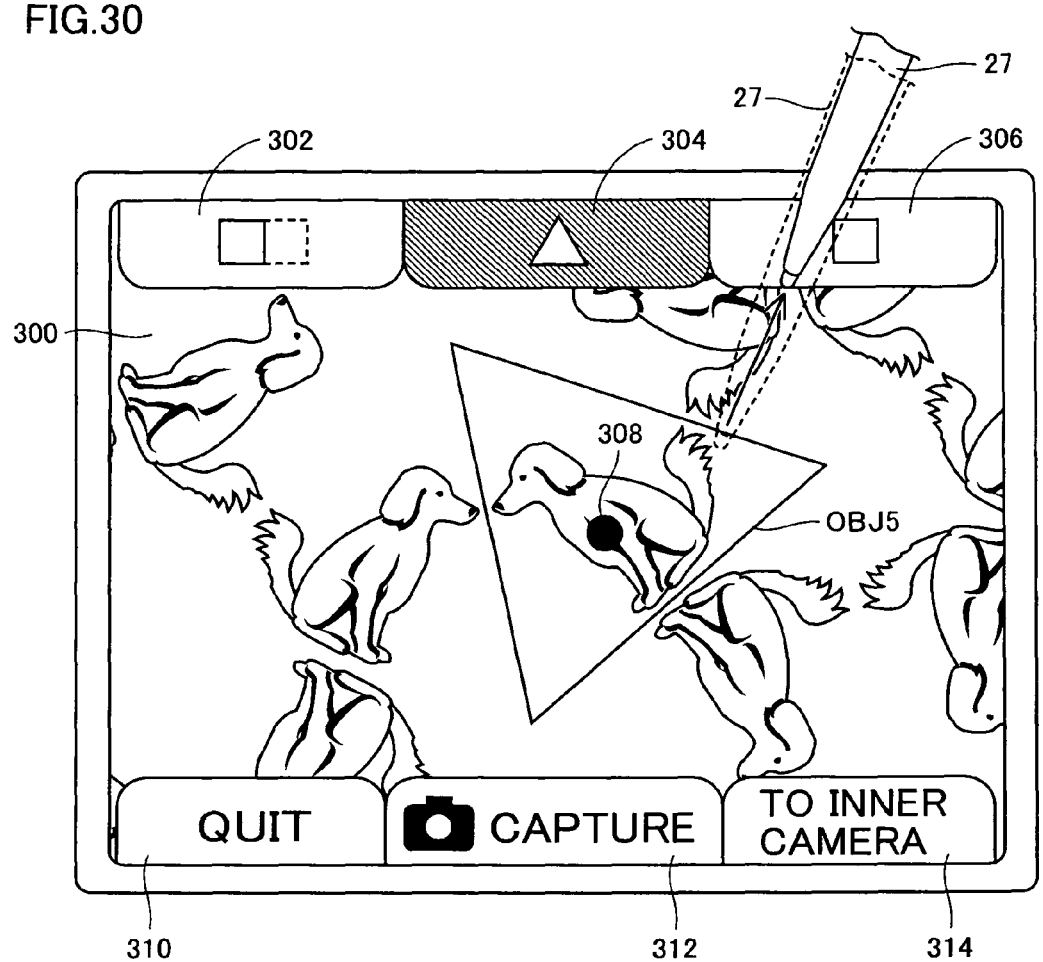
FIG. 30 is a diagram (No. 3) for illustrating outlines of the "mirror camera" according to the second embodiment of the present invention.

In addition, as shown in FIG. 30, when the user moves touch pen 27 etc. away from or toward center point 308 of image object OBJ5 while touch pen 27 etc. keeps touching the screen, image object OBJ5 is scaled up or down in accordance with the touch operation. Namely, the size of image object OBJ5 varies in real time in accordance with the user input. As shown in FIG. 30, arrangement or size of the image developed around image object OBJ5 also varies with variation in the size of this image object OBJ5.

Figure 31:
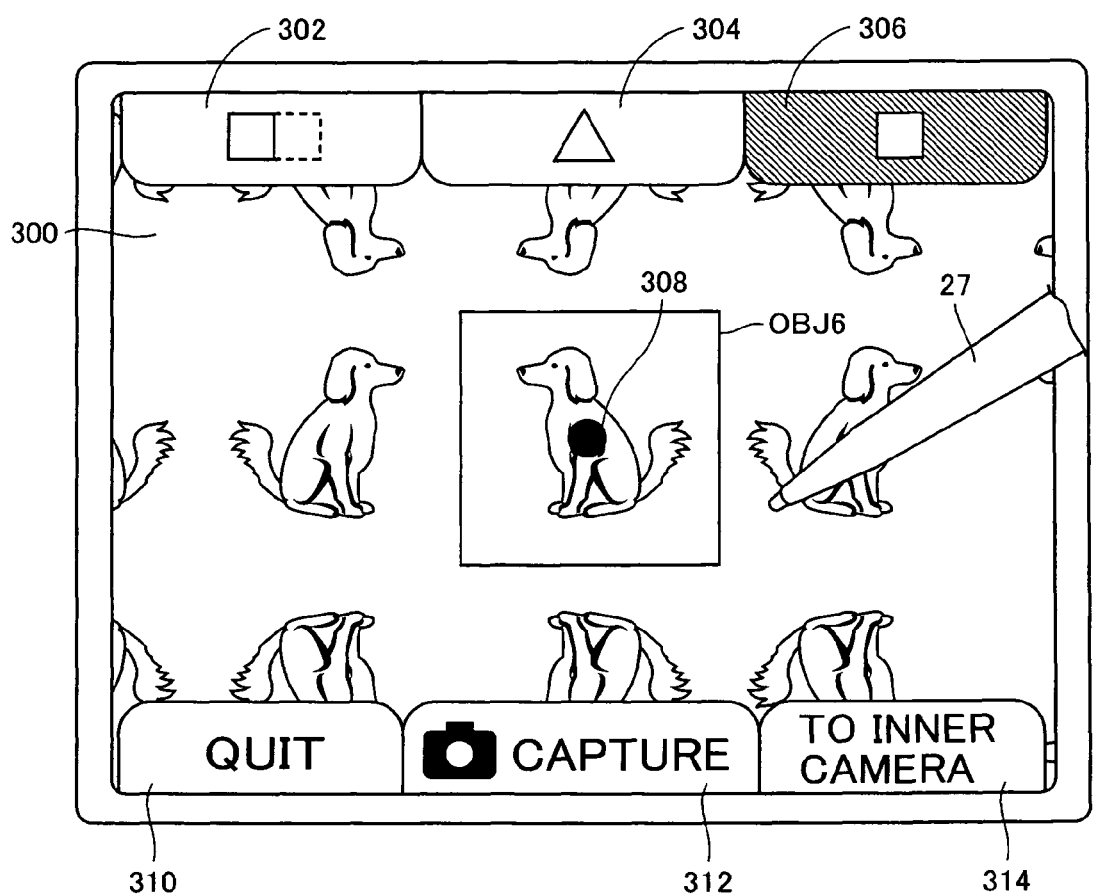
FIG. 31 is a diagram (No. 4) for illustrating outlines of the "mirror camera" according to the second embodiment of the present invention.

When the user touches a "quadrangle" icon 306, as shown in FIG. 31, a quadrangular-shaped portion of the input image is extracted as an image object OBJ6, and an image obtained by successively developing this image object OBJ6 to be symmetric with respect to adjacent sides is displayed.

Figure 32:
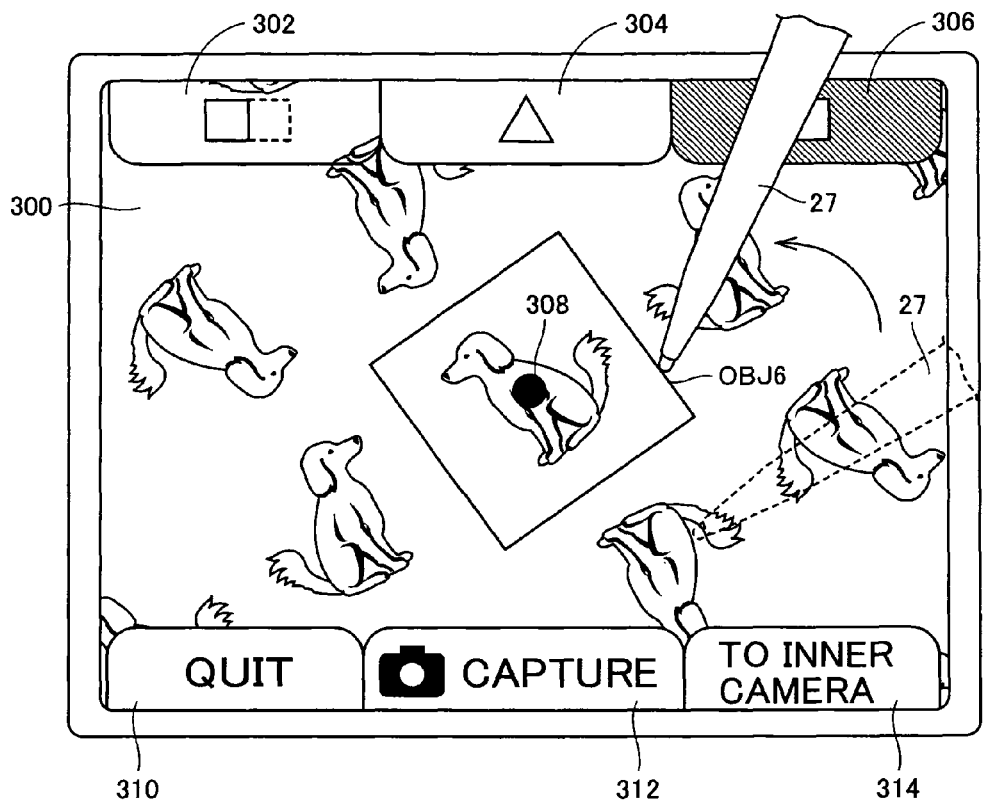
FIG. 32 is a diagram (No. 5) for illustrating outlines of the "mirror camera" according to the second embodiment of the present invention.

In addition, as shown in FIG. 32, when the user moves touch pen 27 etc. in a circular pattern while touch pen 27 etc. keeps touching the screen, image object OBJ6 rotates around predetermined center point 308 by an angle in accordance with the touch operation. Namely, the orientation of image object OBJ6 varies in real time in accordance with the user input. It is noted that the position of the image developed around image object OBJ6 also varies with rotation of this image object OBJ6. Moreover, as in FIG. 30, when the user moves touch pen 27 etc. away from or toward center point 308 of image object OBJ6 while touch pen 27 etc. keeps touching the screen, image object OBJ6 is scaled up or down in accordance with the touch operation. Further, arrangement or size of the image developed around image object OBJ6 also varies with variation in the size of this image object OBJ6.

Thus, the center point serving as a reference point for rotation and/or size change is determined in advance for the image object. As will be described later, a quantity of rotation (rotation position) and a degree of a scale (size) of the object are calculated in accordance with relative relation between this reference point and a vector indicating variation of a coordinate caused by the touch operation.

In addition, when a "quit" icon 310 is selected, this processing for the "mirror camera" is stopped and the screen returns to the selection screen as shown in FIG. 27.

In addition, when a "capture" icon 312 is selected, a still image corresponding to an image displayed at selected timing is generated and stored in data memory 34 for storage (FIG. 2) or the like.

In addition, when a switch icon 314 is selected, the camera to be used for image pick-up is switched between inner camera 23 and outer camera 25.

<Detailed Processing in "Mirror Camera">

Detailed processing for the "mirror camera" according to the present embodiment will be described hereinafter with reference to FIG. 33. It is noted that the example shown in FIG. 33 illustrates processing for image object OBJ5 shown in FIG. 28.

In particular in the "mirror camera" according to the present embodiment, the quantity of rotation and the quantity of size change of the image object are calculated in accordance with a quantity per unit time of operation on the screen with touch pen 27 etc. by the user. Therefore, by the user's operation with touch pen 27 etc., a speed of rotation of the image object becomes fast or the image object is further scaled up, so that the user can obtain such feeling that the image object is freely changed in response to his/her own operation.

Figure 33:
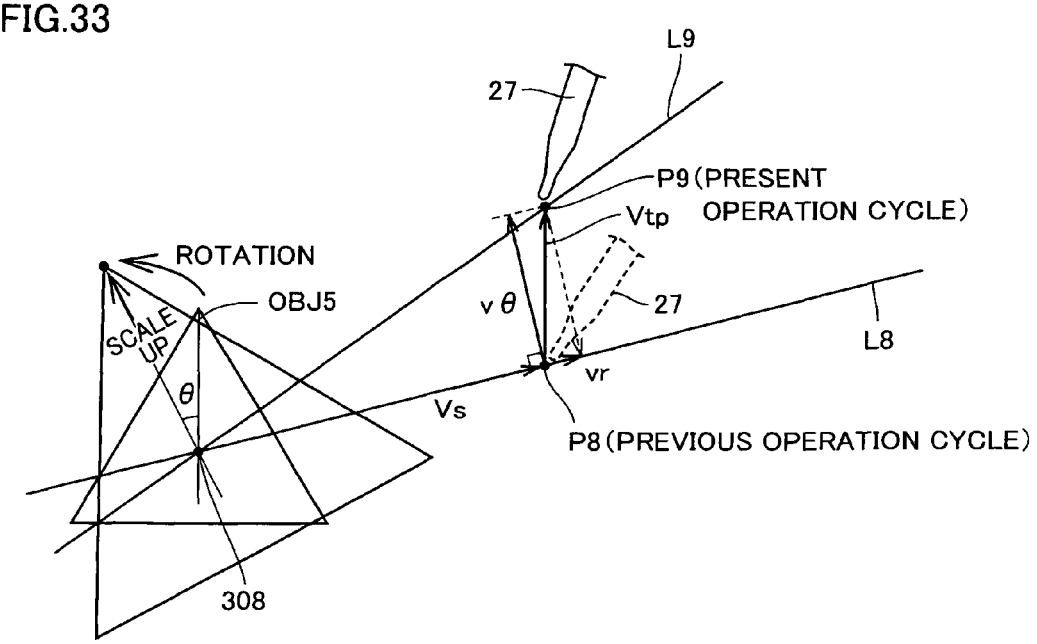
FIG. 33 is a diagram for illustrating detailed processing for the "mirror camera" according to the second embodiment of the present invention.

More specifically, as in the example shown in FIG. 33, it is assumed, for example, that the user moves touch pen 27 etc. from an eighth input point P8 to a ninth input point P9 while the touch state of touch pen 27 etc. is maintained. It is assumed here that the user's operation to move touch pen 27 etc. (variation of the coordinate value) was performed in an operation cycle $\Delta t$ (what is called a frame cycle). In the description below, it is assumed that the eighth input point was input at time t and the ninth input point was input at time $t+\Delta t$.

The quantity of rotation and the quantity of size change of image object OBJ5 are calculated in accordance with an operation vector Vtp generated as a result of movement from this eighth input point P8 to ninth input point P9. More specifically, the quantity of rotation and the quantity of size change of image object OBJ5 are calculated in accordance with a circumferential component $v\theta$ and a radial component vr of operation vector Vtp with respect to center point 308 of image object OBJ5.

The circumferential direction and the radial direction can be defined with respect to any straight line passing through center point 308 of image object OBJ5, however, in the example shown in FIG. 33, operation vector Vtp is resolved into the circumferential component and the radial component with respect to a straight line L8 passing through center point 308 of image object OBJ5 and a starting point of operation vector Vtp (eighth input point P8). Namely, operation vector Vtp is resolved into a component perpendicular to straight line L8 (circumferential component vθ) and a component in parallel thereto (radial component vr).

In addition, using circumferential component vθ and radial component vr, a rotation angle θ and a scale α of the image object between certain time t and the time after a subsequent operation cycle (t+Δt) are calculated in accordance with the following equations.

$$\theta(t+\Delta t)=\theta(t)\pm a\times v\theta \quad (1)$$

$$\alpha(t+\Delta t)=\alpha(t)+b\times vr \quad (2)$$

It is noted that the initial value for θ is 0 and the initial value for α is 1. If there is no touch operation, the values for θ and α are held at previous values.

θ(t) and α(t) indicate the rotation angle and the scale at time t, respectively.

θ(t+Δt) and α(t+θt) indicate the rotation angle and the scale at time (t+Δt), respectively, and a and b indicate bias coefficients.

Using thus determined θ and α, the object image rotated by θ around center point 308 and scaled up or down at α is displayed at the position of center point 308. It is noted that θ indicates the rotation angle from a standard orientation and α indicates the scale with respect to a standard size.

In the example described above, radial component vr of operation vector Vtp in one frame was used to calculate scale α of the image object. In another example, however, a touch-on coordinate and a scale α0 at the time of touch-on are stored, and a difference Δd(t) between a distance from center point 308 of image object OBJ5 to the touch-on coordinate and a distance from center point 308 to a current touch coordinate may be employed so long as the touch operation is continued thereafter. Here, scale α(t) at time t is calculated in accordance with the equation below. It is noted that Δd(t) is negative when the current touch coordinate is closer to the center point than the touch-on coordinate.

$$\alpha(t)=\alpha 0+b\times \Delta d(t) \quad (2)'$$

In the example above, α(t) is calculated always with reference to the timing of touch-on, so that accumulation of errors can be prevented. Here, θ may also be calculated by using a difference in rotation angle between the time of touch-on and the present time based on a rotation angle θ0 at the time of touch-on, or may be calculated by using the equation (1).

It is noted that the sign of the second term on the left side in the equation (1) may be set to any of positive and negative, depending on relation between definition of rotation position θ of the image object and the orientation of operation vector Vtp. Specifically, if a counterclockwise direction with respect to center point 308 of image object OBJ5 is defined as the positive direction of rotation position θ, the sign of the second term on the left side of the equation (1) is "+" when operation vector Vtp is generated in the counterclockwise direction with respect to center point 308, whereas the sign of the second term on the left side of the equation (1) is "−" when operation vector Vtp is generated in a clockwise direction with respect to center point 308.

In addition, determination based on an outer product of operation vector Vtp and a vector Vs from center point 308 of image object OBJ5 to eighth input point P8 may be used as an exemplary method of determining in which direction operation vector Vtp was generated. Specifically, in the example shown in FIG. 33, when operation vector Vtp is generated counterclockwise, the outer product of operation vector Vtp and vector Vs is positive. On the other hand, when operation vector Vtp is generated clockwise, the outer product of operation vector Vtp and vector Vs is negative. Then, depending on the sign of such an outer product, in which direction operation vector Vtp was generated can be determined.

In addition, in the equation (2), regarding radial component Vr, the direction away from center point 308 of image object OBJ5 is defined as + (plus), and the direction toward the same is defined as − (minus).

Naturally, regarding a straight line L9 passing through center point 308 of image object OBJ5 and an endpoint of operation vector Vtp (ninth input point P9), operation vector Vtp may be resolved into the circumferential component and the radial component. Alternatively, a straight line passing through center point 308 and an intermediate point of operation vector Vtp may be adopted.

<Rendering Processing>

As described above, in game device 100A according to the present embodiment, a part of the image picked up by the camera is extracted as the image object, and the image obtained by developing a plurality of such extracted image objects over the entire screen is displayed in real time. In addition, when the user performs the operation while touch pen 27 etc. keeps touching the screen, the image object varies in real time at the rotation angle and to the size in accordance with this operation. Therefore, rendering processing for such image display will be described with reference to FIGS. 34, 35A and 35B.

Figure 34:
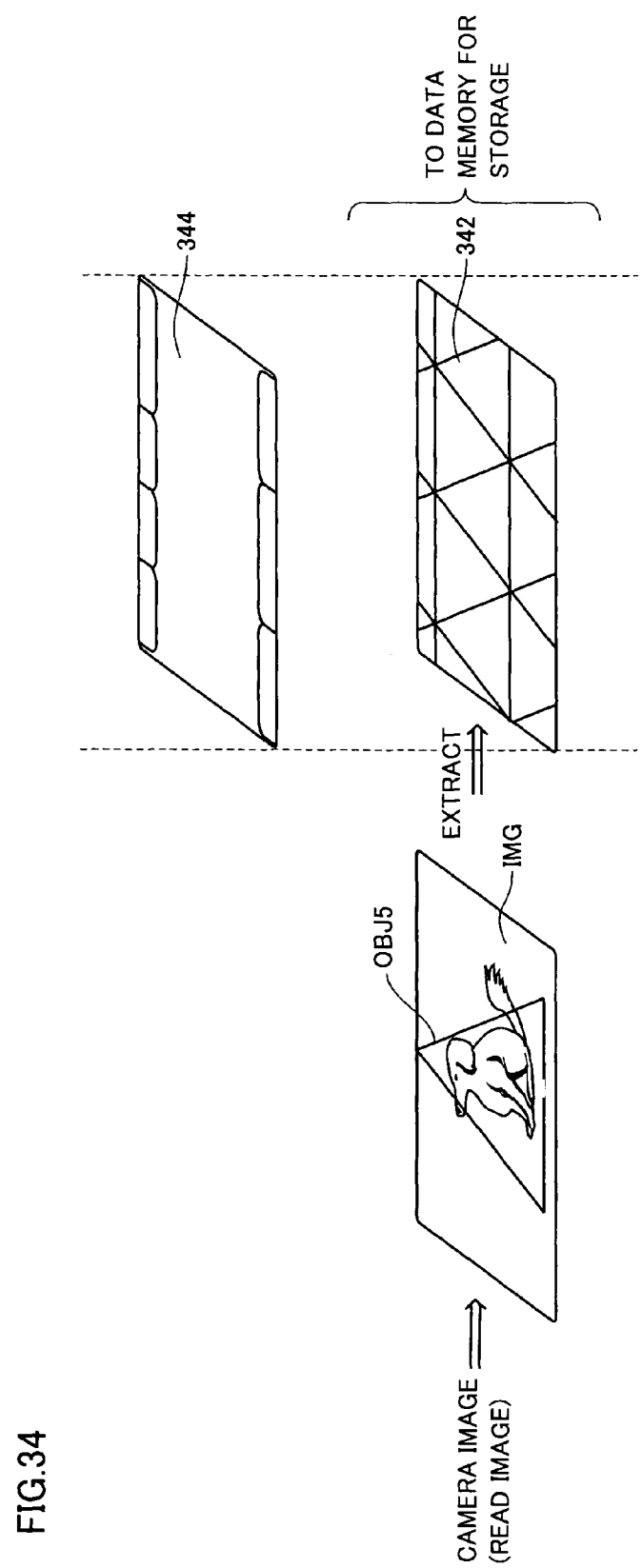
FIG. 34 is a schematic diagram for illustrating rendering processing of the game device according to the second embodiment of the present invention.
Figure 35:
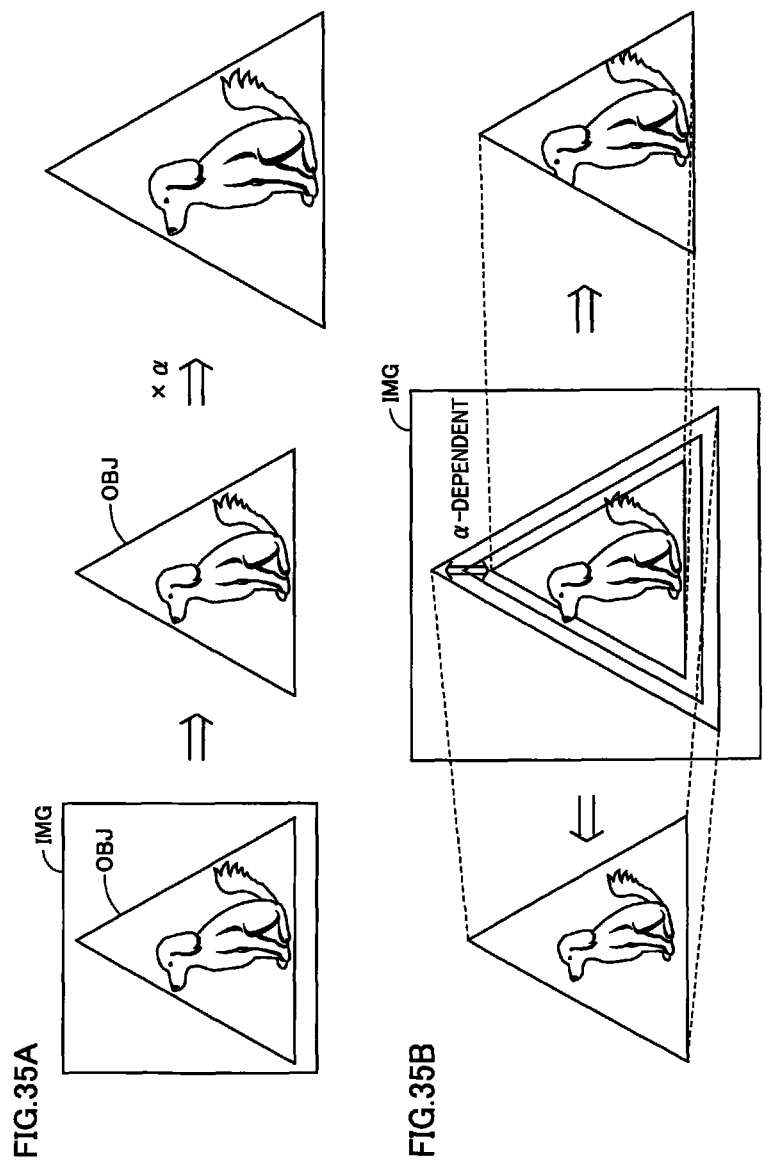
FIGS. 35A and 35B are schematic diagrams for illustrating processing for extracting an image object in the game device according to the second embodiment of the present invention.

FIG. 34 is a schematic diagram for illustrating rendering processing of game device 100A according to the second embodiment of the present invention. FIGS. 35A and 35B are schematic diagrams for illustrating processing for extracting the image object in game device 100A according to the second embodiment of the present invention.

Referring to FIG. 34, in game device 100A according to the present embodiment, two layers 342 and 344 are used to generate a video image signal for display on the screen. It is noted that each of layers 342 ad 344 is implemented by forming a memory area having a capacity comparable to resolution of at least lower LCD 12 in main memory 32.

A first layer 342 is a memory area for developing for display, an image object extracted from an image picked by the camera (still image or moving image) or an image read from memory card 28 (FIG. 2) or the like (still image or moving image).

CPU 31 (FIG. 2) develops an input image IMG input from any of inner camera 23, outer camera 25 and memory card 28, and extracts image object OBJ5 from this input image IMG. Then, the data obtained by developing this image object OBJ5 under a prescribed rule is written in an area corresponding to first layer 342 within main memory 32. When the still image is input, the image should only be developed to raster data for writing. On the other hand, when the moving image is input, in order to improve a real time characteristic of display, rendering may be carried out, for example, by using polygon processing.

A second layer 344 is a memory area for displaying an icon for accepting the user's operation. CPU 31 writes data for displaying a necessary icon in an area corresponding to second layer 344 within main memory 32, in accordance with a function or an operation mode selected through user's operation.

An image obtained by combining data stored in these layers 342 and 344 is displayed on the screen. In each of layers 342 and 344, only a pixel of which data to be displayed exists is handled as effective, and a pixel of which data to be displayed does not exist is handled as transparent, so to speak. Therefore, regarding the pixel handled as transparent in a certain layer, data of a corresponding pixel in a lower layer is displayed on the screen.

In addition, when "capture" icon 312 (FIG. 28) is selected, CPU 31 causes data memory 34 for storage (FIG. 2) or the like to store data stored in first layer 342.

With regard to processing for extracting the image object described above, as shown in FIG. 35A, data of a pixel included in a predetermined region of input image IMG may be extracted and this extracted data may be scaled down or up at scale α described above, so that the size in which the data is displayed is variable.

Alternatively, with regard to another processing for extracting the image object described above, as shown in FIG. 35B, data of a pixel in a region, extracted from input image IMG, may be scaled down or up at scale α described above. By adopting such processing, substantial data included in the image object (that is, the image of subject TRG) can be scaled down or up while maintaining an effective size of the image object at the same size.

<Processing Procedure>

Figure 36:
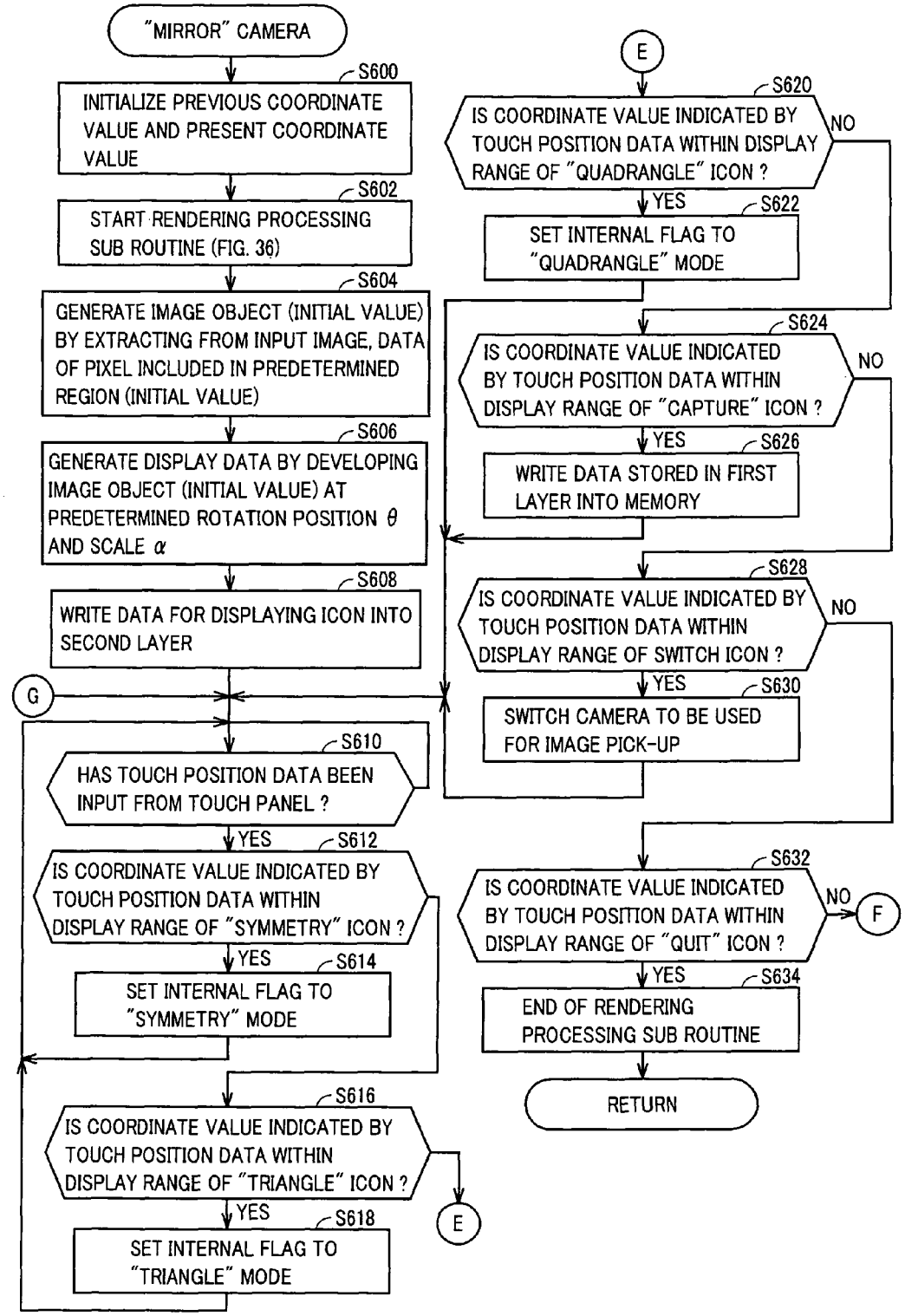
FIG. 36 is a flowchart showing sub routine processing performed when the "mirror camera" is selected in step S16 shown in FIG. 19.
Figure 37:
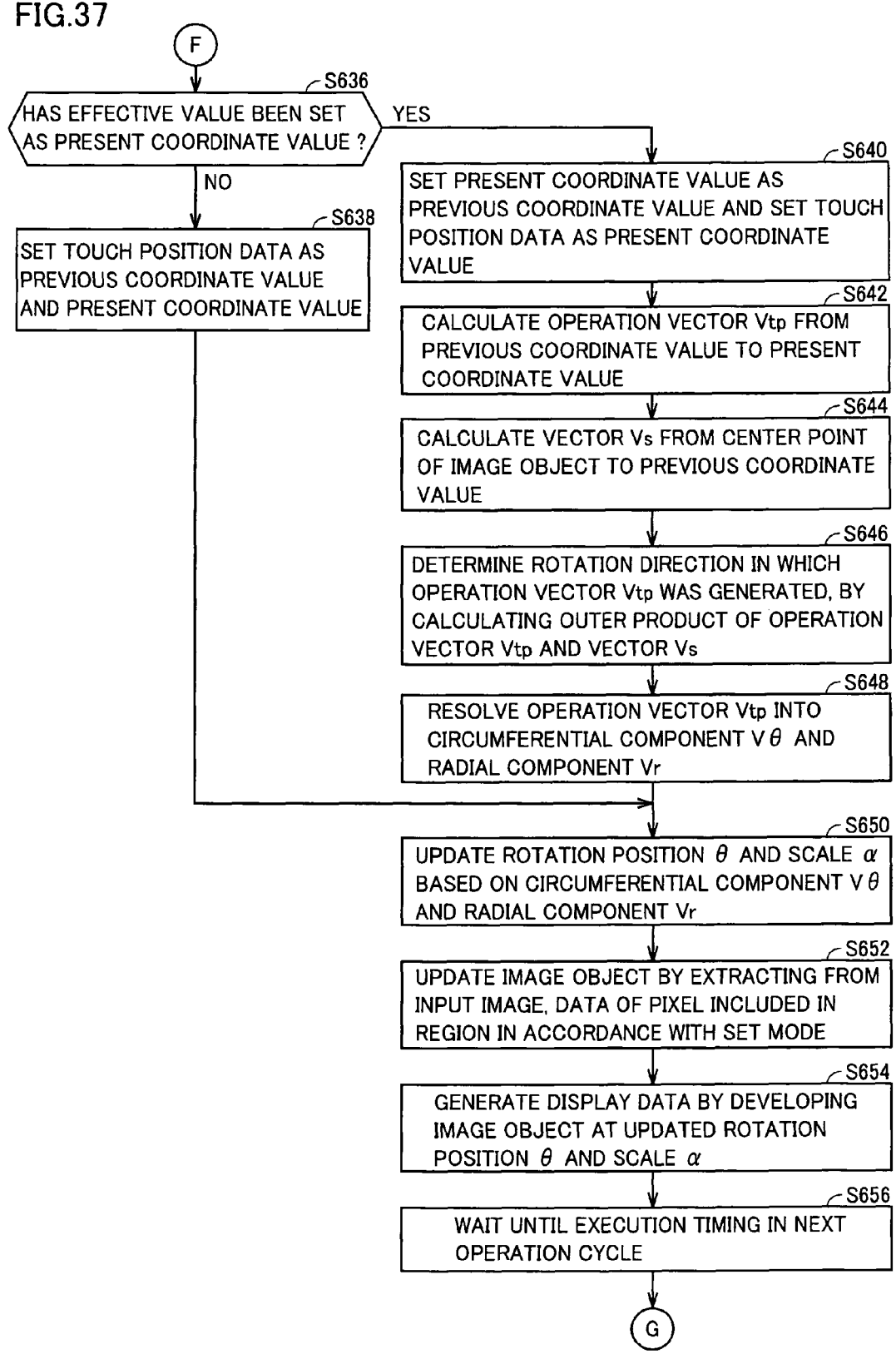
FIG. 37 is a flowchart showing sub routine processing performed when the "mirror camera" is selected in step S16 shown in FIG. 19.
Figure 38:
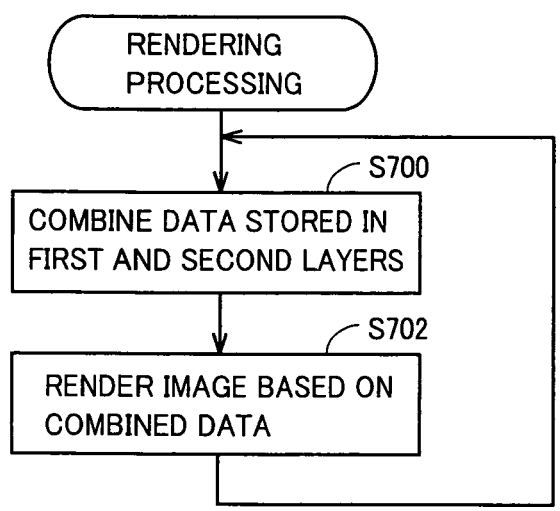
FIG. 38 is a flowchart showing rendering processing sub routine processing of which execution is started in step S602 shown in FIG. 36.

A processing procedure relating to the "mirror camera" according to the present embodiment described above will be described hereinafter with reference to FIGS. 36 to 38. Each step shown in FIGS. 36 to 38 is implemented representatively by reading of a program or the like stored in memory card 29 to main memory 32 and execution thereof by CPU 31.

(1. Function Selection Processing)

In game device 100A according to the present embodiment as well, processing relating to function selection as in FIG. 19 above is performed.

In game device 100A according to the present embodiment, for example, when the function of the "mirror camera" is selected in step S8 shown in FIG. 19, as shown in FIG. 27, preview display of the name such as the "mirror camera" and contents of each processing (in the example shown in FIG. 27, the symmetry mode) is provided.

In addition, when the "mirror camera" is selected in step S16, CPU 3.1 performs the processing in accordance with the flowcharts shown in FIGS. 36 and 37.

As other steps are the same as in the first embodiment described above, detailed description will not be repeated.

(2. "Mirror Camera" Sub Routine)

FIGS. 36 and 37 are flowcharts showing sub routine processing performed when the "mirror camera" is selected in step S16 shown in FIG. 19.

Referring to FIGS. 36 and 37, initially, in step S600, CPU 31 initializes (clears to zero) a previous coordinate value and a present coordinate value that are internal variables.

In successive step S602, CPU 31 starts the rendering processing sub routine shown in FIG. 38. This rendering processing sub routine is processing for displaying a screen for the "mirror camera" as shown in FIGS. 28 to 32. The processing procedure shown in FIG. 38 is repeatedly performed in a prescribed cycle, independently of the processing shown in FIGS. 36 and 37.

In successive step S604, CPU 31 extracts the data of the pixel included in the predetermined region (initial value) of the input image from the selected camera (inner camera 23 or outer camera 25) to generate the image object (initial value). In further successive step S606, CPU 31 generates display data obtained by developing the image object (initial value) generated in step S604 at predetermined rotation position θ and scale α over the entire screen and writes the display data into the area corresponding to first layer 342 within main memory 32. Then, the process proceeds to step S608.

In successive step S608, CPU 31 writes data for displaying icons 302 to 314 shown in FIG. 28 into the area corresponding to second layer 344 within main memory 32. Namely, CPU 31 causes an icon for accepting the user's operation to be displayed on lower LCD 12.

Through the processing in steps S602 to S608 as above, an initial screen of the "mirror camera" mode is displayed.

In successive step S610, CPU 31 determines whether the touch position data has been input from touch panel 13 through I/F circuit 42 or not. Namely, CPU 31 determines whether a touch operation with touch pen 27 etc. by the user has been performed or not. When the touch position data has not been input (NO in step S610), the processing in step S610 is repeated. On the other hand, when the touch position data has been input (YES in step S610), the process proceeds to step S612.

In step S612, CPU 31 determines whether the coordinate value indicated by the touch position data is within a display range of "symmetry" icon 302 or not. Namely, CPU 31 determines whether "symmetry" icon 302 has been selected or not. Then, when the coordinate value indicated by the touch position data is within the display range of "symmetry" icon 302 (YES in step S612), the process proceeds to step S614. On the other hand, when the coordinate value indicated by the touch position data is out of the display range of "symmetry" icon 302 (NO in step S612), the process proceeds to step S616.

In step S614, CPU 31 sets an internal flag to the "symmetry" mode. Then, the process returns to step S610.

In step S616, CPU 31 determines whether the coordinate value indicated by the touch position data is within a display range of "triangle" icon 304 or not. Namely, CPU 31 determines whether "triangle" icon 304 has been selected or not. Then, when the coordinate value indicated by the touch position data is within the display range of "triangle" icon 304 (YES in step S616), the process proceeds to step S618. On the other hand, when the coordinate value indicated by the touch position data is out of the display range of "triangle" icon 304 (NO in step S616), the process proceeds to step S620.

In step S618, CPU 31 sets the internal flag to the "triangle" mode. Then, the process returns to step S610.

In step S620, CPU 31 determines whether the coordinate value indicated by the touch position data is within a display range of "quadrangle" icon 306 or not. Namely, CPU 31 determines whether "quadrangle" icon 306 has been selected or not. Then, when the coordinate value indicated by the touch position data is within the display range of "quadrangle" icon 306 (YES in step S620), the process proceeds to step S622. On the other hand, when the coordinate value indicated by the touch position data is out of the display range of "quadrangle" icon 306 (NO in step S620), the process proceeds to step S624.

In step S622, CPU 31 sets the internal flag to the "quadrangle" mode. Then, the process returns to step S610.

In step S624, CPU 31 determines whether the coordinate value indicated by the touch position data is within a display range of "capture" icon 312 or not. Namely, CPU 31 determines whether "capture" icon 312 has been selected or not. Then, when the coordinate value indicated by the touch position data is within the display range of "capture" icon 312 (YES in step S624), the process proceeds to step S626. On the other hand, when the coordinate value indicated by the touch position data is out of the display range of "capture" icon 312 (NO in step S624), the process proceeds to step S628.

In step S626, CPU 31 reads data stored in the area corresponding to first layer 342 within main memory 32 and writes the data in data memory 34 for storage or the like. Then, the process returns to step S610.

In step S628, CPU 31 determines whether the coordinate value indicated by the touch position data is within a display range of switch icon 314 or not. Namely, CPU 31 determines whether switch icon 314 has been selected or not. Then, when the coordinate value indicated by the touch position data is within the display range of switch icon 314 (YES in step S628), the process proceeds to step S630. On the other hand, when the coordinate value indicated by the touch position data is out of the display range of switch icon 314 (NO in step S628), the process proceeds to step S632.

In step S630, CPU 31 switches the camera to be used for image pick-up between inner camera 23 and outer camera 25. Namely, CPU 31 switches a source of image input between inner camera 23 and outer camera 25. Then, the process returns to step S610.

In step S632, CPU 31 determines whether the coordinate value indicated by the touch position data is within a display range of "quit" icon 310 or not. Namely, CPU 31 determines whether "quit" icon 310 has been selected or not. Then, when the coordinate value indicated by the touch position data is within the display range of "quit" icon 310 (YES in step S632), CPU 31 ends the rendering processing sub routine shown in FIG. 38 (step S634) and thereafter this process ends. On the other hand, when the coordinate value indicated by the touch position data is out of the display range of "quit" icon 210 (NO in step S632), the process proceeds to step S636 shown in FIG. 37. Namely, the processing in step S636 and subsequent steps is performed when the user touches a position other than icons 301 to 314 on the screen with touch pen 27 etc.

In step S636, CPU 31 determines whether an effective value other than zero is set as the present coordinate value or not. Namely, CPU 31 determines whether the user has touched the position other than icons 301 to 314 with touch pen 27 etc. or not in the previous operation cycle.

When the effective value other than zero has not been set as the present coordinate value (NO in step S636), the process proceeds to step S638. In step S638, CPU 31 sets the coordinate value indicated by the touch position data as the previous coordinate value and the present coordinate value. Then, the process proceeds to step S650. Namely, when the user has not performed the input operation to indicate rotation and/or size change of the image object in the previous operation cycle, rotation position θ and scale α of the image object are not changed in the operation cycle immediately after the input operation.

On the other hand, when the effective value other than zero has been set as the present coordinate value (YES in step S636), the process proceeds to step S640. In step S640, CPU 31 sets the currently-set present coordinate value as the previous coordinate value, and thereafter sets the coordinate value indicated by the touch position data as the present coordinate value. Then, the process proceeds to step S642. Namely, when the user performs some input operation in the present operation cycle after the previous operation cycle, processing relating to rotation and/or size change of the image object is performed.

In step S642, CPU 31 calculates operation vector Vtp from the previous coordinate value to the present coordinate value. Namely, variation of the coordinate value input through the operation of touch panel 13 is detected.

In successive step S644, CPU 31 calculates vector Vs from the center point of the arranged image object to the previous coordinate value. In further successive step S646, CPU 31 calculates the outer product of operation vector Vtp and vector Vs and determines the rotation direction in which operation vector Vtp was generated based on the sign (positive or negative) of the calculated outer product. Then, the process proceeds to step S648.

In step S648, CPU 31 resolves operation vector Vtp into circumferential component Vθ and radial component Vr. Namely, circumferential component Vθ (first variation component) and radial component Vr (second variation component) in accordance with variation of the coordinate value are obtained.

In successive step S650, CPU 31 calculates rotation position θ and scale α of the image object based on circumferential component Vθ and radial component Vr calculated in step S648. Then, the process proceeds to step S650.

In step S650, CPU 31 updates the image object by extracting the data of the pixel included in the area in accordance with the set mode, from the input image from the selected camera (inner camera 23 or outer camera 25). In successive step S652, CPU 31 generates display data obtained by developing the image object updated in step S650 at current rotation position θ and scale α over the entire screen and writes the display data into the area corresponding to first layer 342 within main memory 32. Namely, the image included in the image object is developed over the entire screen around the image object and the resultant image is displayed. Then, the process proceeds to step S654.

In step S654, CPU 31 waits until the timing of execution in a next operation cycle. Thereafter, the process returns to step S610. As a result of this repeated processing, the display image obtained as a result of development is successively updated, together with change in the rotation position (orientation) or the scale (size) of the image object.

(3. Rendering Processing Sub Routine)

FIG. 38 is a flowchart showing rendering processing sub routine processing of which execution is started in step S602 shown in FIG. 36.

Referring to FIG. 38, in step S700, CPU 31 combines data stored in first layer 342 and second layer 344. It is noted that the data stored in first layer 342 is updated cyclically, along with execution of the sub routine processing shown in FIGS. 36 and 37 above.

In further successive step S702, CPU 31 renders the image in lower LCD 12 based on the combined data. Then, the process returns to step S700.

Execution of the sub routine processing shown in FIG. 38 above is started in step S602 shown in FIG. 36 and execution thereof ends in step S634 shown in FIG. 38.

Variation of Second Embodiment

In the second embodiment described above, as shown in FIG. 33, the processing in which the quantity of rotation of the image object is determined in accordance with circumferential component Vθ of operation vector Vtp has been illustrated, however, the object may be rotated with respect to the reference point of the object, in accordance with an angle between vertices of operation vector Vtp.

Namely, in FIG. 33, the quantity of change per unit time of rotation position θ of the object may be calculated in accordance with an angle between eighth input point P8 and ninth input point P9 with respect to center point 308 of object OBJ5. In other words, the quantity of change in the orientation of the object is determined in accordance with the angle formed by two coordinate values before and after variation of the input coordinate value, with respect to the reference point.

As the processing is otherwise the same as in the second embodiment described above, detailed description will not be repeated.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-transitory storage medium storing an image processing program executed by a computer interacting with an input portion and a display portion, said image processing program causing said computer to execute instructions comprising:
    detecting a coordinate value input through an operation of said input portion;
    obtaining a prescribed coordinate value among detected said coordinate values as a first object arranged coordinate value and displaying a first object at a corresponding position on said display portion based on the first object arranged coordinate value;
    obtaining a continuously-input coordinate value which is a subsequent coordinate value, received through a continuous operation of said input portion, to said first object arranged coordinate value among said detected coordinate values; and
    changing an orientation of said first object displayed on said display portion based on a collection of continuously-input coordinate values received through the continuous operation of said input portion.

2. The non-transitory storage medium storing an image processing program according to claim 1, wherein said image processing program causing said computer to further execute instructions comprising:
    setting a coordinate value immediately after start of detection of said coordinate value as said first object arranged coordinate value.

3. The non-transitory storage medium storing an image processing program according to claim 1, wherein said image processing program causing said computer to further execute instructions comprising:
    determining whether detection of said coordinate value is continued subsequently to detection of said first object arranged coordinate value,
    determining whether a coordinate value input while said coordinate value is successively detected satisfies an orientation change condition which is a condition for changing the orientation of said first object,
    setting a coordinate value determined as satisfying said orientation change condition as said continuously-input coordinate value, and
    changing the orientation of said first object in accordance with the continuously-input coordinate value.

4. The non-transitory storage medium storing an image processing program according to claim 3, wherein
    said orientation change condition includes such a condition that a distance between said first object arranged coordinate value and said continuously-input coordinate value exceeds a predetermined threshold value.

5. The non-transitory storage medium storing an image processing program according to claim 1, wherein said image processing program causing said computer to further execute instructions comprising:
    determining the orientation of said first object based on positional relation between said first object arranged coordinate value and said continuously-input coordinate value.

6. The non-transitory storage medium storing an image processing program according to claim 5, wherein said image processing program causing said computer to further execute instructions comprising:
    determining the orientation of said first object based on a line passing through said first object arranged coordinate value and said continuously-input coordinate value.

7. The non-transitory storage medium storing an image processing program according to claim 1, wherein said image processing program causing said computer to further execute instructions comprising:
    cyclically obtaining said continuously-input coordinate value while detection of said coordinate value is continued, and
    cyclically changing the orientation of said first object displayed on said display portion in accordance with each said continuously-input coordinate value obtained cyclically while detection of said coordinate value is continued.

8. The non-transitory storage medium storing an image processing program according to claim 7, wherein
    said orientation fix condition includes such a condition that a distance between said first object arranged coordinate value and said continuously-input coordinate value is not smaller than a prescribed value.

9. The non-transitory storage medium storing an image processing program according to claim 7, wherein
    said orientation fix condition includes such a condition that detection of said coordinate value is discontinued after said first object arranged coordinate value is obtained.

10. The non-transitory storage medium storing an image processing program according to claim 1, wherein
    said image processing program causes said computer to further execute instructions comprising: determining whether an operation satisfying an orientation fix condition for fixing the orientation of said first object has been performed,
    cyclically changing the orientation of said first object based on each said continuously-input coordinate value each time said continuously-input coordinate value is updated, until said orientation fix condition is satisfied, and
    holding the orientation of said first object after said orientation fix condition is satisfied.

11. The non-transitory storage medium storing an image processing program according to claim 1, wherein
    said image processing program causes said computer to further execute instructions comprising:
    determining whether said continuously-input coordinate value satisfies an orientation change condition which is a condition for changing the orientation of said first object,
    determining whether an operation satisfying an orientation fix condition for fixing the orientation of said first object has been performed,
    maintaining the orientation of said first object in an initial state until said orientation change condition is satisfied, cyclically changing the orientation of said first object based on said continuously-input coordinate value after said orientation change condition is satisfied and until said orientation fix condition is satisfied, and holding the orientation of said first object after said orientation fix condition is satisfied.

12. The non-transitory storage medium storing an image processing program according to claim 11, wherein said orientation fix condition includes such a condition that a distance between said first object arranged coordinate value and said continuously-input coordinate value is not smaller than a prescribed value.

13. The non-transitory storage medium storing an image processing program according to claim 1, wherein said image processing program causes said computer to further execute instructions comprising: displaying a second object on said display portion, determining whether a coordinate value input while said coordinate value is successively detected subsequently to detection of said first object arranged coordinate value satisfies a second object display condition for determining whether to display said second object, and setting a coordinate value determined as satisfying said second object display condition as a second object arranged coordinate and displaying said second object at a corresponding position on said display portion based on that coordinate.

14. The non-transitory storage medium storing an image processing program according to claim 13, wherein said second object display condition is identical to said orientation fix condition, and the orientation of said first object is fixed based on the coordinate value determined as satisfying that condition and said second object is displayed at the position corresponding to that coordinate value.

15. The non-transitory storage medium storing an image processing program according to claim 13, wherein said image processing program causing said computer to further execute instructions comprising:

determining an orientation of said second object based on positional relation between said first object arranged coordinate value and said second object arranged coordinate value.

16. The non-transitory storage medium storing an image processing program according to claim 1, wherein said image processing program causes said computer to further execute instructions comprising displaying an input image on said display portion, wherein the object is displayed in a manner superimposed on displayed said input image.

17. The non-transitory storage medium storing an image processing program according to claim 1, wherein the first object arranged coordinate value corresponds to a first point on the display portion contacted by the input portion and the first object is displayed at the first point at a first orientation.

18. The non-transitory storage medium storing an image processing program according to claim 17, wherein as the input portion maintains contact with the display portion, the continuously input coordinate value is obtained while the input portion moves along the display portion, and the first object rotates towards a second orientation following a direction of movement of the input portion across the display portion, as the first object rotates towards the second orientation, the first object maintains the position at the first object arranged coordinate value.

19. An image processing device having one or more processors and interacting with an input portion and a display portion, comprising:

a detection portion detecting, via the one or more processors, a coordinate value input through a user's operation;

a first object display portion obtaining a prescribed coordinate value among detected said coordinate values as a first object arranged coordinate value and displaying a first object at a corresponding position on said display portion based on the first object arranged coordinate value;

a continuously-input coordinate obtaining portion obtaining a continuously-input coordinate value which is a subsequent coordinate value, received through a continuous operation of said input portion, to said first object arranged coordinate value among said detected coordinate values; and an orientation changing portion changing an orientation of said first object displayed on said display portion based on a collection of continuously-input coordinate values received through the continuous operation of said input portion.

20. A method implemented in an information processing apparatus having one or more processors, the information processing apparatus interacting with an input portion and a display portion, the method comprising:

detecting a coordinate value input through an operation of said input portion;

obtaining a prescribed coordinate value among detected said coordinate values as a first object arranged coordinate value and displaying a first object at a corresponding position on said display portion based on the first object arranged coordinate value;

obtaining a continuously-input coordinate value which is a subsequent coordinate value, received through a continuous operation of said input portion, to said first object arranged coordinate value among said detected coordinate values; and changing an orientation of said first object displayed on said display portion based on a collection of continuously-input coordinate values received through the continuous operation of said input portion.

21. An image processing system, comprising:

an input device having an input portion;

a display device having a display portion; and an image processing device having one or more processors and interacting with the input portion and the display portion, the image processing device comprising:

a detection portion detecting, via the one or more processors, a coordinate value input through a user's operation, a first object display portion obtaining a prescribed coordinate value among detected said coordinate values as a first object arranged coordinate value and displaying a first object at a corresponding position on said display portion based on the first object arranged coordinate value, a continuously-input coordinate obtaining portion obtaining a continuously-input coordinate value which is a subsequent coordinate value, received through a continuous operation of said input portion, to said first object arranged coordinate value among said detected coordinate values, and an orientation changing portion changing an orientation of said first object displayed on said display portion based on a collection of continuously-input coordinate values received through the continuous operation of said input portion.

22. A non-transitory storage medium storing an image processing program executed by a computer interacting with an input portion and a display portion, said image processing program causing said computer to execute instructions comprising:

detecting a first coordinate value at a first position on the display portion where the input portion makes a first contact with the display portion;

displaying a first object in relation to the detected first coordinate value, the first object having a first orientation;

detecting subsequent coordinate values as the input portion maintains subsequent contact with the display portion while moving on the display portion;

changing the orientation of the first object by rotating the first object towards a second orientation corresponding to the movement of the input portion on the display portion, the first object staying at the first position as the first object rotates; and maintaining the first object at the second orientation and at the first position when the input portion no longer makes contact with the display portion.

* * * * *